United States Patent
Martin et al.

(10) Patent No.: US 10,861,320 B2
(45) Date of Patent: Dec. 8, 2020

(54) PREDICTIVE ANALYTICS FOR EMERGENCY DETECTION AND RESPONSE MANAGEMENT

(71) Applicant: RapidSOS, Inc., New York, NY (US)

(72) Inventors: Michael John Martin, Long Island City, NY (US); Nicholas Edward Horelik, Long Island City, NY (US); Charles LeForrest Hornbaker, II, Colorado Springs, CO (US); Flavia Cabral Sancier-Barbosa, Yellow Springs, OH (US); Anil Mehta, Makanda, IL (US)

(73) Assignee: RAPIDSOS, INC., New York, NY (US)

( * ) Notice: Subject to any disclaimer, the term of this patent is extended or adjusted under 35 U.S.C. 154(b) by 232 days.

(21) Appl. No.: 15/682,440

(22) Filed: Aug. 21, 2017

(65) Prior Publication Data

US 2018/0053401 A1 Feb. 22, 2018

Related U.S. Application Data

(60) Provisional application No. 62/377,855, filed on Aug. 22, 2016, provisional application No. 62/482,901, (Continued)

(51) Int. Cl.
*G01M 17/00* (2006.01)
*G08B 29/18* (2006.01)
(Continued)

(52) U.S. Cl.
CPC .......... *G08B 29/188* (2013.01); *G07C 5/008* (2013.01); *G08B 21/10* (2013.01); *G08B 31/00* (2013.01);
(Continued)

(58) Field of Classification Search
CPC ................ A61F 2/1613; A61F 2/16015; A61F 2002/16901; A61F 2002/1681;
(Continued)

(56) References Cited

U.S. PATENT DOCUMENTS

| 5,379,337 A | 1/1995 | Castillo et al. |
| 5,479,482 A | 12/1995 | Grimes |

(Continued)

FOREIGN PATENT DOCUMENTS

| CA | 2662606 A1 | 10/2009 |
| CA | 2697986 A1 | 9/2010 |

(Continued)

OTHER PUBLICATIONS

PCT/US2017/047854 International Search Report and Written Opinion dated Nov. 28, 2017.

(Continued)

*Primary Examiner* — Shardul D Patel
(74) *Attorney, Agent, or Firm* — Wilson Sonsini Goodrich & Rosati

(57) ABSTRACT

Disclosed are systems, methods, and media capable of generating emergency predictions. The systems, methods, and media generate spatiotemporal emergency communication predictions, carry out data augmentation, detect emergency anomalies, optimize emergency resource allocation, or any combination thereof.

16 Claims, 22 Drawing Sheets

Related U.S. Application Data filed on Apr. 7, 2017, provisional application No. 62/516,551, filed on Jun. 7, 2017.

(51) Int. Cl.

| | | |
|---|---|---|
| *H04L 29/08* | (2006.01) | |
| *H04W 4/90* | (2018.01) | |
| *H04W 4/02* | (2018.01) | |
| *H04M 11/04* | (2006.01) | |
| *G08B 21/10* | (2006.01) | |
| *G08B 31/00* | (2006.01) | |
| *H04L 12/18* | (2006.01) | |
| *H04W 4/029* | (2018.01) | |
| *G07C 5/00* | (2006.01) | |
| *H04M 1/725* | (2006.01) | |
| *G08B 17/00* | (2006.01) | |
| *G08B 27/00* | (2006.01) | |
| *H04W 76/50* | (2018.01) | |
| *H04L 12/58* | (2006.01) | |
| *H04W 4/14* | (2009.01) | |

(52) U.S. Cl.
CPC .......... *H04L 12/1895* (2013.01); *H04L 67/04* (2013.01); *H04L 67/10* (2013.01); *H04L 67/12* (2013.01); *H04M 1/72538* (2013.01); *H04M 11/04* (2013.01); *H04W 4/02* (2013.01); *H04W 4/029* (2018.02); *H04W 4/90* (2018.02); *G08B 17/00* (2013.01); *G08B 27/005* (2013.01); *H04L 51/02* (2013.01); *H04M 2250/12* (2013.01); *H04W 4/14* (2013.01); *H04W 76/50* (2018.02)

(58) Field of Classification Search
CPC ...... A61F 2002/1696; A61F 2002/1689; A61F 2002/009; Y10T 29/49; G01M 17/00
USPC ......... 701/31.4; 340/574, 539.14; 455/456.3, 455/404.2
See application file for complete search history.

(56) References Cited

U.S. PATENT DOCUMENTS

| | | | |
|---|---|---|---|
| 5,563,931 | A | 10/1996 | Bishop et al. |
| 5,596,625 | A | 1/1997 | Leblanc |
| 5,710,803 | A | 1/1998 | Kowal et al. |
| 5,742,666 | A | 4/1998 | Alpert |
| 6,014,555 | A | 1/2000 | Tendler |
| 6,133,853 | A | 10/2000 | Obradovich et al. |
| 6,167,255 | A | 12/2000 | Kennedy et al. |
| 6,249,674 | B1 | 6/2001 | Verdonk |
| 6,252,943 | B1 | 6/2001 | Johnson et al. |
| 6,256,489 | B1 | 7/2001 | Lichter et al. |
| 6,262,655 | B1 | 7/2001 | Yoshioka et al. |
| 6,363,138 | B1 | 3/2002 | Aprile |
| 6,459,782 | B1 | 10/2002 | Bedrosian et al. |
| 6,477,362 | B1 | 11/2002 | Raith et al. |
| 6,502,030 | B2 | 12/2002 | Hilleary |
| 6,510,315 | B1 | 1/2003 | Arnson |
| 6,556,816 | B1 | 4/2003 | Gafrick et al. |
| 6,571,092 | B2 | 5/2003 | Faccin et al. |
| 6,574,323 | B1 | 6/2003 | Manuel et al. |
| 6,587,545 | B1 | 7/2003 | Antonucci et al. |
| 6,594,666 | B1 | 7/2003 | Biswas et al. |
| 6,600,812 | B1 | 7/2003 | Gentillin et al. |
| 6,628,933 | B1 | 9/2003 | Humes |
| 6,680,998 | B1 | 1/2004 | Bell et al. |
| 6,707,421 | B1 | 3/2004 | Drury et al. |
| 6,731,610 | B2 | 5/2004 | Sajikawa et al. |
| 6,993,118 | B2 | 1/2006 | Antonucci et al. |
| 7,054,611 | B2 | 5/2006 | Eisner et al. |
| 7,058,385 | B2 | 6/2006 | Lauper |
| 7,084,775 | B1 | 8/2006 | Smith |
| 7,177,400 | B2 | 2/2007 | Eisner et al. |
| 7,224,773 | B2 | 5/2007 | Croak et al. |
| 7,271,704 | B2 | 9/2007 | McSheffrey et al. |
| 7,324,801 | B2 | 1/2008 | Droste et al. |
| 7,349,706 | B2 | 3/2008 | Kim et al. |
| 7,409,044 | B2 | 8/2008 | Leduc |
| 7,409,428 | B1 | 8/2008 | Brabec et al. |
| 7,436,938 | B2 | 10/2008 | Savaglio et al. |
| 7,437,143 | B1 | 10/2008 | Williams |
| 7,469,138 | B2 | 12/2008 | Dayar et al. |
| 7,483,519 | B2 | 1/2009 | Binning |
| 7,519,351 | B2 | 4/2009 | Malone, III |
| 7,519,372 | B2 | 4/2009 | MacDonald et al. |
| 7,548,158 | B2 | 6/2009 | Titus et al. |
| 7,565,131 | B2 | 7/2009 | Rollender |
| 7,646,854 | B2 | 1/2010 | Anderson |
| 7,676,215 | B2 | 3/2010 | Chin et al. |
| 7,684,782 | B2 | 3/2010 | Ashley, Jr. et al. |
| 7,848,733 | B2 | 12/2010 | Bull et al. |
| 7,937,067 | B2 | 5/2011 | Maier et al. |
| 7,949,326 | B2 | 5/2011 | Gallagher et al. |
| 8,009,810 | B2 | 8/2011 | Seidberg et al. |
| 8,041,335 | B2 | 10/2011 | Khetawat et al. |
| 8,041,341 | B1 | 10/2011 | Malackowski et al. |
| 8,045,954 | B2 | 10/2011 | Barbeau et al. |
| 8,068,881 | B2 | 11/2011 | Schrager |
| 8,102,972 | B2 | 1/2012 | Poremba |
| 8,126,424 | B2 | 2/2012 | Piett et al. |
| 8,150,367 | B1 | 4/2012 | Malladi et al. |
| 8,165,560 | B2 | 4/2012 | Stenquist |
| 8,165,562 | B2 | 4/2012 | Piett et al. |
| 8,185,087 | B2 | 5/2012 | Mitchell, Jr. et al. |
| 8,195,121 | B2 | 6/2012 | Dunn et al. |
| 8,219,135 | B2 | 7/2012 | De Amorim et al. |
| 8,244,205 | B2 | 8/2012 | Wu |
| 8,249,546 | B1 | 8/2012 | Shah et al. |
| 8,249,547 | B1 | 8/2012 | Fellner |
| 8,289,953 | B2 | 10/2012 | Ray et al. |
| 8,306,501 | B2 | 11/2012 | Moodbidri et al. |
| 8,326,260 | B1 | 12/2012 | Bradish et al. |
| 8,369,488 | B2 | 2/2013 | Sennett et al. |
| 8,401,565 | B2 | 3/2013 | Sandberg et al. |
| 8,417,090 | B2 | 4/2013 | Fleming |
| 8,417,212 | B2 | 4/2013 | Cepuran et al. |
| 8,442,481 | B2 | 5/2013 | Maier et al. |
| 8,442,482 | B2 | 5/2013 | Maier et al. |
| 8,472,973 | B2 | 6/2013 | Lin et al. |
| 8,484,352 | B2 | 7/2013 | Piett et al. |
| 8,489,062 | B2 | 7/2013 | Ray et al. |
| 8,494,868 | B2 | 7/2013 | Saalsaa |
| 8,509,729 | B2 | 8/2013 | Shaw |
| 8,516,122 | B2 | 8/2013 | Piett et al. |
| 8,538,370 | B2 | 9/2013 | Ray et al. |
| 8,538,468 | B2 | 9/2013 | Daly |
| 8,588,733 | B2 | 11/2013 | Ferguson et al. |
| 8,594,015 | B2 | 11/2013 | Dunn et al. |
| 8,606,218 | B2 | 12/2013 | Ray et al. |
| 8,625,578 | B2 | 1/2014 | Roy et al. |
| 8,626,112 | B2 | 1/2014 | Ray et al. |
| 8,630,609 | B2 | 1/2014 | Ray et al. |
| 8,644,301 | B2 | 2/2014 | Tamhankar et al. |
| 8,649,806 | B2 | 2/2014 | Cuff et al. |
| 8,682,279 | B2 | 3/2014 | Rudolf et al. |
| 8,682,281 | B2 | 3/2014 | Dunn et al. |
| 8,682,286 | B2 | 3/2014 | Dickinson et al. |
| 8,712,366 | B2 | 4/2014 | Greene et al. |
| 8,747,336 | B2 | 6/2014 | Tran |
| 8,751,265 | B2 | 6/2014 | Piett et al. |
| 8,755,767 | B2 | 6/2014 | Maier et al. |
| 8,760,290 | B2 | 6/2014 | Piett et al. |
| 8,761,721 | B2 | 6/2014 | Li |
| 8,792,867 | B1 | 7/2014 | Negahban et al. |
| 8,811,935 | B2 | 8/2014 | Faccin et al. |
| 8,825,687 | B2 | 9/2014 | Marceau et al. |
| 8,848,877 | B2 | 9/2014 | Seidberg et al. |
| 8,866,606 | B1 | 10/2014 | Will et al. |
| 8,868,028 | B1 | 10/2014 | Kaltsukis |
| 8,880,021 | B2 | 11/2014 | Hawkins |

(56) References Cited

U.S. PATENT DOCUMENTS

| | | |
|---|---|---|
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,503,876 B2 | 11/2016 | Saito et al. |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 10,089,854 B2* | 10/2018 | Hender .................. G06N 5/00 |
| 10,140,842 B2 | 11/2018 | Mehta et al. |
| 10,142,213 B1 | 11/2018 | Hart et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0222829 A1* | 10/2005 | Dumas .................. G06Q 10/00 703/2 |
| 2005/0282518 A1 | 12/2005 | D'Evelyn et al. |
| 2006/0109960 A1 | 5/2006 | D'Evelyn et al. |
| 2006/0293024 A1 | 12/2006 | Benco et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1* | 7/2007 | Monroe ............. G08B 21/0269 340/574 |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1* | 3/2008 | Dumas .................. G06Q 10/00 705/7.12 |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2009/0041206 A1 | 2/2009 | Hobby et al. |
| 2009/0186596 A1 | 7/2009 | Kaltsukis et al. |
| 2009/0257345 A1 | 10/2009 | King |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0156626 A1* | 6/2010 | Story .................. G01S 19/17 340/539.13 |
| 2010/0159871 A1 | 6/2010 | Tester |
| 2010/0159976 A1 | 6/2010 | Marocchi et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0262668 A1* | 10/2010 | Piett .................. H04W 76/50 709/206 |
| 2011/0009086 A1 | 1/2011 | Poremba et al. |
| 2011/0029600 A1 | 2/2011 | Theimer |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1* | 10/2011 | Hamalainen .......... G06Q 50/34 463/25 |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0092161 A1 | 4/2012 | West |
| 2012/0144019 A1 | 6/2012 | Zhu et al. |
| 2012/0157795 A1 | 6/2012 | Chiu et al. |
| 2012/0196557 A1 | 8/2012 | Reich et al. |
| 2012/0196558 A1 | 8/2012 | Reich et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0036175 A1 | 2/2013 | Lau |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0331055 A1 | 12/2013 | McKown et al. |
| 2014/0031000 A1 | 1/2014 | Hanover |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1* | 7/2014 | Hassan ................ H04W 4/029 455/404.2 |
| 2014/0213212 A1 | 7/2014 | Clawson |
| 2014/0248848 A1 | 9/2014 | Mufti et al. |

(56) References Cited

U.S. PATENT DOCUMENTS

| | | |
|---|---|---|
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2015/0011176 A1 | 1/2015 | Zhu |
| 2015/0029836 A1 | 1/2015 | Hans et al. |
| 2015/0055453 A1 | 2/2015 | Chaki et al. |
| 2015/0055554 A1 | 2/2015 | Sedlacek et al. |
| 2015/0081209 A1 | 3/2015 | Yeh et al. |
| 2015/0094095 A1* | 4/2015 | Johnson ............. H04W 4/023 455/456.3 |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0034961 A1 | 2/2016 | May et al. |
| 2016/0050550 A1 | 2/2016 | Anand et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0142894 A1 | 5/2016 | Papakonstantinou et al. |
| 2016/0192167 A1 | 6/2016 | Piett et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353262 A1 | 12/2016 | Acevedo et al. |
| 2016/0353266 A1 | 12/2016 | Winkler et al. |
| 2016/0363931 A1 | 12/2016 | Yang et al. |
| 2016/0371973 A1* | 12/2016 | Holleczek ............. G08G 1/0141 |
| 2017/0004427 A1 | 1/2017 | Bruchal et al. |
| 2017/0046216 A1 | 2/2017 | Stenneth et al. |
| 2017/0075407 A1 | 3/2017 | Kritt et al. |
| 2017/0099579 A1 | 4/2017 | Ryan et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1* | 6/2017 | Mehta ............. G06N 20/00 |
| 2017/0164175 A1 | 6/2017 | Bozik et al. |
| 2017/0171735 A1 | 6/2017 | Anand et al. |
| 2017/0180486 A1 | 6/2017 | Mehta et al. |
| 2017/0180963 A1 | 6/2017 | Cavendish et al. |
| 2017/0180966 A1 | 6/2017 | Piett et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0245130 A1 | 8/2017 | Mehta et al. |
| 2017/0251347 A1 | 8/2017 | Mehta et al. |
| 2017/0310827 A1 | 10/2017 | Mehta et al. |
| 2017/0316698 A1 | 11/2017 | Stenneth et al. |
| 2018/0020091 A1 | 1/2018 | Self et al. |
| 2018/0039737 A1 | 2/2018 | Dempers et al. |
| 2018/0077282 A1 | 3/2018 | Herron et al. |
| 2018/0242133 A1 | 8/2018 | Anand et al. |
| 2018/0249315 A1 | 8/2018 | Mehta et al. |
| 2018/0262544 A1 | 9/2018 | Mehta et al. |
| 2018/0310159 A1 | 10/2018 | Katz et al. |
| 2019/0020993 A1 | 1/2019 | Nguyen |
| 2019/0166480 A1 | 5/2019 | Rauner |
| 2019/0320310 A1 | 10/2019 | Horelik et al. |
| 2019/0327597 A1 | 10/2019 | Katz et al. |
| 2019/0335310 A1 | 10/2019 | Anand et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

U.S. Appl. No. 15/589,847 Office Action dated Nov. 30, 2017.
ArcGIS REST Services Directory. Folder: TIGERWeb. Available at https://tigerweb.geo.census.gov/arcgis/rest/services/TIGERweb. (1 pg.) (Accessed Sep. 2017).
Co-pending U.S. Appl. No. 15/497,067, filed Apr. 25, 2017.
Co-pending U.S. Appl. No. 15/589,847, filed May 8, 2017.
Co-pending U.S. Appl. No. 15/667,531, filed Aug. 2, 2017.
PCT/US2015/050609 International Preliminary Report on Patentability dated Mar. 30, 2017.
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
PCT/US2016/067366 International Search Report and Written Opinion dated Mar. 31, 2017.
PCT/US2016/068134 International Search Report and Written Opinion dated Apr. 21, 2017.
PCT/US2017/029465 International Search Report and Written Opinion dated Aug. 9, 2017.
PCT/US2017/031605 International Search Report and Written Opinion dated Jul. 31, 2017.
Seattle Real Time Fire 911 Calls. Available at https://catalog.data.gov/dataset/seattle-real-time-fire-911-calls-6cdf3 (3 pgs.) (Accessed Sep. 2017).

(56) References Cited

OTHER PUBLICATIONS

Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,484 Office Action dated May 8, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/589,847 Office Action dated Jun. 23, 2017.
Weather Company Data for IBM Bluemix APIs. Available at https://twcservice.mybluemix.net/rest-api/ (100 pgs) (Accessed Sep. 2017).
Co-pending U.S. Appl. No. 15/880,208, filed Jan. 25, 2018.
Co-pending U.S. Appl. No. 16/378,363, filed Apr. 8, 2019.
PCT/US2018/063935 International Search Report and Written Opinion dated Mar. 22, 2019.
Abel et al. Semantics + Filtering + Search = Twitcident exploring information in social web streams. HT'12—Proceedings of 23rd ACM Conference on Hypertext and Social Media (10 pgs) (2012).
Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/150,099, filed Oct. 2, 2018.
Co-pending U.S. Appl. No. 16/162,171, filed Oct. 16, 2016.
Co-pending U.S. Appl. No. 16/178,476, filed Nov. 1, 2018.
Co-pending U.S. Appl. No. 16/209,892, filed Dec. 4, 2018.
Co-pending U.S. Appl. No. 16/271,634, filed Feb. 8, 2019.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
PCT/US2016/060189 International Preliminary Report on Patentability dated May 17, 2018.
PCT/US2016/065212 International Preliminary Report on Patentability dated Jun. 21, 2018.
PCT/US2016/067366 International Preliminary Report on Patentability dated Jun. 28, 2018.
PCT/US2016/068134 International Preliminary Report on Patentability dated Jul. 5, 2018.
PCT/US2017/029465 International Preliminary Report on Patentability dated Nov. 8, 2018.
PCT/US2018/028951 International Search Report and Written Opinion dated Aug. 10, 2018.
U.S. Appl. No. 15/588,343 Office Action dated Feb. 26, 2018.
U.S. Appl. No. 15/589,847 Office Action dated Nov. 6, 2018.
U.S. Appl. No. 15/667,531 Office Action dated Apr. 5, 2018.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
U.S. Appl. No. 16/209,892 Office Action dated Feb. 8, 2019.
U.S. Appl. No. 15/436,379 Office Action dated Nov. 2, 2017.
U.S. Appl. No. 15/436,484 Office Action dated Sep. 14, 2017.
U.S. Appl. No. 15/667,531 Office Action dated Nov. 8, 2017.
Cipolla et al. A tool for Emergency Detection with Deep Learning Neural Networks. KDWeb (2016) How to predict a disaster. ICAR—National Research Council of Italy—Palermo, Italy (10 pgs).
Co-pending U.S. Appl. No. 16/526,195, filed Jul. 30, 2019.
Co-pending U.S. Appl. No. 16/537,377, filed Aug. 9, 2019.
PCT/US2019/027538 International Search Report and Written Opinion dated Aug. 2, 2019.
U.S. Appl. No. 15/371,117 Office Action dated Aug. 5, 2019.
U.S. Appl. No. 15/682,440 Office Action dated Jul. 10, 2019.
U.S. Appl. No. 16/150,099 Office Action dated Jun. 25, 2019.
U.S. Appl. No. 16/162,171 Office Action dated Nov. 4, 2019.
U.S. Appl. No. 16/178,476 Office Action dated May 30, 2019.
U.S. Appl. No. 16/271,634 Office Action dated Jun. 13, 2019.
U.S. Appl. No. 16/378,363 Office Action dated Jul. 19, 2019.
U.S. Appl. No. 16/436,810 Office Action dated Aug. 9, 2019.
Co-pending U.S. Appl. No. 16/684,366, filed Nov. 14, 2019.
Co-pending U.S. Appl. No. 16/740,207, filed Jan. 10, 2020.
U.S. Appl. No. 15/682,440 Office Action dated Jan. 27, 2020.
U.S. Appl. No. 15/976,600 Office Action dated Jan. 30, 2020.
U.S. Appl. No. 16/271,634 Office Action dated Dec. 16, 2019.
U.S. Appl. No. 16/436,810 Office Action dated Dec. 17, 2019.
U.S. Appl. No. 16/526,195 Office Action dated Dec. 27, 2019.
U.S. Appl. No. 16/378,363 Office Action dated Jan. 14, 2020.
Chohlaswood et al. Mining 911 Calls in New York City: Temporal Patterns, Detection and Forecasting. AAAI Conference on Artificial Intelligence Workshop (Apr. 2015).
Co-pending U.S. Appl. No. 16/834,914, filed Mar. 30, 2020.
Hodgkiss et al. Spatiotemporal Analysis of 911 Call Stream Data. Proceedings of the 2005 national conference on Digital government research (2005).
Jasso et al. Prediction of 911 Call Volumes For Emergency Event Detection. Proceedings of the 8th Annual International Digital Government Research Conference (2007) .
U.S. Appl. No. 15/371,117 Office Action dated Apr. 3, 2020.

* cited by examiner

FIG. 8

| Proprietary Call Data | | | | Predicted Features | | | | | | | Actual Features | | | Prediction Validation | | |
|---|---|---|---|---|---|---|---|---|---|---|---|---|---|---|---|---|
| Uid | Call time | Lat | Lon | p-type | p-fire | p-pol | p-med | p-high-pri | p_resp [min] | | a-type | a-priority | a-resp [min] | Type | High-pri | Resp. Time [min] |
| c1b9 | 5/3/2017 0:30 | 33 | -117 | Fire | 0.61 | 0.03 | 0.35 | 0.57 | 15.0 | | Fire | High | 17.5 | T | T | -0.14 |
| c1b9 | 5/3/2017 1:03 | 33 | -117 | Med | 0.01 | 0.31 | 0.68 | 0.39 | 6.3 | | Med | Med | 4.5 | T | T | 0.40 |
| dc3b | 5/3/2017 5:27 | 33 | -117 | Fire | 0.61 | 0.07 | 0.31 | 0.75 | 13.5 | | Fire | Med | 12 | T | F | 0.12 |
| 8f0b | 5/3/2017 13:39 | 34 | -118 | Pol | 0.19 | 0.55 | 0.27 | 0.11 | 5.4 | | Pol | Low | 12 | T | T | -0.55 |
| 6d94 | 5/3/2017 16:49 | 30 | -95 | Fire | 0.64 | 0.03 | 0.34 | 0.18 | 3.3 | | Fire | Med | 8 | T | T | -0.89 |
| 2a87 | 5/3/2017 22:33 | 26 | -98 | Med | 0.24 | 0.25 | 0.51 | 0.97 | 6.0 | | Med | High | 6.2 | T | T | -0.03 |
| d35b | 5/3/2017 23:11 | 43 | -85 | Pol | 0.17 | 0.45 | 0.39 | 0.39 | 3.8 | | Med | Med | 11 | F | T | -0.66 |
| 027a | 5/4/2017 19:50 | 26 | -82 | Fire | 0.59 | 0.01 | 0.40 | 0.92 | 7.8 | | Fire | High | 6.7 | T | T | 0.16 |
| 67c8 | 5/4/2017 20:00 | 36 | -83 | Med | 0.45 | 0.06 | 0.49 | 0.09 | 2.0 | | Fire | Low | 3 | F | T | -0.33 |
| 8f8e | 5/4/2017 20:24 | 32 | -83 | Fire | 0.55 | 0.02 | 0.44 | 0.83 | 9.7 | | Fire | High | 11.6 | T | T | -0.17 |

PREDICTIVE ANALYTICS FOR EMERGENCY DETECTION AND RESPONSE MANAGEMENT

CROSS-REFERENCE TO RELATED APPLICATIONS

This application claims the benefit of U.S. Application Ser. No. 62/516,551, filed Jun. 7, 2017, U.S. Application Ser. No. 62/482,901, filed Apr. 7, 2017, and U.S. Application Ser. No. 62/377,855, filed Aug. 22, 2016, the entire contents of which are hereby incorporated by reference.

BACKGROUND

An estimated 240 million 911 phone calls are made each year in the U.S with some areas receiving a large majority of these emergency calls from wireless devices. Through the course of a year, a given public safety answering point and associated emergency response personnel responsible for emergencies within a geographic area will experience a wide range of calls on a day-to-day basis. Such fluctuations are universal for emergency response personnel in countries around the world and can result in substantial understaffing or overstaffing of resources during specific time periods. Resources may be misallocated at various locations such that the ability of emergency response personnel to respond rapidly to developing emergency situations is impaired.

SUMMARY

The number of emergency communications with public safety answering points, emergency dispatch centers, emergency management systems, and other such emergency response resources is subject to various factors that affect the type and frequency of such requests. Influential factors can include environmental conditions such as weather events (e.g., snow, rain, freezing temperatures, etc.) that may make road conditions more dangerous for motorists. Non-environmental events can also play a role. For example, an annual home game by the local sports team against a division rival may correlate with increased traffic around the downtown stadium and, in turn, with an increased risk of traffic accidents in that geographic area. A combination of factors can combine to produce elevated risks for certain types of emergencies. For example, triple digit temperatures with high humidity during an outdoor sporting event with a large audience in attendance may correlate with an elevated risk of heat stroke for athletes and/or attendees.

Because the various factors that influence the risk of an emergency tend to fluctuate over time, the actual number of emergencies or emergency requests for a particular geographic area during a particular time period will also vary depending on the environmental conditions and/or events in that area during that time period. Currently, emergency response personnel are staffed and assigned without the benefit of a system that accounts for these risk factors. The result is inefficient resource allocation that can lead to inadequate responses to emergencies by overstretched personnel or emergency resources sitting idle due to overstaffing.

Moreover, modern digital devices have access to a variety of information, but have been unable to harness that information to detect emergency events. In various cases, a user of a device has an emergency situation arise but is either unable to request help or is unaware of the emergency situation. In these situations, the user's inability to request assistance can lead to delay or even a complete lack of emergency response. With the growing availability of user and sensor data from smart devices such as smart phones, IoT devices, etc., provided herein are systems, methods, and media for obtaining and/or using affiliate data around an emergency to understand contributing factors at a micro level (e.g., health indicators) or a macro level (e.g., weather, traffic).

One major advantage of the systems, methods, and media provided herein is that they provide a means of utilizing historical data on past emergency calls, environmental conditions, and events to generate spatiotemporal emergency communication predictions. A spatiotemporal prediction typically corresponds to a defined time period and a defined geographic area. In some embodiments, a user (e.g., a PSAP administrator) accesses an emergency management system to obtain one or more spatiotemporal emergency communication predictions. In some embodiments, the user defines a time period and a geographic area. In some embodiments, the spatiotemporal risk predictions is generated on a macro level (e.g., for a county) and enables the emergency resources for the county to be allocated ahead of time in preparation for peaks or valleys in the volume of predicted emergencies or in the location of where those emergencies are likely to occur. Another advantage of some embodiments of the systems, devices and methods described herein is that the emergency predictions are generated automatically and recommendations for reducing emergencies are automatically provided to affected users (e.g., a mapping program may guide a driver away from an accident-prone area based on emergency predictions).

Another advantage of the systems, methods, and media provided herein is the augmentation of unlabeled incoming or recent (e.g., current) emergency communications to predict the nature and/or priority of the communications using historical data matched emergency communications. Emergency management systems typically lack access to recent or current labeled emergency communication data, including, for example, information regarding the nature or priority of a 911 call. However, the subject matter disclosed herein enables historical labeled emergency communication data obtained from emergency dispatch centers and unlabeled emergency communication data stored by the EMS to be matched and then used to predict the nature and/or priority of recent emergency communications.

Another advantage of the systems, methods, and media provided herein is detection of one or more emergency anomalies in real-time or near real-time. Current or recent emergency communications are monitored to detect any anomalous spatiotemporal clustering compared to historical and/or predicted communications. Anomalous clusters are optionally reported or provided to a user such as, for example, an emergency dispatch center administrator. In some embodiments, emergency predictions are integrated into existing services such as mapping programs, corporate security and insurance programs.

Another advantage of the systems, methods, and media provided herein is enhancement of emergency resource allocation. Emergency dispatch centers and emergency response resources lack an effective method for optimizing allocation of emergency resources. Spatiotemporal emergency communication prediction(s) and resource availability data are used in optimization algorithms to generate an optimized allocation.

Another advantage of the systems, methods, and media provided herein is auto-detection of emergency (and non-emergency) events. In some scenarios, when a user is unable or unaware of a potential emergency situation, a device or a group of devices monitors various forms of information such as sensor data to detect emergency or possible emergency events. For example, systems, methods, and media provided herein may associate certain sensor data such as health indicators from a wearable with environmental data such as temperature and humidity to predict an increased risk for a health emergency. In many instances, the device or group of devices then sends emergency alerts and/or requests for assistance to a recipient such as, for example, a user, an emergency dispatch enter, operations center, a mapping software, a connected device or healthcare system.

In one aspect, disclosed herein are methods of creating a prediction model for generating at least one spatiotemporal emergency prediction, the methods comprising: a) obtaining, by an emergency prediction system (EPS), emergency data comprising emergency type, emergency location, and emergency time for a plurality of emergency communications; b) generating, by the emergency prediction system, at least one prediction model for making at least one spatiotemporal emergency prediction using the emergency data; and c) using, by the emergency prediction system, the at least one prediction model to generate a spatiotemporal emergency prediction corresponding to a defined emergency type, a defined geographic area, and a defined time period. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the method further comprises providing, by the emergency prediction system, the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are methods of creating a prediction model for generating at least one spatiotemporal emergency prediction, the methods comprising: a) obtaining, by an emergency prediction system (EPS), emergency data for a plurality of emergencies, the emergency data comprising emergency location and emergency time; b) generating, by the emergency prediction system, at least one prediction model for making at least one spatiotemporal emergency prediction using the emergency data; and c) using, by the emergency prediction system, the at least one prediction model to generate a spatiotemporal emergency prediction corresponding to a defined geographic area and a defined time period.

In another aspect, disclosed herein are computer-implemented methods for augmenting unlabeled emergency data, comprising: a) obtaining, by an emergency prediction system, unlabeled emergency data; b) obtaining, by the emergency prediction system, historical labeled emergency data originating from at least one emergency dispatch center, said historical labeled emergency data comprising emergency type and emergency priority; c) matching, by the emergency prediction system, at least a subset of the unlabeled emergency data with at least a subset of the historical labeled emergency data; and d) merging, by the emergency prediction system, the at least a subset of the unlabeled emergency data with the at least a subset of the historical labeled emergency data to generate matched emergency data. In some embodiments, the method further comprises providing, by the emergency prediction system, a response prediction model. In further embodiments, the response prediction model is a regression model. In further embodiments, the method further comprises using, by the emergency prediction system, the response prediction model to generate at least one estimated response time for at least one emergency communication. In yet further embodiments, the at least one estimated response time is generated in real-time for at least one emergency communication. In yet further embodiments, the at least one estimated response time comprises an exact time. In yet further embodiments, the at least one estimated response time comprises a time range. In yet further embodiments, the method further comprises providing, by the emergency prediction system, the at least one estimated response time to at least one emergency dispatch center. In yet further embodiments, the method further comprises providing, by the emergency prediction system, the at least one estimated response time to at least one communication device initiating the at least one emergency communication. In some embodiments, the method further comprises obtaining, by the emergency prediction system, a prediction algorithm for predicting labels for an incoming data stream of unlabeled emergency data. In further embodiments, the prediction algorithm is trained using matched emergency data. In further embodiments, the prediction algorithm is a multi-class classifier for predicting at least one of emergency type and emergency priority for unlabeled emergency data. In yet further embodiments, the at least one of emergency type and emergency priority predicted by the multi-class classifier is incorporated into the unlabeled emergency data, thereby converting the unlabeled emergency data to augmented emergency data. In yet further embodiments, the method further comprises using, by the emergency prediction system, the multi-class classifier to generate at least one emergency type prediction for current unlabeled emergency data. In yet further embodiments, the method further comprises using, by the emergency prediction system, the multi-class classifier to generate at least one emergency priority prediction for current unlabeled emergency data. In further embodiments, the prediction algorithm provides a prediction probability. In further embodiments, the prediction algorithm is assessed for prediction accuracy. In yet further embodiments, prediction accuracy is determined by comparing predicted labels to actual labels. In further embodiments, the prediction algorithm is re-trained. In further embodiments, the prediction algorithm is re-trained at least once a week. In further embodiments, the method further comprises providing, by the emergency prediction system, the augmented emergency data to at least one emergency dispatch center. In some embodiments, the emergency priority is priority call or non-priority call. In some embodiments, the emergency priority is a priority level assigned by an emergency dispatch center. In some embodiments, emergency type is selected from fire emergency, medical emergency, car accident, police emergency, and natural disaster.

In another aspect, disclosed herein are computer-implemented methods for predicting labels for an emergency communication data stream, the methods comprising: a) obtaining, by an emergency prediction system, unlabeled emergency data; b) obtaining, by the emergency prediction system, historical labeled emergency data originating from at least one emergency dispatch center; c) matching, by the emergency prediction system, at least a subset of the unlabeled emergency data with at least a subset of the historical labeled emergency data to generate matched emergency data; d) training, by the emergency prediction system, a prediction algorithm using the matched emergency data; and e) using, by the emergency prediction system, the prediction algorithm to predict labels for an incoming data stream of unlabeled emergency data. In some embodiments, the prediction algorithm is a multi-class classifier for predicting at least one of emergency type and emergency priority for unlabeled emergency communication data. In further embodiments, the emergency priority is priority call or non-priority call. In further embodiments, the emergency priority is a priority level assigned by an emergency dispatch center. In further embodiments, emergency type is selected from fire emergency, medical emergency, car accident, police emergency, and natural disaster. In further embodiments, the at least one of emergency type and emergency priority predicted by the multi-class classifier is incorporated into the incoming data stream of unlabeled emergency data to generate augmented emergency data. In yet further embodiments, the method comprises providing, by the emergency prediction system, the augmented emergency data to at least one emergency dispatch center. In further embodiments, the method comprises using, by the emergency prediction system, the multi-class classifier to generate at least one emergency type prediction for an incoming data stream of unlabeled emergency data. In further embodiments, the method comprises using, by the emergency prediction system, the multi-class classifier to generate at least one emergency priority prediction for an incoming data stream of unlabeled emergency data. In some embodiments, the prediction algorithm provides a prediction probability. In some embodiments, the prediction algorithm is assessed for prediction accuracy. In further embodiments, prediction accuracy is determined by comparing predicted labels to actual labels. In some embodiments, the prediction algorithm is re-trained. In some embodiments, the prediction algorithm is re-trained at least once a week.

In another aspect, disclosed herein are methods for detecting an emergency anomaly, the methods comprising: a) obtaining, by an emergency prediction system, emergency data for current or ongoing emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications. In some embodiments, the method comprises using, by the emergency prediction system, a multi-class classifier to predict at least one of emergency type and emergency priority for the cluster of emergency communications. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, the emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the method comprises providing, by the emergency prediction system, the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the method comprises locating, by the emergency prediction system, at least one subject located within the emergency anomaly based on subject mobility data. In further embodiments, the method comprises sending, by the emergency prediction system, a notification of the emergency anomaly to the at least one subject located within the emergency anomaly. In some embodiments, the method comprises locating, by the emergency prediction system, at least one subject located within the emergency anomaly based on a defined geographic area and a defined time period of the emergency anomaly. In further embodiments, the method comprises sending, by the emergency prediction system, a notification of the emergency anomaly to the at least one subject located within the emergency anomaly. In some embodiments, emergency anomaly detection is carried out for a location of a first member device belonging to a group of devices authorized to share data. In further embodiments, a notification of a detected emergency anomaly is sent to a second member device in the group of devices. In some embodiments, emergency anomaly detection is carried out for a first member device belonging to a group of devices based on information provided by a group of devices. In further embodiments, a proxy call is initiated on behalf of the first member device when an emergency anomaly is detected for the member device. In yet further embodiments, the proxy call is an emergency call to at least one of an emergency management system and an emergency dispatch center. In further embodiments, a proxy call is initiated on behalf of the first member device when an emergency anomaly is detected at a location of the first member device. In further embodiments, a proxy call is initiated on behalf of the first member device by a second member device in the group of devices when an emergency anomaly is detected for the first member device. In yet further embodiments, a location of the first member device is provided to a recipient of the proxy call. In yet further embodiments, the emergency data is provided to a recipient of the proxy call. In some embodiments, the emergency data is obtained from a group of devices comprising member devices authorized to share data. In some embodiments, the emergency prediction system executes the emergency anomaly detection algorithm in response to receiving a request to detect an emergency anomaly from a communications device. In some embodiments, the emergency prediction system executes the emergency anomaly detection algorithm in response to receiving a request to detect an emergency anomaly from a member device in a group of devices authorized to share data.

In another aspect, disclosed herein are methods for optimizing emergency resource allocation using emergency data, comprising: a) obtaining, by an emergency resource management system, at least one spatiotemporal emergency prediction; b) obtaining, by the emergency resource management system, at least one estimated response time prediction corresponding to the at least one spatiotemporal emergency prediction; c) obtaining, by the emergency resource management system, local emergency resource allocation data; and d) using, by the emergency resource management system, an allocation algorithm to generate a recommendation for optimal allocation of local emergency resources based on the at least one spatiotemporal emergency prediction, the at least one estimated response time prediction, and the local emergency resource allocation data. In some embodiments, the allocation algorithm comprises a greedy allocation algorithm. In some embodiments, the optimal allocation minimizes a predicted overall emergency response time. In some embodiments, the optimal allocation minimizes a number of emergency communications having an emergency response time exceeding a threshold time. In further embodiments, the threshold time is no more than about 10 minutes. In further embodiments, the threshold time is no more than about 20 minutes. In further embodiments, the local emergency resources comprise emergency response vehicle, emergency response personnel, emergency response equipment, emergency response base, or any combination thereof. In further embodiments, the local emergency resource allocation data comprises number or amount of local emergency resources, location of local emergency resources, restraints on allocation of local emergency resources, restraints on dispatch of local emergency resources, or any combination thereof. In further embodiments, the optimal allocation is based on one emergency type. In further embodiments, the optimal allocation is based on multiple emergency types. In further embodiments, the optimal allocation reduces overall predicted response time for the spatiotemporal emergency prediction by at least 10%. In further embodiments, the optimal allocation enables short-term dynamic reallocation of the local emergency resources. In further embodiments, the optimal allocation enables long-term allocation of the local emergency resources. In further embodiments, the optimal allocation is predicted for a defined time period. In yet further embodiments, the defined time period comprises a time block. In still yet further embodiments, the time block is at least about 1 hour. In still yet further embodiments, the time block is at least about 1 day. In still yet further embodiments, the time block is at least about 1 week. In still yet further embodiments, the time block is at least one day during a week. In still yet further embodiments, the time block is at least one day during a weekend. In still yet further embodiments, the time block is at least a day in the future. In still yet further embodiments, the time block is at least a week in the future. In some embodiments, the optimal allocation is stored on a database. In some embodiments, the method comprises providing, by the emergency resource management system, the optimal allocation to an emergency dispatch center. In further embodiments, providing the optimal allocation comprises displaying the local emergency resources according to the optimal allocation on a digital map. In further embodiments, the emergency resource management system provides the optimal allocation in response to a request from the emergency dispatch center. In further embodiments, the emergency resource management system provides the optimal allocation to an emergency dispatch center autonomously. In some embodiments, the at least one prediction model is updated with new emergency data. In some embodiments, the method comprises providing, by the emergency resource management system, a simulation platform for an administrator to simulate a local emergency resource allocation. In some embodiments, an estimated response time is calculated for the local emergency resource allocation provided by the simulation platform.

In another aspect, disclosed herein are emergency prediction systems (EPS) comprising at least one processor, an operating system configured to perform executable instructions, a memory, and a computer program including instructions executable by the at least one processor to create an application comprising: a) a software module obtaining emergency data comprising emergency type, emergency location, and emergency time for a plurality of emergency communications; b) a software module generating at least one prediction model for making at least one spatiotemporal emergency prediction using the emergency data; and c) a software module using the at least one prediction model to generate a spatiotemporal emergency prediction corresponding to a defined emergency type, a defined geographic area, and a defined time period. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the emergency prediction system provides the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are emergency prediction systems (EPS) comprising at least one processor, an operating system configured to perform executable instructions, a memory, and a computer program including instructions executable by the at least one processor to create an application comprising: a) a software module obtaining emergency data for a plurality of emergencies, the emergency data comprising emergency location and emergency time; b) a software module generating at least one prediction model for making at least one spatiotemporal emergency prediction using the emergency data; and c) a software module using the at least one prediction model to generate a spatiotemporal emergency prediction corresponding to a defined geographic area and a defined time period.

In another aspect, disclosed herein are non-transitory computer-readable storage media encoded with a computer program including instructions executable by at least one processor to create an emergency prediction application comprising: a) a software module obtaining emergency data comprising emergency type, emergency location, and emergency time for a plurality of emergency communications; b) a software module generating at least one prediction model for making at least one spatiotemporal emergency prediction using the emergency data; and c) a software module using the at least one prediction model to generate a spatiotemporal emergency prediction corresponding to a defined emergency type, a defined geographic area, and a defined time period. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the emergency prediction application provides the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are non-transitory computer-readable storage media encoded with a computer program including instructions executable by at least one processor to create an emergency prediction application comprising: a) a software module obtaining emergency data for a plurality of emergencies, the emergency data comprising emergency location and emergency time; b) a software module generating at least one prediction model for making at least one spatiotemporal emergency prediction using the emergency data; and c) a software module using the at least one prediction model to generate a spatiotemporal emergency prediction corresponding to a defined geographic area and a defined time period.

In another aspect, disclosed herein are emergency prediction systems comprising: at least one processor, an operating system configured to perform executable instructions, a memory, and a computer program including instructions executable by the at least one processor to create an application comprising: a) a software module obtaining unlabeled emergency data; b) a software module obtaining historical labeled emergency data originating from at least one emergency dispatch center, said historical labeled emergency data comprising emergency type and emergency priority; c) a software module matching at least a subset of the unlabeled emergency data with at least a subset of the historical labeled emergency data; and d) a software module merging the at least a subset of the unlabeled emergency data with the at least a subset of the historical labeled emergency data to generate matched emergency data. In some embodiments, the emergency prediction system comprises a software module providing a response prediction model. In further embodiments, the response prediction model is a regression model. In further embodiments, the emergency prediction system uses the response prediction model to generate at least one estimated response time for at least one emergency communication. In yet further embodiments, the at least one estimated response time is generated in real-time for at least one emergency communication. In yet further embodiments, the at least one estimated response time comprises an exact time. In yet further embodiments, the at least one estimated response time comprises a time range. In yet further embodiments, the emergency prediction system comprises a software module providing the at least one estimated response time to at least one emergency dispatch center. In yet further embodiments, the emergency prediction system comprises a software module providing the at least one estimated response time to at least one communication device initiating the at least one emergency communication. In some embodiments, the emergency prediction system comprises a software module providing a prediction algorithm for predicting labels for an incoming data stream of unlabeled emergency data. In further embodiments, the prediction algorithm is trained using matched emergency data. In further embodiments, the prediction algorithm is a multi-class classifier for predicting at least one of emergency type and emergency priority for unlabeled emergency data. In yet further embodiments, the at least one of emergency type and emergency priority predicted by the multi-class classifier is incorporated into the unlabeled emergency data, thereby converting the unlabeled emergency data to augmented emergency data. In yet further embodiments, the emergency prediction system uses the multi-class classifier to generate at least one emergency type prediction for current unlabeled emergency data. In yet further embodiments, the emergency prediction system uses the multi-class classifier to generate at least one emergency priority prediction for current unlabeled emergency data. In further embodiments, the prediction algorithm provides a prediction probability. In further embodiments, the prediction algorithm is assessed for prediction accuracy. In yet further embodiments, prediction accuracy is determined by comparing predicted labels to actual labels. In further embodiments, the prediction algorithm is re-trained. In further embodiments, the prediction algorithm is re-trained at least once a week. In further embodiments, the emergency prediction system comprises providing at least a subset of the augmented emergency data to at least one emergency dispatch center. In some embodiments, the emergency priority is priority call or non-priority call. In some embodiments, the emergency priority is a priority level assigned by an emergency dispatch center. In some embodiments, emergency type is selected from fire emergency, medical emergency, car accident, police emergency, and natural disaster.

In another aspect, disclosed herein are non-transitory computer-readable storage media encoded with a computer program including instructions executable by at least one processor to create an emergency prediction application comprising: a) a software module obtaining unlabeled emergency data; b) a software module obtaining historical labeled emergency data originating from at least one emergency dispatch center, said historical labeled emergency data comprising emergency type and emergency priority; c) a software module matching at least a subset of the unlabeled emergency data with at least a subset of the historical labeled emergency data; and d) a software module merging the at least a subset of the unlabeled emergency data with the at least a subset of the historical labeled emergency data to generate matched emergency data. In some embodiments, the emergency prediction application comprises a software module providing a response prediction model. In further embodiments, the response prediction model is a regression model. In further embodiments, the emergency prediction application uses the response prediction model to generate at least one estimated response time for at least one emergency communication. In yet further embodiments, the at least one estimated response time is generated in real-time for at least one emergency communication. In yet further embodiments, the at least one estimated response time comprises an exact time. In yet further embodiments, the at least one estimated response time comprises a time range. In yet further embodiments, the emergency prediction application comprises a software module providing the at least one estimated response time to at least one emergency dispatch center. In yet further embodiments, the emergency prediction application comprises a software module providing the at least one estimated response time to at least one communication device initiating the at least one emergency communication. In some embodiments, the emergency prediction application comprises a software module providing a prediction algorithm for predicting labels for an incoming data stream of unlabeled emergency data. In further embodiments, the prediction algorithm is trained using matched emergency data. In further embodiments, the prediction algorithm is a multi-class classifier for predicting at least one of emergency type and emergency priority for unlabeled emergency data. In yet further embodiments, the at least one of emergency type and emergency priority predicted by the multi-class classifier is incorporated into the unlabeled emergency data, thereby converting the unlabeled emergency data to augmented emergency data. In yet further embodiments, the emergency prediction application uses the multi-class classifier to generate at least one emergency type prediction for current unlabeled emergency data. In yet further embodiments, the emergency prediction application uses the multi-class classifier to generate at least one emergency priority prediction for current unlabeled emergency data. In further embodiments, the prediction algorithm provides a prediction probability. In further embodiments, the prediction algorithm is assessed for prediction accuracy. In yet further embodiments, prediction accuracy is determined by comparing predicted labels to actual labels. In further embodiments, the prediction algorithm is re-trained. In further embodiments, the prediction algorithm is re-trained at least once a week. In further embodiments, the emergency prediction application comprises providing at least a subset of the augmented emergency data to at least one emergency dispatch center. In some embodiments, the emergency priority is priority call or non-priority call. In some embodiments, the emergency priority is a priority level assigned by an emergency dispatch center. In some embodiments, emergency type is selected from fire emergency, medical emergency, car accident, police emergency, and natural disaster.

In another aspect, disclosed herein are emergency anomaly prediction systems comprising at least one processor, an operating system configured to perform executable instructions, a memory, and a computer program including instructions executable by the at least one processor to create an application comprising: a) a software module obtaining emergency data for current or ongoing emergency communications, said emergency data comprising emergency time and emergency location; b) a software module obtaining an emergency anomaly detection algorithm for monitoring the emergency communications to identify the emergency anomaly; and c) a software module executing the emergency anomaly detection algorithm to identify the emergency anomaly based on the emergency data, said emergency anomaly comprising a cluster of emergency communications. In some embodiments, the emergency prediction system uses a multi-class classifier to predict at least one of emergency type and emergency priority for the cluster of emergency communications. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, the emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the emergency prediction system provides the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the emergency prediction system locates at least one subject located within the emergency anomaly based on subject mobility data. In further embodiments, the emergency prediction system sends a notification of the emergency anomaly to the at least one subject located within the emergency anomaly. In some embodiments, the emergency prediction system locates at least one subject located within the emergency anomaly based on a defined geographic area and a defined time period of the emergency anomaly. In further embodiments, the emergency prediction system sends a notification of the emergency anomaly to the at least one subject located within the emergency anomaly. In some embodiments, emergency anomaly detection is carried out for a location of a first member device belonging to a group of devices authorized to share data. In further embodiments, a notification of a detected emergency anomaly is sent to a second member device in the group of devices. In some embodiments, emergency anomaly detection is carried out for a first member device belonging to a group of devices based on information provided by a group of devices. In further embodiments, a proxy call is initiated on behalf of the first member device when an emergency anomaly is detected for the member device. In yet further embodiments, the proxy call is an emergency call to at least one of an emergency management system and an emergency dispatch center. In further embodiments, a proxy call is initiated on behalf of the first member device when an emergency anomaly is detected at a location of the first member device. In further embodiments, a proxy call is initiated on behalf of the first member device by a second member device in the group of devices when an emergency anomaly is detected for the first member device. In yet further embodiments, a location of the first member device is provided to a recipient of the proxy call. In yet further embodiments, the emergency data is provided to a recipient of the proxy call. In some embodiments, the emergency data is obtained from a group of devices comprising member devices authorized to share data. In some embodiments, the emergency prediction system executes the emergency anomaly detection algorithm in response to receiving a request to detect an emergency anomaly from a communications device. In some embodiments, the emergency prediction system executes the emergency anomaly detection algorithm in response to receiving a request to detect an emergency anomaly from a member device in a group of devices authorized to share data.

In another aspect, disclosed herein are non-transitory computer-readable storage media encoded with a computer program including instructions executable by at least one processor to create an emergency anomaly prediction application comprising: a) a software module obtaining emergency data for current or ongoing emergency communications, said emergency data comprising emergency time and emergency location; b) a software module obtaining an emergency anomaly detection algorithm for monitoring the emergency communications to identify the emergency anomaly; and c) a software module executing the emergency anomaly detection algorithm to identify the emergency anomaly based on the emergency data, said emergency anomaly comprising a cluster of emergency communications. In some embodiments, the emergency prediction system uses a multi-class classifier to predict at least one of emergency type and emergency priority for the cluster of emergency communications. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the emergency prediction system provides the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the emergency prediction system locates at least one subject located within the emergency anomaly based on subject mobility data. In further embodiments, the emergency prediction system sends a notification of the emergency anomaly to the at least one subject located within the emergency anomaly. In some embodiments, the emergency prediction system locates at least one subject located within the emergency anomaly based on a defined geographic area and a defined time period of the emergency anomaly. In further embodiments, the emergency prediction system sends a notification of the emergency anomaly to the at least one subject located within the emergency anomaly. In some embodiments, emergency anomaly detection is carried out for a location of a first member device belonging to a group of devices authorized to share data. In further embodiments, a notification of a detected emergency anomaly is sent to a second member device in the group of devices. In some embodiments, emergency anomaly detection is carried out for a first member device belonging to a group of devices based on information provided by a group of devices. In further embodiments, a proxy call is initiated on behalf of the first member device when an emergency anomaly is detected for the member device. In yet further embodiments, the proxy call is an emergency call to at least one of an emergency management system and an emergency dispatch center. In further embodiments, a proxy call is initiated on behalf of the first member device when an emergency anomaly is detected at a location of the first member device. In further embodiments, a proxy call is initiated on behalf of the first member device by a second member device in the group of devices when an emergency anomaly is detected for the first member device. In yet further embodiments, a location of the first member device is provided to a recipient of the proxy call. In yet further embodiments, the emergency data is provided to a recipient of the proxy call. In some embodiments, the emergency data is obtained from a group of devices comprising member devices authorized to share data. In some embodiments, the emergency prediction system executes the emergency anomaly detection algorithm in response to receiving a request to detect an emergency anomaly from a communications device. In some embodiments, the emergency prediction system executes the emergency anomaly detection algorithm in response to receiving a request to detect an emergency anomaly from a member device in a group of devices authorized to share data.

In another aspect, disclosed herein are emergency resource allocation systems comprising at least one processor, an operating system configured to perform executable instructions, a memory, and a computer program including instructions executable by the at least one processor to create an application comprising: a) a software module obtaining at least one spatiotemporal emergency prediction; b) a software module obtaining at least one estimated response time prediction corresponding to the at least one spatiotemporal emergency prediction; c) a software module obtaining local emergency resource allocation data; and d) a software module using an allocation algorithm to generate a recommendation for optimal allocation of local emergency resources based on the at least one spatiotemporal emergency prediction, the at least one estimated response time prediction, and the local emergency resource allocation data. In some embodiments, the allocation algorithm comprises a greedy allocation algorithm. In some embodiments, the optimal allocation minimizes a predicted overall emergency response time. In some embodiments, the optimal allocation minimizes a number of emergency communications having an emergency response time exceeding a threshold time. In further embodiments, the threshold time is no more than about 10 minutes. In further embodiments, the threshold time is no more than about 20 minutes. In further embodiments, the local emergency resources comprise emergency response vehicle, emergency response personnel, emergency response equipment, emergency response base, or any combination thereof. In further embodiments, the local emergency resource allocation data comprises number or amount of local emergency resources, location of local emergency resources, restraints on allocation of local emergency resources, restraints on dispatch of local emergency resources, or any combination thereof. In further embodiments, the optimal allocation is based on one emergency type. In further embodiments, the optimal allocation is based on multiple emergency types. In further embodiments, the optimal allocation reduces overall predicted response time for the spatiotemporal emergency prediction by at least 10%. In further embodiments, the optimal allocation enables short-term dynamic reallocation of the local emergency resources. In further embodiments, the optimal allocation enables long-term allocation of the local emergency resources. In further embodiments, the optimal allocation is predicted for a defined time period. In yet further embodiments, the defined time period comprises a time block. In still yet further embodiments, the time block is at least about 1 hour. In still yet further embodiments, the time block is at least about 1 day. In still yet further embodiments, the time block is at least about 1 week. In still yet further embodiments, the time block is at least one day during a week. In still yet further embodiments, the time block is at least one day during a weekend. In still yet further embodiments, the time block is at least a day in the future. In still yet further embodiments, the time block is at least a week in the future. In some embodiments, the optimal allocation is stored on a database. In some embodiments, the emergency resource management system provides the optimal allocation to an emergency dispatch center. In further embodiments, providing the optimal allocation comprises displaying the local emergency resources according to the optimal allocation on a digital map. In further embodiments, the emergency resource management system provides the optimal allocation in response to a request from the emergency dispatch center. In further embodiments, the emergency resource management system provides the optimal allocation to an emergency dispatch center autonomously. In some embodiments, the at least one prediction model is updated with new emergency data. In some embodiments, the emergency resource management system provides a simulation platform for an administrator to simulate a local emergency resource allocation. In some embodiments, an estimated response time is calculated for the local emergency resource allocation provided by the simulation platform.

In another aspect, provided herein are non-transitory computer-readable storage media encoded with a computer program including instructions executable by at least one processor to create an emergency resource allocation application comprising: a) a software module obtaining at least one spatiotemporal emergency prediction; b) a software module obtaining at least one estimated response time prediction corresponding to the at least one spatiotemporal emergency prediction; c) a software module obtaining local emergency resource allocation data; and d) a software module using an allocation algorithm to generate a recommendation for optimal allocation of local emergency resources based on the at least one spatiotemporal emergency prediction, the at least one estimated response time prediction, and the local emergency resource allocation data. In some embodiments, the allocation algorithm comprises a greedy allocation algorithm. In some embodiments, the optimal allocation minimizes a predicted overall emergency response time. In some embodiments, the optimal allocation minimizes a number of emergency communications having an emergency response time exceeding a threshold time. In further embodiments, the threshold time is no more than about 10 minutes. In further embodiments, the threshold time is no more than about 20 minutes. In further embodiments, the local emergency resources comprise emergency response vehicle, emergency response personnel, emergency response equipment, emergency response base, or any combination thereof. In further embodiments, the local emergency resource allocation data comprises number or amount of local emergency resources, location of local emergency resources, restraints on allocation of local emergency resources, restraints on dispatch of local emergency resources, or any combination thereof. In further embodiments, the optimal allocation is based on one emergency type. In further embodiments, the optimal allocation is based on multiple emergency types. In further embodiments, the optimal allocation reduces overall predicted response time for the spatiotemporal emergency prediction by at least 10%. In further embodiments, the optimal allocation enables short-term dynamic reallocation of the local emergency resources. In further embodiments, the optimal allocation enables long-term allocation of the local emergency resources. In further embodiments, the optimal allocation is predicted for a defined time period. In yet further embodiments, the defined time period comprises a time block. In still yet further embodiments, the time block is at least about 1 hour. In still yet further embodiments, the time block is at least about 1 day. In still yet further embodiments, the time block is at least about 1 week. In still yet further embodiments, the time block is at least one day during a week. In still yet further embodiments, the time block is at least one day during a weekend. In still yet further embodiments, the time block is at least a day in the future. In still yet further embodiments, the time block is at least a week in the future. In some embodiments, the optimal allocation is stored on a database. In some embodiments, the emergency resource management system provides the optimal allocation to an emergency dispatch center. In further embodiments, providing the optimal allocation comprises displaying the local emergency resources according to the optimal allocation on a digital map. In further embodiments, the emergency resource management system provides the optimal allocation in response to a request from the emergency dispatch center. In further embodiments, the emergency resource management system provides the optimal allocation to an emergency dispatch center autonomously. In some embodiments, the at least one prediction model is updated with new emergency data. In some embodiments, the emergency resource management system provides a simulation platform for an administrator to simulate a local emergency resource allocation. In some embodiments, an estimated response time is calculated for the local emergency resource allocation provided by the simulation platform.

In another aspect, disclosed herein are methods of creating a prediction model for generating at least one spatiotemporal emergency prediction, the method comprising: a) obtaining, by an emergency prediction system (EPS), emergency data comprising emergency type, emergency location, and emergency time for a plurality of emergency communications; b) augmenting, by the emergency prediction system, the emergency data with additional data associated with the plurality of emergency communications based on at least one of emergency time, emergency location, and calling identity; c) generating, by the emergency prediction system, at least one prediction model for making at least one spatiotemporal emergency prediction using the emergency data; and d) using, by the emergency prediction system, the at least one prediction model to generate at least one spatiotemporal emergency prediction corresponding to a defined emergency type, a defined geographic area, and a defined time period. Various aspects include one or more of the following elements. In some embodiments, the at least one prediction model is generated using a point cloud comprising points sampled from at least one of current emergency data, proprietary emergency data, and a proprietary data stream. In some embodiments, augmenting the emergency data with additional data in (b) comprises obtaining additional data, matching at least a subset of the additional data with at least a subset of the emergency data, and combining information from the at least a subset of the additional data with the at least a subset of the emergency data to form augmented data. In some embodiments, the method further comprises providing, by the emergency prediction system, the at least one spatiotemporal emergency prediction to an emergency dispatch center serving the defined geographic area. In some embodiments, providing the spatiotemporal emergency prediction comprises displaying a set of predicted kernel density estimates on a digital map. In some embodiments, the spatiotemporal emergency prediction is an aggregation of a plurality of spatiotemporal emergency predictions generated for subsets of the defined geographic area. In some embodiments, the method further comprises using an allocation algorithm to generate a recommendation for optimal allocation of local emergency resources based on the at least one spatiotemporal emergency prediction. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the method further comprises providing, by the emergency prediction system, the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are emergency prediction systems (EPS) comprising at least one processor, an operating system configured to perform executable instructions, a memory, and a computer program including instructions executable by the at least one processor to create an application comprising: a) a software module obtaining emergency data comprising emergency type, emergency location, and emergency time for a plurality of emergency communications; b) a software module augmenting the emergency data with additional data associated with the plurality of emergency communications based on at least one of emergency time, emergency location, and calling identity; c) a software module generating at least one prediction model for making at least one spatiotemporal emergency prediction using the emergency data; and d) a software module using the at least one prediction model to generate at least one spatiotemporal emergency prediction corresponding to a defined emergency type, a defined geographic area, and a defined time period. Various aspects include one or more of the following elements. In some embodiments, the at least one prediction model is generated using a point cloud comprising points sampled from at least one of current emergency data, proprietary emergency data, and a proprietary data stream. In some embodiments, augmenting the emergency data with additional data in (b) comprises obtaining additional data, matching at least a subset of the additional data with at least a subset of the emergency data, and combining information from the at least a subset of the additional data with the at least a subset of the emergency data to form augmented data. In some embodiments, the emergency prediction system provides the at least one spatiotemporal emergency prediction to an emergency dispatch center serving the defined geographic area. In some embodiments, the emergency prediction system further comprises a software module using an allocation algorithm to generate a recommendation for optimal allocation of local emergency resources based on the at least one spatiotemporal emergency prediction. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the emergency prediction system provides the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are non-transitory computer-readable storage media encoded with a computer program including instructions executable by at least one processor to create an emergency prediction application comprising: a) a software module obtaining emergency data comprising emergency type, emergency location, and emergency time for a plurality of emergency communications; b) a software module augmenting the emergency data with additional data associated with the plurality of emergency communications based on at least one of emergency time, emergency location, and calling identity; c) a software module generating at least one prediction model for making at least one spatiotemporal emergency prediction using the emergency data; and d) a software module using the at least one prediction model to generate at least one spatiotemporal emergency prediction corresponding to a defined emergency type, a defined geographic area, and a defined time period. Various aspects include one or more of the following elements. In some embodiments, the at least one prediction model is generated using a point cloud comprising points sampled from at least one of current emergency data, proprietary emergency data, and a proprietary data stream. In some embodiments, augmenting the emergency data with additional data in (b) comprises obtaining additional data, matching at least a subset of the additional data with at least a subset of the emergency data, and combining information from the at least a subset of the additional data with the at least a subset of the emergency data to form augmented data. In some embodiments, the emergency prediction application provides the at least one spatiotemporal emergency prediction to an emergency dispatch center serving the defined geographic area. In some embodiments, the emergency prediction application further comprises a software module using an allocation algorithm to generate a recommendation for optimal allocation of local emergency resources based on the at least one spatiotemporal emergency prediction. In some embodiments, the at least one prediction model is generated using a point cloud comprising current emergency data. In further embodiments, the point cloud includes current proprietary emergency data. In some embodiments, the at least one prediction model is generated using a point cloud comprising a proprietary data stream. In some embodiments, generating the spatiotemporal emergency prediction comprises making and aggregating predictions corresponding to subsets of the defined time period. In some embodiments, generating the spatiotemporal emergency prediction comprises making and aggregating predictions corresponding to subsets of the defined geographic area. In some embodiments, the spatiotemporal emergency prediction is used for emergency resource allocation, anomalous cluster detection, spatiotemporal emergency prediction visualization, or any combination thereof. In some embodiments, the at least one spatiotemporal emergency prediction comprises a predicted number of emergency communications. In some embodiments, the at least one spatiotemporal emergency prediction comprises a predicted emergency communication density. In some embodiments, the at least one spatiotemporal emergency prediction comprises a set of predicted kernel density estimates. In some embodiments, the at least one spatiotemporal emergency prediction comprises predicted response time. In some embodiments, the at least one spatiotemporal emergency prediction comprises emergency priority. In some embodiments, the emergency prediction application provides the spatiotemporal emergency prediction to an emergency dispatch center serving the defined geographic area. In further embodiments, providing the spatiotemporal emergency prediction comprises displaying a set of predicted kernel density estimates on a digital map. In yet further embodiments, the digital map shows at least a portion of the defined geographic area. In further embodiments, the emergency prediction system provides the spatiotemporal emergency prediction in response to a request from the emergency dispatch center, an operations center, mapping software, or a connected device. In further embodiments, the emergency prediction system provides the spatiotemporal emergency prediction to an emergency dispatch center autonomously. In some embodiments, the at least one prediction model is updated with new emergency data. In some embodiments, the at least one prediction model is trained using labeled call data, unlabeled call data, augmented call data, or any combination thereof. In some embodiments, the at least one prediction model is assessed for prediction accuracy. In further embodiments, prediction accuracy is determined by comparing at least one historical spatiotemporal emergency prediction to an actual number of emergency communications. In some embodiments, the at least one prediction model is re-created or re-trained. In some embodiments, the at least one prediction model is re-trained at least once a week. In some embodiments, the emergency data comprises labeled call data. In some embodiments, the emergency data comprises unlabeled call data. In some embodiments, the emergency data comprises augmented call data. In further embodiments, the augmented call data is obtained by matching unlabeled call data with labeled call data. In yet further embodiments, matching is based on call identity, emergency time, emergency location, call duration, or any combination thereof. In yet further embodiments, the unlabeled call data and labeled call data are merged to form augmented call data. In some embodiments, the emergency data comprises historical emergency data. In some embodiments, the emergency data comprises current emergency data. In some embodiments, the emergency data comprises public safety answering point (PSAP) call data. In some embodiments, the emergency data comprises EPS call data. In some embodiments, the emergency data is augmented with environment data associated with the plurality of emergency communications based on emergency time and emergency location. In further embodiments, the environment data comprises weather information, traffic information, road condition information, or any combination thereof. In some embodiments, the emergency data comprises event data. In further embodiments, the event data comprises information on a concert, sporting event, political demonstration, festival, performance, riot, protest, parade, convention, political campaign event, or any combination thereof. In some embodiments, emergency type is selected from fire emergency, medical emergency, car accident, police emergency, and natural disaster. In some embodiments, the emergency time is a time when an emergency communication is initiated or received or a duration of the emergency communication. In some embodiments, the defined time period comprises a time block. In further embodiments, the time block is at least about 1 hour. In further embodiments, the time block is at least about 1 day. In further embodiments, the time block is at least about 1 week. In further embodiments, the time block is at least one day during a week. In further embodiments, the time block is at least one day during a weekend. In some embodiments, the defined geographic area comprises an area block. In further embodiments, the area block is an area of about 100 square meters. In further embodiments, the area block is an area of about 1000 square meters. In further embodiments, the area block is an area of about 5 square kilometers. In further embodiments, the area block is an area of about 10 square kilometers. In some embodiments, the defined geographic area corresponds to a government defined area. In some embodiments, the defined geographic area corresponds to a government defined area. In some embodiments, the defined geographic area is a PSAP jurisdiction, a zip code, a census tract, a city, a county, or any combination thereof. In some embodiments, the at least one prediction model comprises a plurality of prediction models corresponding to a plurality of defined geographic areas, wherein each of the plurality of prediction models corresponds to a defined geographic area. In some embodiments, the at least one prediction model comprises a plurality of prediction models corresponding to a plurality of defined emergency types, wherein each of the plurality of prediction models corresponds to a defined emergency type. In some embodiments, a new spatiotemporal emergency prediction is generated periodically on a sliding window over time.

In another aspect, disclosed herein are methods for detecting an emergency anomaly, comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications. Various aspects incorporate one or more of the following. In some embodiments, the method further comprises using a multi-class classifier to predict at least one of emergency type and emergency priority for the cluster of emergency communications. In some embodiments, the emergency data comprises labeled call data, unlabeled call data, augmented call data, or any combination thereof. In some embodiments, the emergency anomaly is identified in real-time or near real-time. In some embodiments, the emergency anomaly detection algorithm uses a cluster detection model to identify the emergency anomaly. In some embodiments, the cluster comprises emergency communications that correspond to a defined geographic area, a defined time period, and a defined emergency type. In some embodiments, the method further comprises providing the emergency anomaly to an emergency dispatch center. In some embodiments, providing the emergency anomaly comprises displaying the cluster of emergency communications on a digital map. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, the emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the method comprises providing, by the emergency prediction system, the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the method comprises locating, by the emergency prediction system, at least one subject located within the emergency anomaly based on subject mobility data. In further embodiments, the method comprises sending, by the emergency prediction system, a notification of the emergency anomaly to the at least one subject located within the emergency anomaly. In some embodiments, the method comprises locating, by the emergency prediction system, at least one subject located within the emergency anomaly based on a defined geographic area and a defined time period of the emergency anomaly. In further embodiments, the method comprises sending, by the emergency prediction system, a notification of the emergency anomaly to the at least one subject located within the emergency anomaly. In some embodiments, emergency anomaly detection is carried out for a location of a first member device belonging to a group of devices authorized to share data. In further embodiments, a notification of a detected emergency anomaly is sent to a second member device in the group of devices. In some embodiments, emergency anomaly detection is carried out for a first member device belonging to a group of devices based on information provided by a group of devices. In further embodiments, a proxy call is initiated on behalf of the first member device when an emergency anomaly is detected for the member device. In yet further embodiments, the proxy call is an emergency call to at least one of an emergency management system and an emergency dispatch center. In further embodiments, a proxy call is initiated on behalf of the first member device when an emergency anomaly is detected at a location of the first member device. In further embodiments, a proxy call is initiated on behalf of the first member device by a second member device in the group of devices when an emergency anomaly is detected for the first member device. In yet further embodiments, a location of the first member device is provided to a recipient of the proxy call. In yet further embodiments, the emergency data is provided to a recipient of the proxy call. In some embodiments, the emergency data is obtained from a group of devices comprising member devices authorized to share data. In some embodiments, the emergency prediction system executes the emergency anomaly detection algorithm in response to receiving a request to detect an emergency anomaly from a communications device. In some embodiments, the emergency prediction system executes the emergency anomaly detection algorithm in response to receiving a request to detect an emergency anomaly from a member device in a group of devices authorized to share data.

In another aspect, disclosed herein are emergency prediction systems (EPS) comprising at least one processor, an operating system configured to perform executable instructions, a memory, and a computer program including instructions executable by the at least one processor to create an application comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications. Various aspects incorporate one or more of the following. In some embodiments, the application further comprises using a multi-class classifier to predict at least one of emergency type and emergency priority for the cluster of emergency communications. In some embodiments, the emergency data comprises labeled call data, unlabeled call data, augmented call data, or any combination thereof. In some embodiments, the emergency anomaly is identified in real-time or near real-time. In some embodiments, the emergency anomaly detection algorithm uses a cluster detection model to identify the emergency anomaly. In some embodiments, the cluster comprises emergency communications that correspond to a defined geographic area, a defined time period, and a defined emergency type. In some embodiments, the application further comprises providing the emergency anomaly to an emergency dispatch center. In some embodiments, providing the emergency anomaly comprises displaying the cluster of emergency communications on a digital map. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, the emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the emergency prediction system provides the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the emergency prediction system locates at least one subject located within the emergency anomaly based on subject mobility data. In further embodiments, the emergency prediction system sends a notification of the emergency anomaly to the at least one subject located within the emergency anomaly. In some embodiments, the emergency prediction system locates at least one subject located within the emergency anomaly based on a defined geographic area and a defined time period of the emergency anomaly. In further embodiments, the emergency prediction system sends a notification of the emergency anomaly to the at least one subject located within the emergency anomaly.

In another aspect, disclosed herein are non-transitory computer-readable storage media encoded with a computer program including instructions executable by at least one processor to create an emergency prediction application comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications. Various aspects incorporate one or more of the following. In some embodiments, the application further comprises using a multi-class classifier to predict at least one of emergency type and emergency priority for the cluster of emergency communications. In some embodiments, the emergency data comprises labeled call data, unlabeled call data, augmented call data, or any combination thereof. In some embodiments, the emergency anomaly is identified in real-time or near real-time. In some embodiments, the emergency anomaly detection algorithm uses a cluster detection model to identify the emergency anomaly. In some embodiments, the cluster comprises emergency communications that correspond to a defined geographic area, a defined time period, and a defined emergency type. In some embodiments, the application further comprises providing the emergency anomaly to an emergency dispatch center. In some embodiments, providing the emergency anomaly comprises displaying the cluster of emergency communications on a digital map. In some embodiments, the emergency data comprises labeled call data. In some embodiments, the emergency data comprises unlabeled call data. In some embodiments, the emergency data comprises augmented call data. In some embodiments, the emergency anomaly is identified in real-time. In some embodiments, the emergency anomaly detection is identified in near real-time. In some embodiments, the emergency anomaly detection algorithm uses a cluster detection model to identify the emergency anomaly. In some embodiments, the emergency anomaly detection algorithm executes upon each incoming new emergency communication. In some embodiments, the emergency anomaly detection algorithm executes periodically on a discrete time interval. In some embodiments, the emergency anomaly detection algorithm executes upon receiving instruction from a user, administrator, an emergency prediction system, an emergency management system, or an emergency dispatch center. In some embodiments, the cluster comprises emergency communications that correspond to a defined geographic area and a defined time period. In further embodiments, the defined time period comprises a time block. In yet further embodiments, the time block is at least about 5 minutes. In yet further embodiments, the time block is at least about 10 minutes. In yet further embodiments, the time block is at least about 30 minutes. In yet further embodiments, the defined time period is determined based on population density and call volume. In further embodiments, the defined geographic area comprises an area block. In yet further embodiments, the area block is an area of about 100 square meters. In yet further embodiments, the area block is an area of about 1000 square meters. In yet further embodiments, the area block is an area of about 5 square kilometers. In yet further embodiments, the area block is an area of about 10 square kilometers. In yet further embodiments, the defined geographic area is determined based on population density and call volume. In yet further embodiments, the defined geographic area corresponds to a government defined area. In yet further embodiments, the defined geographic area corresponds to a government defined area. In yet further embodiments, the defined geographic area is a PSAP jurisdiction, a zip code, a census tract, a city, a county, or any combination thereof. In yet further embodiments, the emergency data further comprises emergency type. In still yet further embodiments, the cluster comprises emergency communications that correspond to a defined geographic area, a defined time period, and a defined emergency type. In some embodiments, the emergency data is augmented with environment data. In some embodiments, the emergency data is augmented with event data. In some embodiments, the emergency anomaly detection algorithm identifies the emergency anomaly as being associated with a natural disaster or a man-made disaster. In some embodiments, the emergency anomaly detection algorithm identifies the emergency anomaly as being associated with an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident. In some embodiments, the emergency prediction system provides the emergency anomaly to an emergency dispatch center. In further embodiments, the emergency anomaly is provided as the cluster of emergency communications. In yet further embodiments, the emergency prediction system further provides information about the cluster comprising a center, a radius, a start time, an end time, p-value, number of calls, expected number of calls, or any combination thereof. In further embodiments, providing the emergency anomaly comprises displaying the cluster of emergency communications on a digital map. In yet further embodiments, the emergency prediction system provides the emergency anomaly in response to a request from the emergency dispatch center. In yet further embodiments, the emergency prediction system provides the emergency anomaly autonomously. In some embodiments, the emergency prediction system locates at least one subject located within the emergency anomaly based on subject mobility data. In further embodiments, the emergency prediction system sends a notification of the emergency anomaly to the at least one subject located within the emergency anomaly. In some embodiments, the emergency prediction system locates at least one subject located within the emergency anomaly based on a defined geographic area and a defined time period of the emergency anomaly. In further embodiments, the emergency prediction system sends a notification of the emergency anomaly to the at least one subject located within the emergency anomaly.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 shows an exemplary set of validation data;

DETAILED DESCRIPTION

Figure 1:
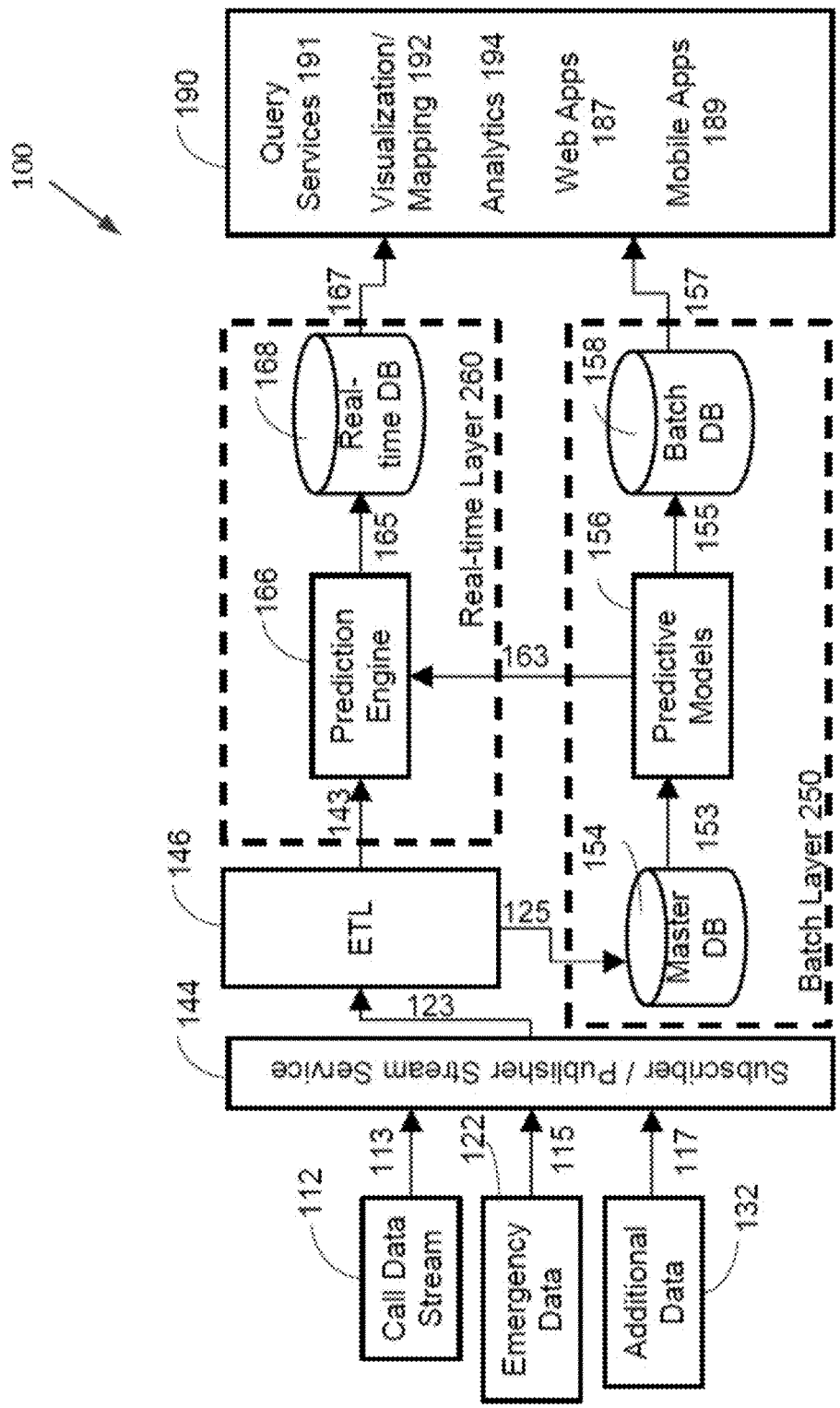
FIG. 1 illustrates exemplary system components for one embodiment of an emergency prediction system.

In certain embodiments, disclosed herein are methods of creating a prediction model for generating at least one spatiotemporal emergency prediction, the methods comprising: a) obtaining, by an emergency prediction system (EPS), emergency data comprising emergency type, emergency location, and emergency time for a plurality of emergency communications; b) generating, by the emergency prediction system, at least one prediction model for making at least one spatiotemporal emergency prediction using the emergency data; and c) using, by the emergency prediction system, the at least one prediction model to generate a spatiotemporal emergency prediction corresponding to a defined emergency type, a defined geographic area, and a defined time period.

In another aspect, disclosed herein are methods of creating a prediction model for generating at least one spatiotemporal emergency prediction, the methods comprising: a) obtaining, by an emergency prediction system (EPS), emergency data for a plurality of emergencies, the emergency data comprising emergency location and emergency time; b) generating, by the emergency prediction system, at least one prediction model for making at least one spatiotemporal emergency prediction using the emergency data; and c) using, by the emergency prediction system, the at least one prediction model to generate a spatiotemporal emergency prediction corresponding to a defined geographic area and a defined time period.

In certain embodiments, disclosed herein are computer-implemented methods for augmenting unlabeled emergency data, comprising: a) obtaining, by an emergency prediction system, unlabeled emergency data; b) obtaining, by the emergency prediction system, historical labeled emergency data originating from at least one emergency dispatch center, said historical labeled emergency data comprising emergency type and emergency priority; c) matching, by the emergency prediction system, at least a subset of the unlabeled emergency data with at least a subset of the historical labeled emergency data; and d) merging, by the emergency prediction system, the at least a subset of the unlabeled emergency data with the at least a subset of the historical labeled emergency data to generate matched emergency data.

In certain embodiments, disclosed herein are computer-implemented methods for predicting labels for an emergency communication data stream, the methods comprising: a) obtaining, by an emergency prediction system, unlabeled emergency data; b) obtaining, by the emergency prediction system, historical labeled emergency data originating from at least one emergency dispatch center; c) matching, by the emergency prediction system, at least a subset of the unlabeled emergency data with at least a subset of the historical labeled emergency data to generate matched emergency data; d) training, by the emergency prediction system, a prediction algorithm using the matched emergency data; and e) using, by the emergency prediction system, the prediction algorithm to predict labels for an incoming data stream of unlabeled emergency data.

In certain embodiments, disclosed herein are methods for detecting an emergency anomaly, the methods comprising: a) obtaining, by an emergency prediction system, emergency data for current or ongoing emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications.

In certain embodiments, disclosed herein are methods for optimizing emergency resource allocation using emergency data, comprising: a) obtaining, by an emergency resource management system, at least one spatiotemporal emergency prediction; b) obtaining, by the emergency resource management system, at least one estimated response time prediction corresponding to the at least one spatiotemporal emergency prediction; c) obtaining, by the emergency resource management system, local emergency resource allocation data; and d) using, by the emergency resource management system, an allocation algorithm to generate a recommendation for optimal allocation of local emergency resources based on the at least one spatiotemporal emergency prediction, the at least one estimated response time prediction, and the local emergency resource allocation data.

In certain embodiments, disclosed herein are emergency prediction systems (EPS) comprising at least one processor, an operating system configured to perform executable instructions, a memory, and a computer program including instructions executable by the at least one processor to create an application comprising: a) a software module obtaining emergency data comprising emergency type, emergency location, and emergency time for a plurality of emergency communications; b) a software module generating at least one prediction model for making at least one spatiotemporal emergency prediction using the emergency data; and c) a software module using the at least one prediction model to generate a spatiotemporal emergency prediction corresponding to a defined emergency type, a defined geographic area, and a defined time period.

In certain embodiments, disclosed herein are emergency prediction systems (EPS) comprising at least one processor, an operating system configured to perform executable instructions, a memory, and a computer program including instructions executable by the at least one processor to create an application comprising: a) a software module obtaining emergency data for a plurality of emergencies, the emergency data comprising emergency location and emergency time; b) a software module generating at least one prediction model for making at least one spatiotemporal emergency prediction using the emergency data; and c) a software module using the at least one prediction model to generate a spatiotemporal emergency prediction corresponding to a defined geographic area and a defined time period.

In certain embodiments, disclosed herein are non-transitory computer-readable storage media encoded with a computer program including instructions executable by at least one processor to create an emergency prediction application comprising: a) a software module obtaining emergency data comprising emergency type, emergency location, and emergency time for a plurality of emergency communications; b) a software module generating at least one prediction model for making at least one spatiotemporal emergency prediction using the emergency data; and c) a software module using the at least one prediction model to generate a spatiotemporal emergency prediction corresponding to a defined emergency type, a defined geographic area, and a defined time period. In some embodiments, the at least one prediction model is generated using a point cloud comprising current emergency data.

In certain embodiments, disclosed herein are non-transitory computer-readable storage media encoded with a computer program including instructions executable by at least one processor to create an emergency prediction application comprising: a) a software module obtaining emergency data for a plurality of emergencies, the emergency data comprising emergency location and emergency time; b) a software module generating at least one prediction model for making at least one spatiotemporal emergency prediction using the emergency data; and c) a software module using the at least one prediction model to generate a spatiotemporal emergency prediction corresponding to a defined geographic area and a defined time period.

In certain embodiments, disclosed herein are emergency prediction systems comprising: at least one processor, an operating system configured to perform executable instructions, a memory, and a computer program including instructions executable by the at least one processor to create an application comprising: a) a software module obtaining unlabeled emergency data; b) a software module obtaining historical labeled emergency data originating from at least one emergency dispatch center, said historical labeled emergency data comprising emergency type and emergency priority; c) a software module matching at least a subset of the unlabeled emergency data with at least a subset of the historical labeled emergency data; and d) a software module merging the at least a subset of the unlabeled emergency data with the at least a subset of the historical labeled emergency data to generate matched emergency data.

In certain embodiments, disclosed herein are non-transitory computer-readable storage media encoded with a computer program including instructions executable by at least one processor to create an emergency prediction application comprising: a) a software module obtaining unlabeled emergency data; b) a software module obtaining historical labeled emergency data originating from at least one emergency dispatch center, said historical labeled emergency data comprising emergency type and emergency priority; c) a software module matching at least a subset of the unlabeled emergency data with at least a subset of the historical labeled emergency data; and d) a software module merging the at least a subset of the unlabeled emergency data with the at least a subset of the historical labeled emergency data to generate matched emergency data.

In certain embodiments, disclosed herein are emergency anomaly prediction systems comprising at least one processor, an operating system configured to perform executable instructions, a memory, and a computer program including instructions executable by the at least one processor to create an application comprising: a) a software module obtaining emergency data for current or ongoing emergency communications, said emergency data comprising emergency time and emergency location; b) a software module obtaining an emergency anomaly detection algorithm for monitoring the emergency communications to identify the emergency anomaly; and c) a software module executing the emergency anomaly detection algorithm to identify the emergency anomaly based on the emergency data, said emergency anomaly comprising a cluster of emergency communications.

In certain embodiments, disclosed herein are non-transitory computer-readable storage media encoded with a computer program including instructions executable by at least one processor to create an emergency anomaly prediction application comprising: a) a software module obtaining emergency data for current or ongoing emergency communications, said emergency data comprising emergency time and emergency location; b) a software module obtaining an emergency anomaly detection algorithm for monitoring the emergency communications to identify the emergency anomaly; and c) a software module executing the emergency anomaly detection algorithm to identify the emergency anomaly based on the emergency data, said emergency anomaly comprising a cluster of emergency communications.

In certain embodiments, disclosed herein are emergency resource allocation systems comprising at least one processor, an operating system configured to perform executable instructions, a memory, and a computer program including instructions executable by the at least one processor to create an application comprising: a) a software module obtaining at least one spatiotemporal emergency prediction; b) a software module obtaining at least one estimated response time prediction corresponding to the at least one spatiotemporal emergency prediction; c) a software module obtaining local emergency resource allocation data; and d) a software module using an allocation algorithm to generate a recommendation for optimal allocation of local emergency resources based on the at least one spatiotemporal emergency prediction, the at least one estimated response time prediction, and the local emergency resource allocation data.

In certain embodiments, provided herein are non-transitory computer-readable storage media encoded with a computer program including instructions executable by at least one processor to create an emergency resource allocation application comprising: a) a software module obtaining at least one spatiotemporal emergency prediction; b) a software module obtaining at least one estimated response time prediction corresponding to the at least one spatiotemporal emergency prediction; c) a software module obtaining local emergency resource allocation data; and d) a software module using an allocation algorithm to generate a recommendation for optimal allocation of local emergency resources based on the at least one spatiotemporal emergency prediction, the at least one estimated response time prediction, and the local emergency resource allocation data.

In certain embodiments, disclosed herein are methods of creating a prediction model for generating at least one spatiotemporal emergency prediction, the method comprising: a) obtaining, by an emergency prediction system (EPS), emergency data comprising emergency type, emergency location, and emergency time for a plurality of emergency communications; b) augmenting, by the emergency prediction system, the emergency data with additional data associated with the plurality of emergency communications based on at least one of emergency time, emergency location, and calling identity; c) generating, by the emergency prediction system, at least one prediction model for making at least one spatiotemporal emergency prediction using the emergency data; and d) using, by the emergency prediction system, the at least one prediction model to generate at least one spatiotemporal emergency prediction corresponding to a defined emergency type, a defined geographic area, and a defined time period.

In certain embodiments, disclosed herein are emergency prediction systems (EPS) comprising at least one processor, an operating system configured to perform executable instructions, a memory, and a computer program including instructions executable by the at least one processor to create an application comprising: a) a software module obtaining emergency data comprising emergency type, emergency location, and emergency time for a plurality of emergency communications; b) a software module augmenting the emergency data with additional data associated with the plurality of emergency communications based on at least one of emergency time, emergency location, and calling identity; c) a software module generating at least one prediction model for making at least one spatiotemporal emergency prediction using the emergency data; and d) a software module using the at least one prediction model to generate at least one spatiotemporal emergency prediction corresponding to a defined emergency type, a defined geographic area, and a defined time period.

In certain embodiments, disclosed herein are non-transitory computer-readable storage media encoded with a computer program including instructions executable by at least one processor to create an emergency prediction application comprising: a) a software module obtaining emergency data comprising emergency type, emergency location, and emergency time for a plurality of emergency communications; b) a software module augmenting the emergency data with additional data associated with the plurality of emergency communications based on at least one of emergency time, emergency location, and calling identity; c) a software module generating at least one prediction model for making at least one spatiotemporal emergency prediction using the emergency data; and d) a software module using the at least one prediction model to generate at least one spatiotemporal emergency prediction corresponding to a defined emergency type, a defined geographic area, and a defined time period.

In certain embodiments, disclosed herein are methods for detecting an emergency anomaly, comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications.

In certain embodiments, disclosed herein are emergency prediction systems (EPS) comprising at least one processor, an operating system configured to perform executable instructions, a memory, and a computer program including instructions executable by the at least one processor to create an application comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications.

In certain embodiments, disclosed herein are non-transitory computer-readable storage media encoded with a computer program including instructions executable by at least one processor to create an emergency prediction application comprising: a) obtaining, by an emergency prediction system, emergency data for current emergency communications, said emergency data comprising emergency time and emergency location; b) providing, by the emergency prediction system, an emergency anomaly detection algorithm for monitoring the emergency communications to identify the emergency anomaly; and c) executing, by the emergency prediction system, the emergency anomaly detection algorithm to identify the emergency anomaly based on the emergency data, said emergency anomaly comprising a cluster of emergency communications.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Existing filings, for example, PCT application No. PCT/US2015/050609, titled METHOD AND SYSTEM FOR EMERGENCY CALL MANAGEMENT, disclose systems, methods, and media that take advantage of Voice over Internet Protocol (VoIP) technology to make emergency calls to EDCs that include indications of the exact geographic locations of subject communication devices used to place the emergency calls.

Certain Terminologies

As referenced herein, an "emergency prediction system" refers to a system that applies a prediction algorithm or prediction model to data (e.g., historical emergency, environmental, and event data) in order to generate predictions.

As referenced herein, an "emergency communication" or "emergency call" refers to a communication between a user and a recipient of the communication. In some embodiments, the recipient is an emergency service (e.g., EDC, PSAP, emergency response personnel, etc). In some embodiments, the recipient is a public emergency service or a private emergency service. In some embodiments, the recipient is a non-emergency service. In some embodiments, the recipient is a an emergency operations center like a fleet management group, corporate security ops center, or insurance company management center. In some embodiments, the communication is a digital or analog phone call. In some embodiments, the communication is a message such as a text message or SMS. In some embodiments, the communication is a data stream. In some embodiments, the communication is a phone call, a message, a data stream, or any combination thereof. In some embodiments, the communication comprises a phone call, a message, a data stream, or any combination thereof.

As referenced herein, "call data" refers to information associated with a communication between a user and a recipient. In some embodiments, call data includes labeled call data, unlabeled call data, matched call data, augmented call data, or other forms of information regarding the communication. As used herein, a communication is not limited to voice or data calls. In some embodiments, the communication comprises an alert, a message, a data packet, a data stream, or other forms of digital or analog communications. Accordingly, in some embodiments, call data includes non-call information.

As referenced herein, "municipalities" and "counties" refer to a local government or an administrative division of a state that will be responsible for providing dispatchers, first responders, or emergency response personnel during emergency situations. A "county" refers to a political and administrative division of a state in both urban and rural areas. In contrast, a "municipality" refers to a town or district that has local government particularly in population centers including incorporated cities, towns, villages and other types of municipalities. Depending on the location, emergency response for different types of emergencies may be provided by either the municipality or the county administration.

As referenced herein, "emergency service providers" may include organizations and institutions that may provide assistance in an emergency. For example, law enforcement, fire, emergency medical services commonly handle many emergency requests. In addition, specialized services may also be included, such as Coast Guard, Emergency management, HAZ-MAT, Emergency roadside assistance, animal control, poison control, social services, etc. Emergency service providers, emergency response personnel, emergency dispatch center, and public safety access points may be used to refer to the organizations, systems, and/or personnel that provide emergency response services and/or coordination of such services.

As referenced herein, an "Emergency Management System ("EMS") refers to a system that receives and processes emergency alerts from subjects and forwards them to the EDC. Various embodiments of the EMS are described in U.S. patent application Ser. No. 14/856,818, and incorporated herein by reference. The "Emergency Dispatch Center ("EDC") refers to the entity that receives the emergency alert and coordinates the emergency assistance. In some embodiments, the EDC is a public organization run by the municipality, county, or city, or alternatively, is a private organization. In some embodiments, emergency assistance (e.g., emergency response personnel and/or resources) is provided is in the form of medical, caregiver(s), firefighting, police, military, paramilitary, border patrol, lifeguard, security services, or any combination thereof. In some embodiments, an EDC is a public safety answering point ("PSAP"). Generally, the EDC and EMS are distinct entities. In some embodiments, the EDC comprises an EMS integrated into the EDC.

As referenced herein, "predictive analytics" refers to the use of statistical and/or modeling techniques to predict future events based on current and/or historical data. In some embodiments, predictive analytics also refers to methods used to mathematically describe events. In some embodiments, predictive analytics also refers to analytical methods used to make decisions and optimize processes.

As referenced herein, "geographic area," "geographic location," "area," "location," all refer to a geographic point or area. In some embodiments, a location is an exact latitudinal and longitudinal coordinate or an area encompassing, for example, a city block, a neighborhood, a city, a county, a stretch of highway, a park, a recreation area, a sports stadium, a convention center, an area block (e.g., a 1×1 square mile area block), or other area. In some embodiments, a "geographic area" is used in the context of a "defined geographic area" corresponding to a risk prediction. In some embodiments, a geographic area comprises one or more locations. For example, in some embodiments, a defined geographic area that is a county comprises a plurality of neighborhood locations.

As referenced herein, "data" refers to electronic information. In some embodiments, data is emergency data (e.g., data relating to one or more emergencies or emergency communications). In some embodiments, data is divided into current and historical data. In some embodiments, current data refers to relatively recent data (e.g., within the past 15 minutes), while historical data refers to relatively old data (e.g., older than 15 minutes). In some embodiments, current data comprises real-time and near real-time data.

As referenced herein, "data stream" refers to incoming data being sent and/or received. In some embodiments, a data stream comprises current emergency data. In some embodiments, a data stream refers to incoming emergency communications/data.

As used herein, "variable" refers to a parameter used within a model. For example, a linear regression model having a formula $Y=C_0+C_1x_1+C_2x_2$ has two predictor variables or parameters, x1 and x2, and coefficients for each parameter, $C_1$ and $C_2$ respectively. The predicted variable in this example is Y. In some embodiments, values are entered for each predictor variable or parameter in a model to generate a result for the dependent or predicted variable (e.g., Y).

As used herein, "average" refers to a statistical measure of a plurality of values. In some embodiments, an average is mean, median, or mode.

As used herein, "calling identity" refers to information that is used to identify a caller or calling device. In some embodiments, calling identity includes user name, phone number, email address, calling device identifier, network identifier, IP address, Electronic Serial Number, Media Access Control (MAC) address, Temporary Mobile Station Identifier (TMSI), IP address, or other identifying information. In some embodiments, calling device is not limited to devices making phone calls and includes devices sending emergency alerts or other emergency communications.

As used herein, "risk" refers to the likelihood of occurrence of an emergency, emergency event, or emergency request. A "risk prediction" refers to a predicted likelihood of occurrence of an emergency, emergency event, or emergency request corresponding to at least one of a defined emergency type, a defined geographic area, or a defined time period that is generated by one or more prediction models described herein.

For example, a risk prediction for traffic accident emergencies (defined emergency) in county A (defined geographic area) during the time period of 12 PM-9 PM on a non-holiday weekday (defined time period) may be about 24 emergency requests (risk prediction). A risk prediction is calculated using a prediction model generated by an algorithm. The algorithm may statistical tools/methods to compare historical data for emergencies with historical data on environmental conditions and events in order to generate a prediction model that correlates the relationship between environmental conditions and/or events with the number of emergencies. The algorithm may also comprise machine learning methods in generating the prediction model. In some embodiments, a prediction model is a formula comprising parameters that determine the likelihood of a defined emergency. For example, in some embodiments, a prediction model is a multiple linear regression model or formula that generates a risk prediction for the total number of all emergency calls (including emergency incidents) within the city limits of city B for next Friday when data corresponding to environmental condition(s) (e.g., expected rainfall) and/or event(s) (e.g., grand opening of a museum downtown) inside city B next Friday is entered into the model. In some embodiments, a prediction model is a classifier or trained algorithm generated by the application of a machine learning algorithm to a data set comprising emergency, environmental, and event data.

As used herein, "notification," "warning," or "warning signal" refers to a message containing information of predictions. In some embodiments, a notification or warning comprises additional information, such as, for example, advice for escaping, resolving, mitigating, or reducing the likelihood of occurrence of the risk or emergency situation.

Predictive Analytics Overview

The systems, methods, and media provided in the present disclosure as described herein allow for the application of an algorithm towards emergency data to generate one or more prediction models for making predictions. In some embodiments, a prediction comprises a predicted number of emergencies or emergency communications. In some embodiments, a prediction corresponds to one or more of a defined emergency type, a defined geographic area, or a defined time period. An example of such a prediction is 50 predicted emergency calls for medical emergencies in municipality ABC during a date XYZ. In some embodiments, the prediction model is based on a particular emergency type and makes predictions corresponding to the emergency type. Alternatively, in some embodiments, the prediction model is not based on a particular emergency type and represents a generalized prediction model.

In some embodiments, an emergency type is a police emergency. In some embodiments, an emergency type is a fire emergency. In some embodiments, an emergency type is a medical emergency. In some embodiments, an emergency type is a vehicle emergency (e.g., a traffic accident). In some embodiments, an emergency type includes more than one of a police emergency, fire emergency, or medical emergency. In some embodiments, an emergency type includes more than one of a police emergency, a fire emergency, a medical emergency, or a vehicle emergency. In some embodiments, emergency data comprises one or more emergency types defined by an emergency dispatch center from which the emergency data is obtained. In some embodiments, an emergency type is a terrorism emergency, a natural disaster emergency, or an industrial accident emergency. In some embodiments, an emergency type is defined for purposes of obtaining a prediction for the defined emergency type.

In some embodiments, a geographic area comprises a city block, a neighborhood, a city, a county, a stretch of highway, a park, a recreation area, a sports stadium, a convention center, an area block, or other geographic area. In some embodiments, a geographic area comprises an area block. In some embodiments, a geographic area is an area block. In some embodiments, a geographic area is divided into a locational grid ("grid") comprising one or more area blocks. In some embodiments, a geographic area comprises one or more area blocks. In some embodiments, an area block is a square, a rectangle, a diamond, a hexagon, or some other geometric shape. In some embodiments, an area blocks inside a grid have the same shape and/or area. In some embodiments, area blocks inside a grid do not share the same shape and/or area. In some embodiments, a geographic area is defined for purposes of obtaining a prediction for the defined geographic area.

In some embodiments, an area block is no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 square kilometers. In some embodiments, an area block is at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 or more square kilometers. In some embodiments, an area block is about 1 square kilometer to about 50 square kilometers. In some embodiments, an area block is at least about 1 square kilometer. In some embodiments, an area block is at most about 50 square kilometers. In some embodiments, an area block is about 1 square kilometer to about 2 square kilometers, about 1 square kilometer to about 3 square kilometers, about 1 square kilometer to about 4 square kilometers, about 1 square kilometer to about 5 square kilometers, about 1 square kilometer to about 10 square kilometers, about 1 square kilometer to about 15 square kilometers, about 1 square kilometer to about 20 square kilometers, about 1 square kilometer to about 25 square kilometers, about 1 square kilometer to about 30 square kilometers, about 1 square kilometer to about 40 square kilometers, about 1 square kilometer to about 50 square kilometers, about 2 square kilometers to about 3 square kilometers, about 2 square kilometers to about 4 square kilometers, about 2 square kilometers to about 5 square kilometers, about 2 square kilometers to about 10 square kilometers, about 2 square kilometers to about 15 square kilometers, about 2 square kilometers to about 20 square kilometers, about 2 square kilometers to about 25 square kilometers, about 2 square kilometers to about 30 square kilometers, about 2 square kilometers to about 40 square kilometers, about 2 square kilometers to about 50 square kilometers, about 3 square kilometers to about 4 square kilometers, about 3 square kilometers to about 5 square kilometers, about 3 square kilometers to about 10 square kilometers, about 3 square kilometers to about 15 square kilometers, about 3 square kilometers to about 20 square kilometers, about 3 square kilometers to about 25 square kilometers, about 3 square kilometers to about 30 square kilometers, about 3 square kilometers to about 40 square kilometers, about 3 square kilometers to about 50 square kilometers, about 4 square kilometers to about 5 square kilometers, about 4 square kilometers to about 10 square kilometers, about 4 square kilometers to about 15 square kilometers, about 4 square kilometers to about 20 square kilometers, about 4 square kilometers to about 25 square kilometers, about 4 square kilometers to about 30 square kilometers, about 4 square kilometers to about 40 square kilometers, about 4 square kilometers to about 50 square kilometers, about 5 square kilometers to about 10 square kilometers, about 5 square kilometers to about 15 square kilometers, about 5 square kilometers to about 20 square kilometers, about 5 square kilometers to about 25 square kilometers, about 5 square kilometers to about 30 square kilometers, about 5 square kilometers to about 40 square kilometers, about 5 square kilometers to about 50 square kilometers, about 10 square kilometers to about 15 square kilometers, about 10 square kilometers to about 20 square kilometers, about 10 square kilometers to about 25 square kilometers, about 10 square kilometers to about 30 square kilometers, about 10 square kilometers to about 40 square kilometers, about 10 square kilometers to about 50 square kilometers, about 15 square kilometers to about 20 square kilometers, about 15 square kilometers to about 25 square kilometers, about 15 square kilometers to about 30 square kilometers, about 15 square kilometers to about 40 square kilometers, about 15 square kilometers to about 50 square kilometers, about 20 square kilometers to about 25 square kilometers, about 20 square kilometers to about 30 square kilometers, about 20 square kilometers to about 40 square kilometers, about 20 square kilometers to about 50 square kilometers, about 25 square kilometers to about 30 square kilometers, about 25 square kilometers to about 40 square kilometers, about 25 square kilometers to about 50 square kilometers, about 30 square kilometers to about 40 square kilometers, about 30 square kilometers to about 50 square kilometers, or about 40 square kilometers to about 50 square kilometers.

In some embodiments, an area block is no more than about 10, 50, 100, 200, 300, 400, 500, 600, 700, 800, 900, or 1000 square meters, including increments therein. In some embodiments, an area block is at least about 10, 50, 100, 200, 300, 400, 500, 600, 700, 800, 900, or 1000 or more square meters, including increments therein. In some embodiments, an area block is about 10 square meters to about 1,000 square meters. In some embodiments, an area block is at least about 10 square meters. In some embodiments, an area block is at most about 1,000 square meters. In some embodiments, an area block is about 10 square meters to about 50 square meters, about 10 square meters to about 100 square meters, about 10 square meters to about 200 square meters, about 10 square meters to about 300 square meters, about 10 square meters to about 400 square meters, about 10 square meters to about 500 square meters, about 10 square meters to about 600 square meters, about 10 square meters to about 700 square meters, about 10 square meters to about 800 square meters, about 10 square meters to about 900 square meters, about 10 square meters to about 1,000 square meters, about 50 square meters to about 100 square meters, about 50 square meters to about 200 square meters, about 50 square meters to about 300 square meters, about 50 square meters to about 400 square meters, about 50 square meters to about 500 square meters, about 50 square meters to about 600 square meters, about 50 square meters to about 700 square meters, about 50 square meters to about 800 square meters, about 50 square meters to about 900 square meters, about 50 square meters to about 1,000 square meters, about 100 square meters to about 200 square meters, about 100 square meters to about 300 square meters, about 100 square meters to about 400 square meters, about 100 square meters to about 500 square meters, about 100 square meters to about 600 square meters, about 100 square meters to about 700 square meters, about 100 square meters to about 800 square meters, about 100 square meters to about 900 square meters, about 100 square meters to about 1,000 square meters, about 200 square meters to about 300 square meters, about 200 square meters to about 400 square meters, about 200 square meters to about 500 square meters, about 200 square meters to about 600 square meters, about 200 square meters to about 700 square meters, about 200 square meters to about 800 square meters, about 200 square meters to about 900 square meters, about 200 square meters to about 1,000 square meters, about 300 square meters to about 400 square meters, about 300 square meters to about 500 square meters, about 300 square meters to about 600 square meters, about 300 square meters to about 700 square meters, about 300 square meters to about 800 square meters, about 300 square meters to about 900 square meters, about 300 square meters to about 1,000 square meters, about 400 square meters to about 500 square meters, about 400 square meters to about 600 square meters, about 400 square meters to about 700 square meters, about 400 square meters to about 800 square meters, about 400 square meters to about 900 square meters, about 400 square meters to about 1,000 square meters, about 500 square meters to about 600 square meters, about 500 square meters to about 700 square meters, about 500 square meters to about 800 square meters, about 500 square meters to about 900 square meters, about 500 square meters to about 1,000 square meters, about 600 square meters to about 700 square meters, about 600 square meters to about 800 square meters, about 600 square meters to about 900 square meters, about 600 square meters to about 1,000 square meters, about 700 square meters to about 800 square meters, about 700 square meters to about 900 square meters, about 700 square meters to about 1,000 square meters, about 800 square meters to about 900 square meters, about 800 square meters to about 1,000 square meters, or about 900 square meters to about 1,000 square meters.

In some embodiments, a time period is a time of the day, a day of the week, a day of the month, a holiday, a duration of an environmental event (e.g., blizzard), or other time duration. In some embodiments, a time period is defined for purposes of obtaining a prediction corresponding to the defined time period. In some embodiments, a time period is regularly occurring, such as for example, a holiday that occurs once a year. In some embodiments, a regularly occurring defined time period is a certain time of the day, such as for example, between 5 PM and 7 PM during weekdays (e.g., rush hour). In some embodiments, a time period comprises at least one time block. In some cases, a 24 hour time period is divided into a plurality of time blocks. In some embodiments, the plurality of time blocks comprise time blocks of equal length. Alternatively, in some embodiments, the plurality of time blocks comprise time blocks of unequal length. In some embodiments, a time block is at least about 1, 2, 3, 4, 5, 6, 7, 8, 9, 10, 11, 12, 13, 14, 15, 16, 17, 18, 19, 20, 21, 22, 23, or 24 hours. In some embodiments, a time block is no more than about 1, 2, 3, 4, 5, 6, 7, 8, 9, 10, 11, 12, 13, 14, 15, 16, 17, 18, 19, 20, 21, 22, 23, or 24 hours. In some embodiments, a time block is at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes. In some embodiments, a time block is no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes. In some embodiments, a time block is a specific subset of a 24 hour time period. For example, in some embodiments, a time block comprises 12 AM-1 AM, 1 AM-2 AM, 2 AM-3 AM, 3 AM-4 AM, 4 AM-5 AM, 5 AM-6 AM, 6 AM-7 AM, 7 AM-8 AM, 8 AM-9 AM, 9 AM-10 AM, 10 AM-11 AM, 11 AM-12 PM, 12 PM-1 PM, 1 PM-2 PM, 2 PM-3 PM, 3 PM-4 PM, 4 PM-5 PM, 5 PM-6 PM, 6 PM-7 PM, 7 PM-8 PM, 8 PM-9 PM, 9 PM-10 PM, 10 PM-11 PM, and 11 PM-12 AM, or any combination thereof. In some embodiments, a defined time period comprises a time of year. In some embodiments, a time period comprises a season selected from summer, fall, winter, spring, or any combination thereof. In some embodiments, a time period comprises one or more days in the week. In some embodiments, a defined time period comprises at least one day in the week selected from Monday, Tuesday, Wednesday, Thursday, Friday, or any combination thereof. In some embodiments, a time period comprises at least one day in the weekend selected from Saturday and Sunday. In some embodiments, a time period comprises one or more months of the year. In some embodiments, a defined time period comprises at least one month of the year selected from January, February, March, April, May, June, July, August, September, October, November, and December. In some embodiments, a time period comprises at least one week of the year. In some embodiments, a time period comprises at least one week of the year selected from week 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, and 52. An illustrative example of a time period comprises non-holiday Fridays in January and February between 5 PM and 7 PM.

In some embodiments, at least one of emergency type, geographic area, and time period are defined. In some embodiments, a subject (e.g., a user) directly accesses an emergency prediction system, platform, or media to request a risk prediction by providing at least one of a defined emergency type, a defined geographic area, and a defined time period. As an example, in some embodiments, a subject is a passenger in a motor vehicle on the freeway wishing to know the risk prediction for an accident for the next 50 mile stretch of freeway. In some embodiments, a subject is an emergency management system, a public safety answering point, an emergency dispatch center, an emergency response personnel, or a user or administrator thereof. In some embodiments, at least one of a defined emergency type, a defined geographic area, and a defined time period is predefined for automatic generation of at least one prediction model and/or one or more risk predictions. For example, in some embodiments, an emergency management system administrator ("admin") wanting to obtain daily predictions for each area block of a county for all police and fire related emergencies is able to define the geographic area based on area blocks, define the time period as a full day, and the emergency type as police and fire emergencies when requesting the daily emergency predictions.

Environmental conditions such as weather may have an impact on the number of emergencies within the geographic area during a specific time period. Likewise, events such as a sports game may also have an effect. Weather conditions such as air temperature, wind speed, precipitation, fog, pavement temperature and condition, water level, and other conditions may impact emergencies such as traffic accidents. In addition, various non-environmental events may have an impact on the number of emergencies. For example, Thanksgiving week is one of the deadliest weeks of the year due to the spike in traffic accidents. Various factors may be responsible for large number of car crashes during the week of Thanksgiving including the increased number of vehicles on the roads, drivers navigating unfamiliar roads, driving in the evening and/or under the influence. In addition to traffic accidents, there are many medical emergencies associated with Thanksgiving including knife wounds, burns, food poisoning, overconsumption, and more. In some embodiments, certain events such as football games, baseball games, basketball games, concerts and festivals are associated with increase in certain types of emergencies. For example, sports events such as baseball games are associated with emergency rooms filling up with cases of alcohol poisoning, bodily trauma, chest or stomach pain. The systems, methods, and media provided in the present disclosure as described herein organize and process this emergency, environmental, and event data to generate prediction models that quantify this relationship between emergencies and environmental conditions and events in order to generate risk predictions.

In some embodiments, the systems, methods, and media described herein are customizable by an admin, a user, an EMS, or an EDC to automatically provide one or more predictions on a regular basis. In some embodiments, the systems, methods, and media described herein are customized to provide automatic warnings specific to one or more subjects or users who are not associated with the emergency response systems or personnel.

In some embodiments, the systems, methods, and media of the present disclosure enable an EMS or EDC to issue warnings or notifications of elevated risk for specified emergencies based on risk predictions. In some embodiments, the notifications are sent specifically to subjects or individuals who are within the scope of the risk prediction (e.g., located within the defined geographic area during the defined time period). In some embodiments, notifications are sent to the communication devices of one or more subjects with the goal of providing pre-emptive warning to minimize any potential injury or damage that may be caused by predicted emergency situations, and/or potentially prevent these situations from occurring at all. In some embodiments, a notification is sent automatically whenever a risk prediction exceeds a defined risk threshold. In some embodiments, a notification is sent automatically whenever a risk prediction exceeds a defined risk threshold by a minimum percentage. In some embodiments, a minimum percentage is at least 10%, 15%, 20%, 25%, 30%, 35%, 40%, 45%, 50%, 60%, 70%, 80%, 90%, 95%, or 99% or more, including increments therein. In some embodiments, a defined risk threshold is an arbitrary value set by an administrator, user, EMC, EDC, or subject.

In some embodiments, a notification comprises information regarding an increased probability of certain types of emergencies, their possible time duration and geographic region of impact and possible methods for a subject to whom the warning is sent to mitigate impact of emergency situations. In some embodiments, a notification is non-specific to any one subject, but is sent to particular subject communication devices based on the location of the communication devices at the time of a predicted increase in probability of an emergency occurring at or proximate the location of the subject communication devices.

In some embodiments, a notification communicates information about changes in traffic pattern on certain highways or roadways in a specific geographic location and may further communicate suggestions for alternate routes to a subject through the communication device. For example, switching to one of the suggested alternate routes allows a subject to reduce the probability of a traffic based delay or other traffic-based incident.

In some embodiments, the notification comprises information about weather-based events (e.g., heavy rain, thunderstorms, and snowstorms). In some embodiments a prediction model for predicting the probability of occurrence of emergency situations (e.g., emergencies/emergency calls) is trained using information provided to the prediction server about public events, for example, baseball games, basketball games, music concerts, and/or other public events in which a substantial number of people are simultaneously hosted in one particular geographic location, and information regarding a history of requests for emergency assistance placed from the same geographic area as the public events, during, before, or after occurrence of the public events. In some embodiments, a notification is sent to subjects in a geographic location proximate a type of public event responsive to the prediction model indicating an increased probability of an emergency event occurring in the geographic location and resulting from or correlated with occurrences of the type of public event.

Regression Analysis

In some embodiments, regression analysis is used to generate predictions such as, for example, estimated response time for an emergency communication. Regression analysis is a class of modeling techniques that uses data to establish a mathematical relationship between different variables (features). Regression analysis includes techniques that usually focus on understanding how the values of a "dependent or response" variable change when one or more "independent or predictor" variables change. In some embodiments, regression analysis is used to determine a dependent variable such as estimated response time based on predictor variables obtained from emergency data. In some embodiments, predictor variables include one or more of emergency type, emergency time, emergency location, environment data, event data, emergency resource data (e.g., type, location, and/or availability of emergency resources), or response time data.

In some embodiments, regression analysis is linear regression. In linear regression, the dependent variable is a numerical outcome. Predictions for the dependent variable are modeled using a linear combination of the predictor variables (or transformed predictor variables). The unknown model parameters are then estimated from the data. In some embodiments, linear regression analysis is used when at least one of the following assumptions is made: 1) the predictor variables should be in a linear relationship with the numerical dependent variable; 2) errors (residuals) should be independent and normally distributed; 3) there should be no or little multicollinearity (the predictor variables should not be in a linear relationship among themselves); 4) the variance of the errors (residuals) should be approximately the same across all levels of the predictor functions (homoscedasticity). In some embodiments, data for the predictor variables and the data for the dependent variable are the inputs of the model. In some embodiments, the output is a linear equation, fitted via Ordinary Least Squares (OLS), relating the predictor and response variables (or functions).

In some embodiments, when one or more dependent variables have discrete rather than continuous values, discrete choice models are used instead of multiple linear regression such as, for example, logistic regression, multinomial logistic regression, or probit regression.

In some embodiments, regression analysis is logistic regression. In logistic regression, the dependent variable is a binary outcome (e.g., yes/no, usually coded as 1/0). A logistic model is used to estimate the probability of the binary outcomes (instead of the exact outcome) based on one or more predictor variables. In some embodiments, for example, logistic regression allows a determination as to whether the presence of a feature (variable) increases the probability of a given outcome by a specific percentage. In some embodiments, a logarithm of the odds-ratio (which is the probability of the outcome of interest divided by the probability of the other outcome) is modeled as a linear combination of the predictor variables. In some embodiments, logistic regression is used when at least one of the following assumptions is made: 1) the predictor variables should be in a linear relationship with the logarithm of the odds ratio; 2) errors (residuals) should be independent and follow a logistic distribution; 3) there should be little multicollinearity (the predictor variables should not be in a linear relationship among themselves). In some embodiments, data for the dependent variables and the data for the predictor variables are the inputs of the model. In some embodiments, the output is a linear equation, fitted via Maximum Likelihood Estimation (MLE), relating the predictor variables and the logarithm of the odds-ratio. In some embodiments, multinomial and/or ordinal logistic regression is used for regression analysis when the dependent variables have more than two outcomes. In some embodiments, probit regression is used for regression analysis. Probit regression is similar to logistic regression, with a main difference being that the error term follows a logistic distribution with mean zero in the logistic model, whereas the error follows a normal distribution with mean zero in the probit model.

In some embodiments, a non-regression based analysis is used in the systems, methods, and media described herein. An example of a non-regression based analysis is time series analysis. Time series analysis comprises methods for analyzing time series data in order to extract meaningful statistics and other characteristics of the data. Time series forecasting uses a model to predict future values based on previously observed values.

In some embodiments, classification and regression trees (CART) are used to identify the statistical model that has maximum accuracy for predicting the value of a categorical dependent variable for a dataset consisting of categorical and continuous variables. In some embodiments, multivariate adaptive regression splines (MARS) is used to build a model stepwise linear regressions.

Machine Learning Algorithms

In some embodiments, the systems, methods, and media described herein use machine learning algorithms for training prediction models and/or making predictions. Machine learning explores the study and construction of algorithms that are capable of learning from and making predictions on data. In some embodiments, techniques used for generating models and/or making predictions include machine learning, neural networks, multilayer perceptron (MLP), support vector machines (SVM), radial basis function, Naïve Bayes, nearest neighbor, or geospatial predictive modeling.

In some embodiments, a machine learning algorithm uses a supervised learning approach. In supervised learning, the algorithm generates a function from labeled training data. Each training example is a pair consisting of an input object and a desired output value. In some embodiments, an optimal scenario allows for the algorithm to correctly determine the class labels for unseen instances. In some embodiments, a supervised learning algorithm requires the user to determine one or more control parameters. These parameters are optionally adjusted by optimizing performance on a subset, called a validation set, of the training set. After parameter adjustment and learning, the performance of the resulting function is optionally measured on a test set that is separate from the training set. Regression methods are commonly used in supervised learning.

In some embodiments, a machine learning algorithm uses an unsupervised learning approach. In unsupervised learning, the algorithm generates a function to describe hidden structures from unlabeled data (e.g., a classification or categorization is not included in the observations). Since the examples given to the learner are unlabeled, there is no evaluation of the accuracy of the structure that is output by the relevant algorithm. Approaches to unsupervised learning include: clustering, anomaly detection, and neural networks.

In some embodiments, a machine learning algorithm uses a semi-supervised learning approach. Semi-supervised learning combines both labeled and unlabeled data to generate an appropriate function or classifier. Semi-supervised learning is usually used in data augmentation.

In some embodiments, a machine learning algorithm uses a reinforcement learning approach. In reinforcement learning, the algorithm learns a policy of how to act given an observation of the world. Every action has some impact in the environment, and the environment provides feedback that guides the learning algorithm.

In some embodiments, a machine learning algorithm uses a transduction approach. Transduction is similar to supervised learning, but does not explicitly construct a function. Instead, tries to predict new outputs based on training inputs, training outputs, and new inputs.

In some embodiments, a machine learning algorithm uses a "learning to learn" approach. In learning to learn, the algorithm learns its own inductive bias based on previous experience.

In some embodiments, a machine learning algorithm is applied to new or updated emergency data to be re-trained to generate a new prediction model. In some embodiments, a machine learning algorithm or model is re-trained periodically. In some embodiments, a machine learning algorithm or model is re-trained non-periodically. In some embodiments, a machine learning algorithm or model is re-trained at least once a day, a week, a month, or a year or more. In some embodiments, a machine learning algorithm or model is re-trained at least once every 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more.

Spatiotemporal Prediction Methods

The systems, methods, and media described herein provide for the generation of spatiotemporal prediction models and/or algorithms for making predictions. Spatiotemporal models are possible when data is collected across time and space. In some embodiments, data inputs for the spatiotemporal model comprise a two dimensional location set (discrete or continuous) and a one-dimensional temporal set (discrete or continuous). For a continuous location model, in some embodiments, the output is a set of density estimates for each time value.

In some embodiments, spatiotemporal prediction models utilize a discrete location approach. Discrete location spatial modeling restricts attention to a finite set of known fixed locations, effectively discretizing space and turning the problem into a multivariate data analysis problem where each location represents a single dimension.

In some embodiments, spatiotemporal prediction models utilize a continuous location approach. For continuous models, the approach is to explore general distributional patterns. A simple approach to modeling spatial density is to use a single Gaussian density function. In some embodiments, a finite mixture of Gaussian densities provides additional flexibility (Gaussian mixture models). While mixture models can provide additional modeling power beyond that of a single Gaussian, it has a number of practical limitations. In some embodiments, a kernel density estimation (KDE) method is used for spatiotemporal prediction modeling. Kernel density estimation is a non-parametric method for estimating a density function from a random sample of data.

In some embodiments, spatiotemporal prediction models utilize a discrete and continuous time approach. In discrete and continuous time spatiotemporal models, time is considered either a discrete or continuous variable, with most methods for discrete time having extensions to continuous time.

Data Augmentation

Figure 2:
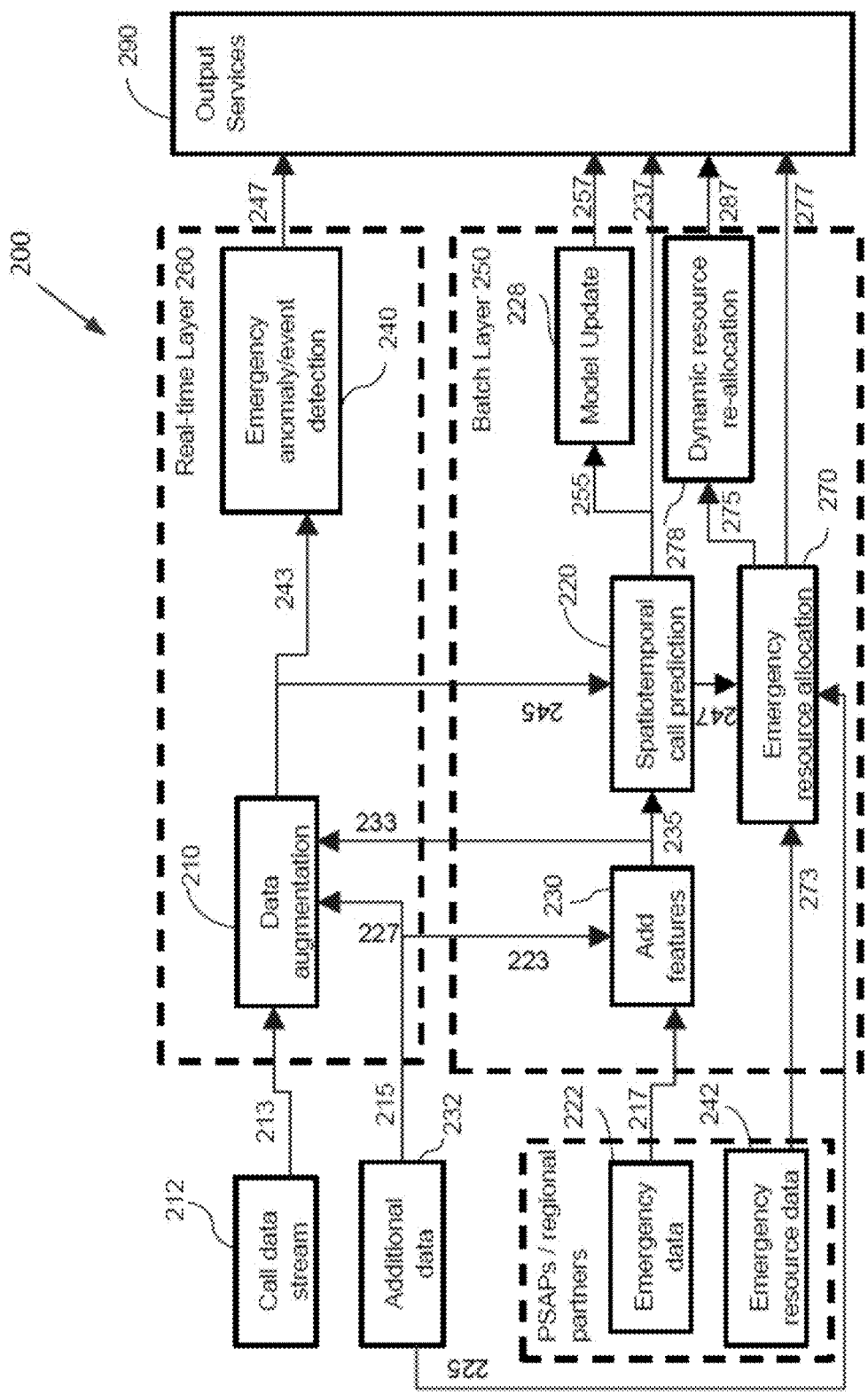
FIG. 2 illustrates an exemplary system flow for one embodiment of an emergency prediction system.

In some embodiments, the systems, methods, and media described herein provide for data augmentation. In some embodiments, data augmentation comprises predicting labels for unlabeled emergency data and incorporating or adding the predicted labels to the unlabeled emergency data to generate augmented emergency data. Fragmentation of emergency services often results in variation in the type of emergency data available in different areas. Moreover, the combination of public and private emergency service providers often leads to distinct pools of emergency data in the same emergency jurisdiction (e.g., a county or city). The lack of standardization and/or harmonization of these data pools pose a challenge to generating effective models. Consequently, the data pools have to be modeled separately, which often results in a loss of predictive power if a given data pool lacks sufficient data to generate a robust model. Moreover, in some instances, a data pool that is unlabeled cannot be used for certain models for generating predictions based on data labels. Accordingly, data augmentation allows unlabeled data to be enhanced with label predictions, thereby expanding the pool of available "labeled" data for further analysis and/or modeling. For example, in some embodiments, labeled data is matched with unlabeled data to generate matched data. In some embodiments, the matched data is used to train a prediction algorithm. The prediction algorithm In some embodiments, data augmentation comprises supplementing or augmenting emergency data with additional data/information such as environment data, event data, subject data, or any combination thereof. In some embodiments, augmented data does not comprise environmental data, event data, subject data, or any combination thereof. In some embodiments, additional data 232 forms an input into the system 200 as shown in FIG. 2. In some embodiments, additional data 232 is obtained from one or more public or privately available sources. In some embodiments, additional data 232 comprises environmental data. In some embodiments, environmental data is comprises information on traffic condition, weather condition, road condition, or any combination thereof. In some embodiments, additional data 232 comprises information about demographics, population density, etc., regarding the area, which is useful for making emergency prediction(s). In some embodiments, additional data 232 includes information about geographical or jurisdictional boundaries for PSAPs, counties, towns, cities, or other government borders. In some embodiments, additional data 232 includes information on a concert, sporting event, political demonstration, festival, In some embodiments, data augmentation utilizes heuristic extrapolation, wherein the relevant fields are updated or provided with extrapolated values. In some embodiments, data augmentation utilizes tagging, wherein common records are tagged to a group, making it easier to understand and differentiate for the group. In some embodiments, data augmentation utilizes aggregation, wherein values are estimated using means or other summaries for relevant fields. In some embodiments, data augmentation utilizes heuristic or analytical probabilities to populate values based on the probability of events. In some embodiments, emergency data is augmented by adding or incorporating additional data such as data that is likely to be relevant to an emergency. Examples of data likely to be relevant to an emergency include environmental data, event data, subject data, or any combination thereof. In some embodiments, augmenting emergency data comprises associating the emergency data with additional data using at least one of emergency type, geographic area (or location coordinates), and time period. For example, a subset of emergency data for traffic accidents is augmented with weather information that is in proximity to the geographic area and time period corresponding to the subset of emergency data. As a result, emergency data comprising traffic accident (emergency type), geographic area (location of accident), and time period (time of emergency communication relating to accident) is augmented to include weather conditions such as black ice on the road at the geographic location during the time period.

Emergency Anomaly or Event Detection

In some embodiments, the systems, methods, and media described herein provide for detection of emergency anomalies or events in real-time or near real-time. In some embodiments, emergency anomaly detection comprises the identification of items, events, or observations which do not conform to an expected pattern or other items in a dataset.

In some embodiments, an unsupervised anomaly detection technique is used to detect anomalies in an unlabeled test data set. In some embodiments, unsupervised anomaly detection looks for instances that seem to fit least to the remainder of the data set under the assumption that the majority of the instances in the data set are normal.

In some embodiments, a supervised anomaly detection technique is used to detect anomalies in a data set that has been labeled as "normal" and "abnormal" and involves training a classifier. A key difference compared to most other statistical classification problems is the inherent unbalanced nature of outlier detection.

In some embodiments, a semi-supervised anomaly detection technique is used to construct a model representing normal behavior from a given normal training data set, and then testing the likelihood of a test instance to be generated by the trained model.

In some embodiments, a density-based technique or cluster analysis is used for anomaly detection.

In some embodiments, an emergency anomaly is a large-scale disaster, accident, or attack. As referenced herein, "large-scale" refers to an event affecting more than a threshold number of people, animals, property, or any combination thereof. For example, in some embodiments, an event is large-scale if it affects more than 5, 10, 20, 30, 40, 50, 100, 200, 300, 400, 500, 600, 700, 800, 900, or 1000 or more, including increments therein, people, animals, properties, or any combination thereof. Examples of emergency anomalies include, but are not limited to, an earthquake, landslide, tsunami, volcanic activity, wildfire, large-scale fire, cyclone, tornado, hurricane, epidemic, extreme temperature, industrial accident, chemical spill, nuclear accident, terrorist attack, plane crash, oil spill, train derailment, snowstorm, thunderstorm, or large-scale transport accident.

In some embodiments, emergency anomaly detection is carried out for a location of a first member device belonging to a group of devices authorized to share data. In further embodiments, a notification of a detected emergency anomaly is sent to a second member device in the group of devices. In some embodiments, emergency anomaly detection is carried out for a first member device belonging to a group of devices based on information provided by a group of devices. In further embodiments, a proxy call is initiated on behalf of the first member device when an emergency anomaly is detected for the member device. In yet further embodiments, the proxy call is an emergency call to at least one of an emergency management system and an emergency dispatch center. In further embodiments, a proxy call is initiated on behalf of the first member device when an emergency anomaly is detected at a location of the first member device. In further embodiments, a proxy call is initiated on behalf of the first member device by a second member device in the group of devices when an emergency anomaly is detected for the first member device. In yet further embodiments, a location of the first member device is provided to a recipient of the proxy call. In yet further embodiments, the emergency data is provided to a recipient of the proxy call. In some embodiments, the emergency data is obtained from a group of devices comprising member devices authorized to share data. In some embodiments, the emergency prediction system executes the emergency anomaly detection algorithm in response to receiving a request to detect an emergency anomaly from a communications device. In some embodiments, the emergency prediction system executes the emergency anomaly detection algorithm in response to receiving a request to detect an emergency anomaly from a member device in a group of devices authorized to share data.

Resource Allocation

In some embodiments, the systems, methods, and media described herein provide for enhanced resource allocation. In some embodiments, resource allocation is optimized based on spatiotemporal prediction(s) and emergency resource data. In some embodiments, resource allocation is optimized using a prediction and simulation process. In some embodiments, resource allocation is optimized with the goal of minimizing emergency response times for a given set of emergency resources. In some embodiments, emergency response times are minimized while also minimizing operational costs or keeping operational costs low (e.g., below a certain cost threshold set by an administrator).

In some embodiments, resource allocation optimization comprises using a greedy algorithm. A greedy algorithm follows the problem solving heuristic of making the locally optimal choice at each stage with the hope of finding a global optimum. In some cases, a greedy strategy does not in general produce the optimal solution, but instead generates locally optimal solutions that approximate a global optimal solution in a reasonable time.

Data Summary

In some embodiments, data is emergency data. In some embodiments, emergency data comprises data for emergency communications such as, for example, emergency time (e.g., time of emergency call and/or call duration), emergency location (e.g., location of caller or calling device), emergency type (e.g., fire, police, or medical emergency), or any combination thereof. In some embodiments, emergency data is proprietary emergency data. In some embodiments, proprietary emergency data is unlabeled emergency data. In some embodiments, emergency data is unlabeled emergency data. Unlabeled emergency data has limited information such as, for example, emergency time and emergency location while lacking labels such as emergency type and/or emergency priority. In some embodiments, emergency data is labeled emergency data. Labeled emergency data has label information for emergency communications such as, for example, emergency type and/or emergency priority (e.g., low or high call priority). In some embodiments, labeled emergency data is obtained from at least one emergency dispatch center as historical data since current labeled emergency data is typically not available outside of the emergency dispatch center.

In some embodiments, data comprises electronic information stored on a server. In some embodiments, data comprises information obtained from communication devices such as, for example, a landline phone. In some embodiments, data comprises information obtained from wireless mobile devices such as, for example, a smart phone. In some embodiments, data comprises information stored in a database. In some embodiments, data comprises information for environmental conditions ("environment data") such as, for example, precipitation level or temperature. In some embodiments, data comprises information on events ("event data") such as, for example, the date of a holiday. In some embodiments, data comprises information on emergencies or emergency requests ("emergency data") such as, for example, the number of emergency calls, emergency requests, and/or emergency incidents. In some embodiments, data comprises historical data comprising information on past data. For example, in some embodiments, historical data comprises the emergency type, emergency location, and emergency time of one or more emergencies that has already taken place, and not an ongoing emergency or a predicted future emergency. In some embodiments, historical data comprises data that is at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 minutes old or more. In some embodiments, historical data is data that is at least 1, 2, 3, 4, 5, 6, 7, 8, 9, 10, 11, 12, 13, 14, 15, 16, 17, 18, 19, 20, 21, 22, 23, 24 hours old or more. In some embodiments, historical data is data that is at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days old or more. In some embodiments, historical data is data that is at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks old or more. In some embodiments, current data comprises current emergency data. For example, in some embodiments, current emergency data comprises at least one of emergency type, emergency time, and emergency location for an ongoing emergency/emergency communication. In some embodiments, current data is no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes old. In some embodiments, current data is data that is no more than 1, 2, 3, 4, 5, 6, 7, 8, 9, 10, 11, 12, 13, 14, 15, 16, 17, 18, 19, 20, 21, 22, 23, or 24 hours old. In some embodiments, current data is no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days old. In some embodiments, data comprises future data comprising information on future environmental conditions, events, emergencies, or any combination thereof. In some embodiments, future data is data on environmental conditions, events, or emergencies that have not yet occurred or are not yet in existence. For example, in some embodiments, future data comprises information on planned events such as a planned parade including the event type, event time (e.g., date, time of day, and/or duration), and event location.

In some embodiments, unlabeled emergency data is augmented by merging, combining, or incorporating label information from labeled emergency data. Augmented emergency data comprises data from both unlabeled emergency data and labeled emergency data. In some embodiments, unlabeled or labeled emergency data is augmented with additional information such as, for example, environment data and/or event data. In some embodiments, environment data and/or event data corresponding to emergency data is identified based on emergency time and emergency location. For example, environment data such as weather is capable of being identified based on a specific time and location. In some embodiments, augmented emergency data comprises emergency type, emergency time, emergency location, emergency priority, environment data, event data, or any combination thereof.

Emergency data refers to information about emergencies that have occurred or are on-going and optionally includes the type of emergency (such as medical, fire, police or car crashes), the location of the emergency (e.g., GPS coordinates, altitude, etc.), the time of the emergency (e.g., date and time), or any combination thereof. In some embodiments, additional information regarding the emergency is obtained including, but not limited to, fatalities, types of injuries, proximity to landmarks (such as sports stadiums), signal strength for emergency call, whether the subject was in a vehicle during the emergency, information about road conditions, number and effectiveness of emergency service providers involved, time for emergency response, etc. Emergency data may comprise historical data or current data.

In some embodiments, the emergency type is selected from vehicle/traffic emergency, fire emergency, police emergency, medical emergency, or any combination thereof. In some embodiments, a vehicle emergency is a flat tire, collision with another vehicle, collision with a wall or artificial barrier, collision with a tree or natural barrier, collision with a pedestrian, collision with a cyclist, collision with a motorcyclist, collision with a wild animal, collision with a domesticated animal, collision with a pet, rollover, or running off the road. In some embodiments, a medical emergency is a heart attack, cardiac arrest, stroke, seizure, anaphylactic shock, electrical shock, cut, abrasion, contusion, stab wound, gunshot wound, broken bone, poisoning, burn, bug bite or sting, snake bite, animal attack, concussion, dismemberment, drowning, death, or any combination thereof. In some embodiments, a police emergency type is robbery, armed robbery, attempted robbery, home invasion, battery, rape, arson, kidnapping, shooting, terrorist attack, or any combination thereof. In some embodiments, a fire emergency type is a home fire, building fire, wildfire, chemical spill, explosion, electrical fire, chemical fire, combustible metal fire, flammable liquids fire, solid combustibles fire, or any combination thereof.

In some cases, the emergency data comprises an emergency call log with basic information such as a timestamp, GPS coordinates, and type of emergency (e.g., as indicated by the subject). In other embodiments, the emergency data is the content of multi-media alerts sent by the subjects to the EMS within a time period. In some embodiments, the emergency data is the content of the emergency session with the EDC including details regarding the emergency.

In some embodiments, emergency data is sourced from one or more EMS that receives, routes, monitors, or bridges emergency calls. In some embodiments, the EMS serves as a conference bridge for emergency alerts and calls from subjects with emergency dispatch center(s) such as PSAPs. In addition, the emergency data is obtained from publicly available data about emergencies.

Environment data comprises information about one or more environmental conditions. For example, environmental conditions include temperature, precipitation (e.g., snow, hail, rain, sleet, etc.), thunderstorms, pressure, wind speed and/or direction, cloud conditions, extreme weather (such as tornadoes, high winds, hurricanes, frigid conditions etc.), earthquakes, wildfires, and more. In some embodiments, the environment data comprises road conditions (such as pavement temperature, black ice on bridges, road grip, curvature, obstructions, etc.) and traffic data (such as traffic density, direction of traffic, accidents, etc.). In some embodiments, environment data is stratified into two or more categories. For example, in some embodiments, temperature is stratified into cold, warm, and hot categories. In some embodiments, a cold temperature category is less than about 25, 24, 23, 22, 21, 20, 19, 18, 17, 16, 15, 14, 13, 12, 11, 10, 9, 8, 7, 6, 5, 4, 3, 2, 1, 0, −1, −2, −3, −4, −5, −6, −7, −8, −9, −10, −11, −12, −13, −14, −15, −16, −17, −18, −19, −20, −21, −22, −23, −24, or −25 degrees Celsius or lower. In some embodiments, a warm temperature category is between about 10-15, 15-20, 20-25, 25-30, 30-35 degrees Celsius, or any combination thereof. In some embodiments, a hot temperature category is at least about 20, 21, 22, 23, 24, 25, 26, 27, 28, 29, 30, 31, 32, 33, 45, 35, 36, 37, 38, 39, 40, 41, 42, 43, 44, or 45 degrees Celsius or higher.

In some embodiments, environment data is stratified into two categories indicating the presence or absence of an environmental condition. For example, temperature may be stratified into freezing and non-freezing temperature categories with freezing temperatures comprising temperatures at or below zero degrees Celsius, and non-freezing temperatures comprising temperatures above zero degrees Celsius. In some embodiments, environment data comprise environment type, environment location, and environment time for one or more environmental conditions. In some embodiments, the systems, methods, and media described herein process the environment data to obtain data pertaining to environment type, environment location, and environment time. In some embodiments, environment data values are matched to emergency data or emergency data stream(s) based on time and location. In some embodiments, environment data is sourced from one or more publicly accessible or private servers or databases. For example, climate data online is accessible via National Centers for Environmental Information for global historical weather or climate data.

Event data refers to information on one or more public or private events or holidays such as, for example, Thanksgiving or Christmas. In some embodiments, event data comprises information on event type, event location, and event time for one or more events. In some embodiments, event data includes information on a variety of event types such as, for example, festivals, concerts, public gatherings, sports events or games, conferences, workshops, conventions, and other events. In some embodiments, sports events are amateur or professional events. In some embodiments, the event is a recurring event such as, for example, Thanksgiving, Halloween, or the day of the week (e.g., Monday). Holidays may include national holidays. In some embodiments, the event may be man-made such as a holiday, Day Light Savings Time change, political elections, or other man-made events.

In some embodiments, event data is sourced from one or more private or public calendars. For example, some states, municipalities, public organizations have publicly available calendars such as the California Data Portal. Many private organizations have a schedule of events on their website or in brochures and promotional materials such as the Chicago Cubs organization.

Subject data refers to data from subjects, which is optionally obtained via their communication devices (such as mobile phones, wearable devices, etc.). In some embodiments, subject data includes historical or current locational information (e.g., GPS information or location within a building, etc.). In some embodiments, subject data may include subject's travel information including speed and direction of travel. In some embodiments, subject data comprises subject location such as, for example, GPS coordinates, altitude, direction of travel, speed of travel, mode of transportation (e.g., by car, plane, train, on foot, etc), or any combination thereof.

Predictive Analytics

FIG. 1 illustrates exemplary system components for an emergency prediction system 100. As shown in FIG. 1, several input data 112, 122, 132 enter the system 100 and output services 190 are generated in the batch layer 150 or a real-time layer 160. The call data stream 112 is a real-time stream of data of incoming emergency calls. In some embodiments, the call data stream 112 is a proprietary call data stream or a third-party call data stream (e.g., a third-party emergency call handler system or a data stream from a PSAP).

In some embodiments, the data stream 112 is obtained from a mobile application installed on a subject device. In some embodiments, when a subject requests emergency assistance or an emergency is detected automatically, an alert is sent from the subject device to an Emergency Management System (EMS) (not shown). In some embodiments, the system 100 is a component of the EMS. In other embodiments, the system 100 is a separate system that receives the data stream from the EMS, wherein the EMS or an Emergency Dispatch Center (EDC) (e.g., a PSAP) accesses an output or prediction via output services 190. Other embodiments without a mobile application are also contemplated.

In some embodiments, the data stream 112 indicates when an emergency call has been made with the time and location of the device. In some embodiments, each call entry in the data stream includes a time stamp (e.g., emergency time) and the location (e.g., latitude, longitude, elevation, physical address, floor or suite number, etc.). In some embodiments, the data stream includes additional information such as phone number, user name, saved address information, account information, demographics, medical information, etc. In some embodiments, the data stream 112 includes subject data. An exemplary data stream 112 is depicted in Table 1.

Emergency data 122 is one form of input provided to the system 100. In some embodiments, emergency data 122 is historical emergency call data from a state or region. In some embodiments, the emergency data 122 includes proprietary emergency data. In some embodiments, proprietary emergency data is sent from or originates from subject devices and is obtained from one or more databases in the EMS or other remote servers. In some embodiments, the proprietary emergency data is generated when real-time call data from the data stream 112 are saved in the Master Database 154. In some embodiments, the proprietary emergency data 124 is warehoused and updated in near real-time or on a periodic basis (hourly, weekly, etc.).

In some embodiments, the emergency data 122 is available emergency data obtained from publicly or privately available sources. For example, police calls in Seattle are available online (https://catalog.data.gov/dataset/seattle-real-time-fire-911-calls-6cdf3). In some embodiments, the emergency data 122 is obtained from partners or customers (such as EDCs, PSAPs, municipalities, private dispatch centers, etc.).

In some embodiments, the emergency data 122 is labeled emergency data. Labeled emergency data refers to emergency data that includes one or more labels for characterizing the type or nature (e.g., emergency type), priority (e.g., emergency priority), emergency response (e.g., emergency response time), or other labels relevant to an emergency situation. For example, in some embodiments, an emergency type includes fire, police, medical, car/traffic accident, pet rescue, water rescue, earthquake, avalanche, tsunami, or some other type of emergency, including those described elsewhere herein. In some embodiments, the priority for the emergency includes one or more levels for priority such as high, medium, low, or other priority level. In some embodiments, the labeled emergency data includes the actual response time for that particular emergency. Exemplary labeled data, which is optionally depicted as a data stream with predicted labels or labeled emergency data when available in real-time, is depicted in Tables 4, 5, and 6.

TABLE 5

Sample Labeled Emergency Data

| Event | Incident_Location | Initial_Emergency_Type | Initial_Emergency_Subtype | At_Scene_Time |
|---|---|---|---|---|
| 1 | (47.62083, −122.32594) | Theft | Other Property | Jan. 4, 2017 19:00 |
| 2 | (47.613758, −122.34716) | Theft | Other Property | Jan. 4, 2017 18:46 |
| 3 | (47.620354, −122.306046) | Residential Burglaries | Burglary | Jan. 4, 2017 15:59 |
| 4 | (47.56021, −122.38548) | Traffic Related Calls | Motor Vehicle Collision Investigation | Jan. 4, 2017 14:04 |
| 5 | (47.634743, −122.356285) | Parking Violations | Traffic Related Calls | Mar. 16, 2017 10:30 |
| 6 | (47.524677, −122.365875) | Crisis Call | Behavioral Health | Apr. 1, 2017 11:34 |
| 7 | (47.613235, −122.32947) | Suspicious Circumstances | Lewd Conduct | Apr. 18, 2017 19:31 |
| 8 | (47.71957, −122.337685) | Narcotics Complaints | Narcotics Complaints | Apr. 1, 2017 14:54 |
| 9 | (47.625435, −122.35083) | Commercial Burglaries | Burglary | Apr. 1, 2017 12:13 |
| 10 | (47.690567, −122.34586) | Threats, Harassment | Threats, Harassment | Apr. 1, 2017 17:34 |

TABLE 6

Sample Labeled Emergency Data

| Uid | Call_Time | Lat | Lon | Type | Priority | At_Scene_Time |
|---|---|---|---|---|---|---|
| e1b9f2 | 5/3/2017 0:00 | 33.12 | −117.08 | Fire | High | 5/3/17 0:17:20 |
| e1b9f2 | 5/3/2017 1:03 | 33.12 | −117.08 | Medical | Med | 5/3/17 1:07:08 |
| dc3b48 | 5/3/2017 5:27 | 33.12 | −117.08 | Fire | Med | 5/3/17 5:39:03 |
| 8f0b19 | 5/3/2017 13:39 | 34.02 | −118.43 | Police | Low | 5/3/17 13:51:06 |
| 6d9427 | 5/3/2017 16:49 | 29.76 | −95.37 | Fire | Med | 5/3/17 16:57:34 |
| 2087ce | 5/3/2017 22:33 | 26.22 | −98.31 | Medical | High | 5/3/17 22:39:04 |
| d35b93 | 5/3/2017 23:11 | 42.58 | −84.85 | Medical | Med | 5/3/17 23:22:44 |
| 027a9e | 5/4/2017 19:50 | 26.11 | −81.69 | Fire | High | 5/4/17 19:56:52 |
| 67c8c0 | 5/4/2017 20:00 | 35.56 | −82.64 | Fire | Low | 5/4/17 20:03:38 |
| 8f5ef2 | 5/4/2017 20:24 | 31.68 | −83.27 | Fire | High | 5/4/17 20:35:20 |

Examples of unlabeled data are provided in Table 7.

TABLE 7

Sample Unlabeled Emergency Data

| Call_Time | Priority | District | Description | Call_Number | Incident_Location | Location |
|---|---|---|---|---|---|---|
| 7/13/2015 10:41 | Med | CD | See Text | P151941002 | 0 N Calvert St | (39.2899299, −76.6123462) |
| 7/13/2015 10:47 | Med | CD | 911/No Voice | P151941003 | 600 E Fayette St | (39.2906737, −76.6071600) |
| 7/13/2015 10:42 | Med | CD | 911/No Voice | P151941004 | 200 E Baltimore St | (39.2898910, −76.6120720) |
| 7/13/2015 10:45 | Low | CD | Prkg Complaint | P151941005 | 800 Park Av | (39.2985163, −76.6184754) |
| 7/13/2015 10:46 | Med | SW | Auto Theft | P151941006 | 3500 Clifton Av | (39.3112130, −76.6763150) |
| 7/13/2015 10:47 | Med | ND | Family Disturb | P151941007 | 2700 N Calvert St | (39.3208510, −76.6147390) |
| 7/13/2015 10:46 | High | WD | Silent Alarm | P151941008 | 2100 W North Av | (39.3097096, −76.6513109) |
| 7/13/2015 10:49 | Low | SW | Auto Accident | P151941010 | 3100 Wilkens Av | (39.2756929, −76.6664179) |
| 7/13/2015 10:48 | Med | NE | Family Disturb | P151941011 | 4800 Gilray Dr | (39.3483090, −76.5768440) |
| 7/13/2015 10:49 | Med | ND | Narcotics | P151941012 | W Garrison Av/Pimlico Rd | (39.349653, −76.669145) |

Another input into the system 100 is additional data 132 obtained from one or more public or privately available sources. In some embodiments, additional data 132 is incorporated into emergency data. In some embodiments, emergency data comprises additional data 132. In some embodiments, emergency data is augmented by adding or incorporating additional data 132. In some embodiments, additional data 132 includes environmental data. In some embodiments, environmental data includes one or more of traffic condition, weather condition, and road condition.

In some embodiments, environmental data comprises information about one or more environmental conditions. For example, environmental conditions include temperature, precipitation (e.g., snow, hail, rain, sleet, etc.), thunderstorms, pressure, wind speed and/or direction, cloud conditions, extreme weather (such as tornadoes, high winds, hurricanes, frigid conditions etc.), earthquakes, wildfires, and more. In some embodiments, the environmental data comprises road conditions (such as pavement temperature, black ice on bridges, road grip, curvature, obstructions, etc.) and traffic data (such as traffic density, direction of traffic, accidents, etc.).

In some embodiments, weather conditions such as air temperature, wind speed, precipitation, fog, pavement temperature and condition, water level, and other conditions impact emergencies such as traffic accidents and cause a delay in emergency response. In some embodiments, weather information is obtained from third-party APIs provided by companies such as the Weather Channel Service (https://twcservice.mybluemix.net/rest-api/). In some embodiments, traffic information is obtained from third-party APIs. Non-limiting examples of third-party APIs include Google Waze and MapQuest.

In some embodiments, additional data 132 includes information about demographics, population density, and other information regarding the area. In some embodiments, additional data 132 is used for emergency prediction. Exemplary sources for additional data 132 include census and surveys, such as data provided by the U.S. Census Bureau using APIs (population estimates API: https://www.census.gov/data/developers/data-sets/popest-popproj/popest.html; map API: https://tigerweb.geo.census.gov/arcgis/rest/services/TIGERweb).

In some embodiments, additional data 132 comprises information about geographical or jurisdictional boundaries for PSAPs, counties, towns, cities, municipalities, military bases, or other governmental jurisdictions. In some embodiments, additional data 132 comprises zoning information and/or other boundaries (such as boundaries of a National Park, private commercial area, etc.). This information is generally static and is often helpful in predicting emergency response time. In some embodiments, visualizations of the emergency prediction are provided to a user or administrator (e.g., used to generate a virtual map for displaying emergency predictions, emergency resource allocations, and/or emergency anomalies). In some embodiments, the visualization is a spatiotemporal emergency prediction visualization. In some embodiments, a spatiotemporal emergency prediction visualization provides a visual representation of the prediction such as, for example, a density map of emergency events, emergency communications, emergency signals, or any combination thereof.

For some emergency predictions, geographical or jurisdictional boundary data is primarily used for filtering initial model inputs and enhancing outputs with geographic visualization. Also, in some embodiments, the input data is constrained to a city, census tract, or PSAP area level in the pre-processing steps by filtering the data using geographical or jurisdictional boundaries.

In some embodiments, additional data 132 comprises event data, which provides information regarding events such as, for example, the date of a holiday. In some events, event data comprises information about the date and location of a large gathering, such as a sporting event, concert, etc. Event data refers to information on one or more public or private events or holidays such as Thanksgiving or Christmas. In some embodiments, event data comprises information on event type, event location, and event time for one or more events. In some embodiments, event data includes information on a variety of event types such as, for example, festivals, concerts, public gatherings, sports events or games, conferences, workshops, conventions, and other events. In some embodiments, event data is sourced from one or more private or public calendars. For example, some states, municipalities, and public organizations have publicly available calendars such as the California Data Portal. Many private organizations have a schedule of events on their website or in brochures and promotional materials such as the Chicago Cubs organization. In some embodiments, when specific information about the event is not available, e.g., the time of the event, a forecast for the time is set based on previous such events.

In some embodiments, a model requires additional information to make accurate emergency predictions. In some embodiments, additional data and/or types of data are obtained from various publicly or privately available sources.

As shown, the data inputs 113, 115, 117 are able to enter the system 100 through a publish-subscriber messaging service 144. In some embodiments, the messaging service 144 is a publisher stream service for low-latency, real-time data dissemination. In some embodiments, the messaging service 144 is distributed across multiple nodes or servers using a distributed management service, such as Zookeeper. In some embodiments, additional functionality (e.g., efficient distribution across multiple nodes or servers) for the messaging service 144 is provided by commercially available software, such as Kafka. Using the messaging service 144, the system 100 specifies the data to be received from the input data 113, 115, 117 and directs the data to a specific component for analysis. In some embodiments, incoming data is published as message(s) on the subscriber/publisher service, and various components optionally subscribe to the service to pull the relevant data. In some embodiments, the messaging service 144 filters the data inputs 113, 115, 117 using specified spatial or attribute constraints.

In some embodiments, the system 100 includes an Extract Transform Load (ETL) layer 146 for pre-processing the data inputs 112, 122, 132. As shown, the ETL layer extracts the data from the messaging service 144, transforms the data into proper format or structure for storage in the Master Database 154 and analysis on the Prediction Models module 156 and the Prediction Engine 166. The ETL layer 146 loads the properly formatted data onto the Master Database 154 for batch analysis or passes it to the Prediction Engine 166 for real-time analysis. In some embodiments, in the batch layer 150, the ETL 146 loads the data onto Master Database 154 for storage on a periodic basis, such as on an hourly, daily, weekly, monthly basis. In some embodiments, in the real-time layer 160, the ETL 146 loads the data as soon as it is processed with new input data or periodically after small time increments such as 30 seconds, 1 minute, 5 minutes, 15 minutes, etc. In some embodiments, a small time increment is a time block.

In some embodiments, the ETL 146 provides data validation to confirm whether the data from the input sources has expected values based on one or more data validation rules. In some embodiments, the ETL 146 partially or wholly rejects a data entry that fails the one or more validation rules. For example, in some embodiments, validation for a field for a U.S. phone number for an emergency call requires 10 digits. In some embodiments, a field with emergency type or nature is expected to have words such as "medical", "fire", etc for validation. In some embodiments, if incoming data for that field has digits instead of characters, the corresponding emergency entry/entries are recorded as a validation error in the error log and the digits are optionally replaced with "unknown" or "none." In some embodiments, the ETL 146 reports the rejected data entry to the source for further analysis.

In some embodiments, the ETL 146 transforms the input data 112, 122, 132 to meet the technical needs of the components downstream. In some embodiments, the ETL 146 applies a set of rules or functions on the input data input data 112, 122, 132. In some embodiments, data is in the proper format and successfully passes through the ETL 146. In some embodiments, the ETL 146 transforms the data by transforming coded values or deriving a calculated value. In some embodiments, the ETL 146 transforms data by joining, combining, or merging data from multiple sources. In some embodiments, the ETL 146 combines proprietary emergency data and available emergency data. In some embodiments, the ETL 146 removes duplicate entries in the data. In some embodiments, the ETL 146 uses a commercially or publicly available processing engine, such as Spark.

In some embodiments, the Master Database 154 stores the pre-processed input data 112, 122, 132. In some embodiments, the master database 154 is a database or a collection of databases or a database management system. In some embodiments, the master database 154 is a relational database (such as an SQL server, Oracle Database, Sybase, Informix and MySQL. In some embodiments, the master database 154 is hosted one or more computers in a distributed system. In some embodiments, the master database 154 stores the data and provides access to the Predictive Model module 156.

In the batch layer 150, in some embodiments, the Predictive Model module 156 analyzes the data and generates a model or algorithm for making emergency predictions. Various techniques, models or algorithms are used in the Predictive Model module 156. In some embodiments, after model generation or training of the algorithm, the Predictive Model module 156 queries the model with input data (e.g., an emergency data set) for generating an emergency prediction. In some embodiments, emergency predictions are saved in the batch serving database 158 and is made accessible using one or more output services 190. In some embodiments, output services 190 includes one or more of a query services 191, visualization/mapping 192, analytics 194, web applications 187, and mobile applications 189.

In some embodiments, the output services 190 are used by one or more users, customers and/or administrators of the system 100. In some embodiments, output services are accessible by users, administrators or customers of the emergency prediction system. In some embodiments, a software module in the EMS provides access to the emergency prediction system. In some embodiments, a software module in the PSAP system provides access to the dispatch operators or administrators to access the emergency prediction system.

In some embodiments, in the real-time layer 160, the Prediction Engine 166 analyzes the input data to make one or more predictions in real-time or small increments of time. Various techniques, models or algorithms may be used in the Predictive Engine 166. In some embodiments, after model generation or training of the algorithm, the Predictive Engine 166 queries the model with input data to generate an emergency prediction. In some embodiments, the emergency predictions are saved in the real-time serving database 168 and made accessible using one or more output services 190.

In some embodiments, the Predictive Model module 156 and the Predictive Engine 166 use a processing engine such as Spark. In some embodiments, the models and algorithms are programmed using Python.

FIG. 2 illustrates an exemplary system component for an emergency prediction system 200. As shown in FIG. 2, several input data 212, 222, 232, 242 enter the system 200 and outputs are generated in the batch layer 250 or a real-time layer 260. In some embodiments, the call data stream 212 is a real-time stream of data of incoming emergency calls. In some embodiments, the call data steam 212 is a proprietary call data stream or a third party call data stream (e.g., a third-party emergency call handler system or a data stream from a PSAP). In some embodiments, the data stream 212 includes a call identifier (e.g., phone number), a time stamp, and the location (e.g., a latitude or range, a longitude or range, an elevation or range, a physical address, floor or suite number, etc.) of the device from which the emergency call is made.

In some embodiments, emergency data 222 is an input into the system 200. In some embodiments, emergency data 222 comprises proprietary emergency data sent from subject devices. In some embodiments, emergency data 222 is obtained from one or more databases in the EMS or other remote servers. In some embodiments, proprietary emergency data 224 is generated when real-time call data from the data stream 212 are saved in the Master Database 154 (shown in FIG. 1).

In some embodiments, additional data 232 forms an input into the system 200. In some embodiments, additional data 232 is obtained from one or more public or privately available sources. In some embodiments, additional data 232 comprises environmental data. In some embodiments, environmental data is comprises information on traffic condition, weather condition, road condition, or any combination thereof. In some embodiments, additional data 232 comprises information about demographics, population density, etc., regarding the area, which is useful for making emergency prediction(s). In some embodiments, additional data 232 includes information about geographical or jurisdictional boundaries for PSAPs, counties, towns, cities, or other government borders. In some embodiments, additional data 232 includes information on a concert, sporting event, political demonstration, festival, performance, riot, protest, parade, convention, political campaign event, or any combination thereof.

In some embodiments, emergency resource data 242 is an input into the system 200. In some embodiments, emergency resource data 242 is obtained from one or more public or privately available sources. In some embodiments, emergency resource data 242 comprises the number and/or types of emergency resources and personnel available to respond to an emergency call within a jurisdiction, such as a PSAP area, county, city, etc. (also referred to as local emergency resources 241). In some embodiments, the local emergency resources 241 for a specific jurisdiction comprises emergency response vehicles (e.g., fire engines), emergency response personnel (e.g., fire fighters), emergency response equipment (e.g., fire extinguishers), emergency response bases (e.g., fire stations), or any combination thereof. In some embodiments, emergency resource allocation data comprises number or amount of local emergency resources, location of local emergency resources (e.g., x-y coordinates, physical address), restraints on allocation of local emergency resources (e.g., availability of personnel during holidays, repair and maintenance of vehicles and equipment, etc.), restraints on dispatch of local emergency resources (e.g., down-time between dispatches, inaccessible locations, etc.), or any combination thereof.

In some embodiments, emergency resource data 242 is obtained from a partner, such as a PSAP, county, city, state, region, or another government-defined area, for the purpose of optimizing emergency resource allocation. For example, in some embodiments, a PSAP provides information about police resources including number of police and squad cars to obtain a recommendation for allocation of the emergency resources for responding to emergencies within the PSAP jurisdiction. In some embodiments, the emergency resource data 242 is obtained from at least one publicly available source. For example, in some embodiments, the locations of police stations are available from the county website or mapping service.

In the batch layer 250, emergency data 222 is processed by adding environmental features by merging with environmental data from the additional data 232, in various embodiments. For example, in some embodiments, weather and/or traffic features from the time and location of each call in the emergency data 222 are added to create additional data augmented emergency data (e.g., augmented with additional data), which is a type of augmented emergency data. In some embodiments, other additional data such as geographical features are also added to emergency data to generate augmented emergency data. Other types of features, such as derived from event data may also be augmented. An exemplary additional data augmented emergency data is depicted in Table 2.

In some embodiments, after additional features are added, the additional data augmented emergency data is inputted into the spatiotemporal emergency call prediction module 220 for creating a prediction model for generating at least one spatiotemporal emergency prediction. In some embodiments, for generating one or more spatiotemporal emergency prediction (e.g., predicted number of emergency calls, predicted emergency call density, kernel density estimates), the spatiotemporal emergency call prediction module 220 creates one or more prediction models. In some embodiments, the appropriate prediction model is chosen based on the fit or prediction accuracy. In some embodiments, fitness is evaluated by calculating the error difference between the predicted and actual values. In some embodiments, the error difference is mean absolute error, mean squared error, $R^2$, logarithmic loss, cross entropy, or hinge loss.

Figure 5A:
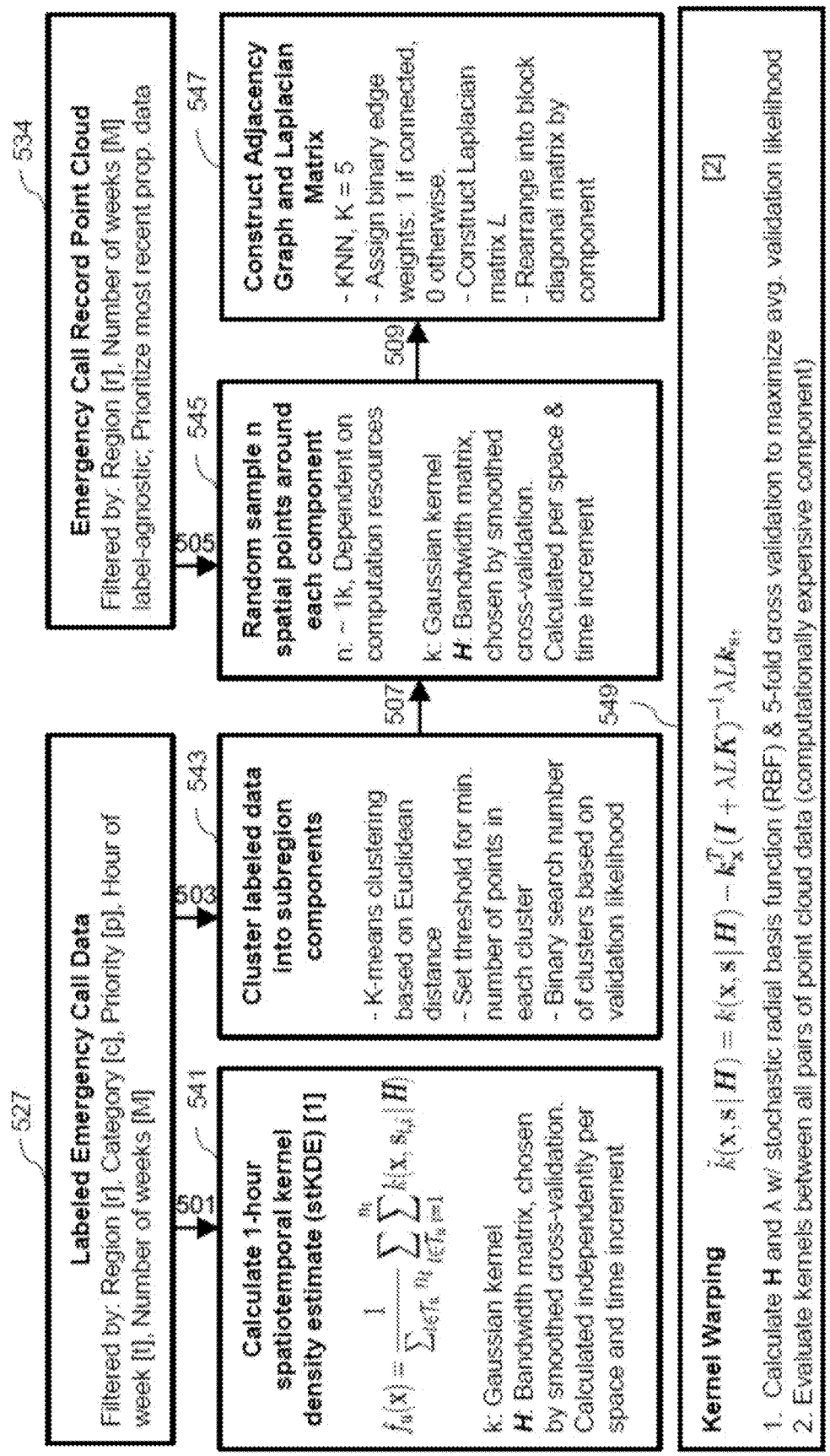
FIG. 5A depicts a method for generating spatiotemporal emergency prediction using kernel warping technique.
Figure 5B:
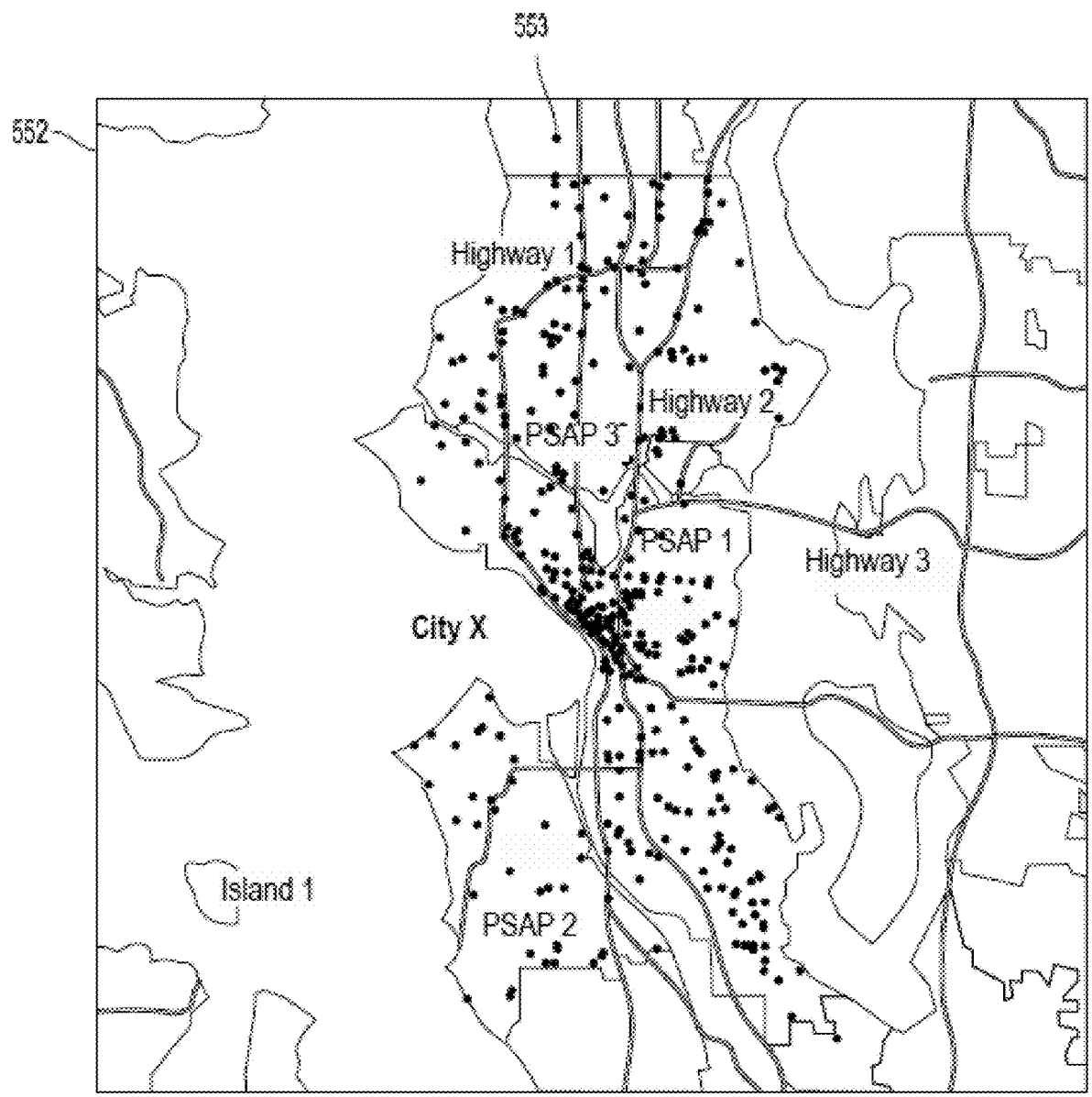
FIGS. 5B and 5C depict exemplary input emergency call data and exemplary output kernel densities on a map.
Figure 5C:
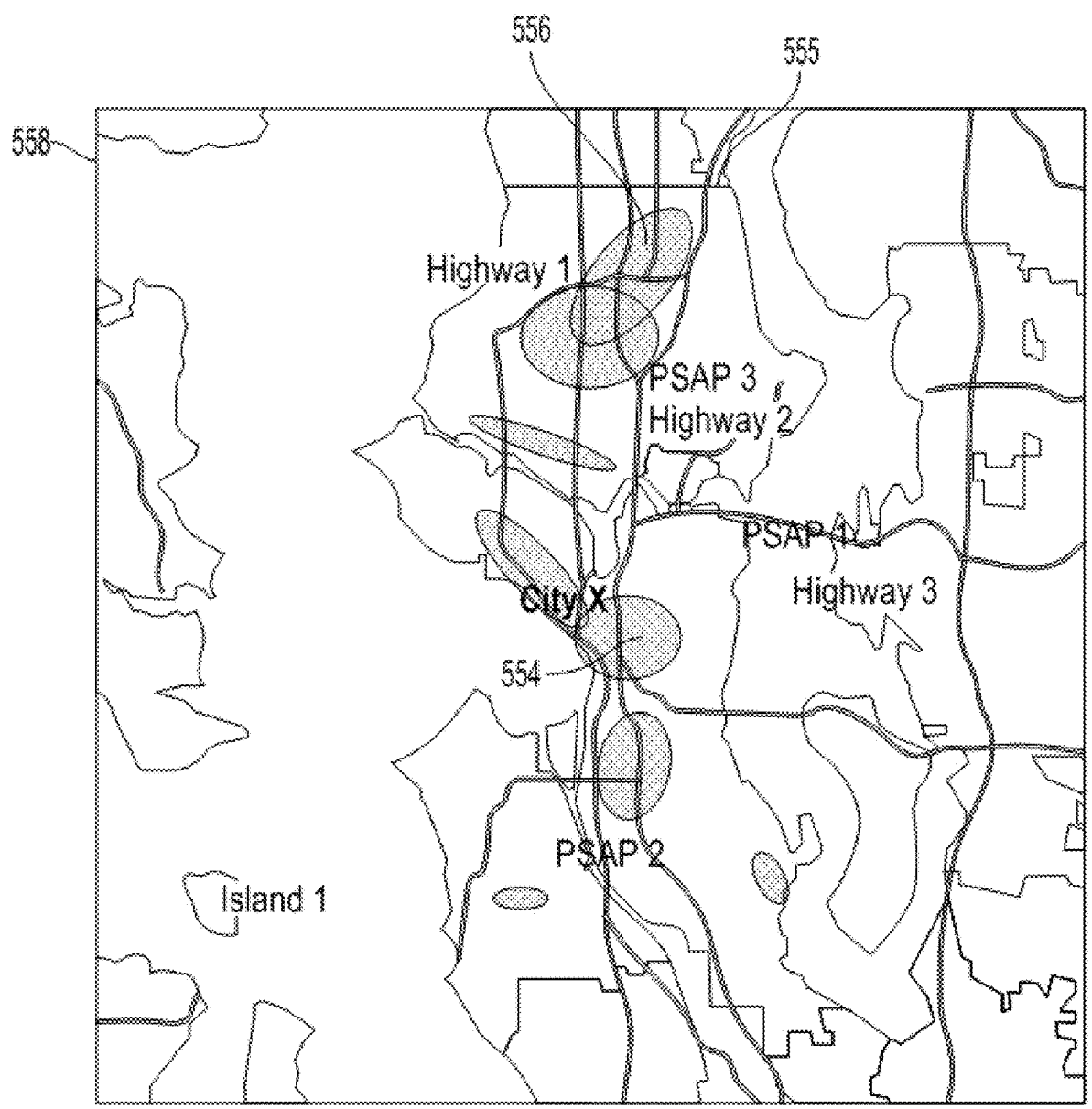

Various types of functions and algorithms are capable of being used to create the model, such as discrete location, continuous location (e.g., Gaussian density function, kernel density estimation (KDE)), or discrete and continuous time models. An exemplary method is depicted in FIGS. 5A-5C.

In some embodiments, the prediction model is a generalized prediction model that is used to make spatiotemporal emergency predictions for any type of emergency. In some embodiments, the prediction model is specialized to a type of emergency such as a medical prediction model, a fire prediction model, or a police prediction model. For model generation for specific types of emergencies, some or part of the emergency data 222 that is inputted into the module 220 has to be labelled with the type of emergency, e.g., labeled emergency data. In some embodiments, specialized prediction models are used to generate more accurate emergency predictions for specific emergency type(s) and/or emergency priority. In some embodiments, when labeled emergency data is not available, a generalized prediction module is created using unlabeled call data. Similarly, in some embodiments, specialized models are used to generate more accurate emergency predictions for specific geographic areas such as for specific different cities, counties, time of year, etc., may also be beneficial. In some embodiments, augmented emergency data, such as additional data augmented emergency data is used for creating prediction models that take into account additional data 232, such as environmental data.

After one or more prediction models are created, one or more spatiotemporal emergency predictions corresponding to a defined geographic area and a defined time period are generated. In some embodiments, an administrator or a customer sends a query for an emergency prediction (e.g., by using query service 291) for a defined geographic area (such as a geographic block) and a defined time period (such as a time block). In some embodiments, if used in the prediction model, the system 200 obtains additional data such as forecast environmental data for the defined geographic area and the defined time period. In some embodiments, the emergency predictions are generated by applying one or more of the defined geographic area, defined time period, and additional data (if needed) into the prediction model in the module 220.

In other embodiments, the emergency predictions are generated on a periodic basis batch-wise. Thus, in some embodiments, the emergency predictions are generated every hour, day, week, month, or other time block. In some embodiments, the emergency prediction is saved in the batch-serving database 158 (see FIG. 1) and made accessible by output services 290.

In other embodiments, the emergency data 222 is inputted into the into the spatiotemporal emergency call prediction module 220 without adding features. In some embodiments, the emergency data 222 undergoes pre-processing in the messaging service 144 and ETL 146 before inputting into the module 220. Without the additional features, in some embodiments, the emergency prediction takes less time and less computing resources, but also with lower accurate. In some embodiments, a non-augmented model is preferred to get a quick emergency prediction, especially in the real-time layer. For example, in some embodiments, the emergency anomaly detection module 240 utilizes a "quick and dirty" model to make an emergency prediction for detecting clusters (not shown).

In some embodiments, the output of the spatiotemporal call prediction module 220 in the form of emergency predictions is accessible by administrators, customers or users of the prediction system 200 including the EMS. In some embodiments, various output services 290 are used to access the emergency predictions including query services 291 or call density projections 296. For example, a sample output showing kernel density clusters for emergency calls is shown in FIG. 5C.

In some embodiments, the prediction model in the spatiotemporal call prediction is re-created or re-trained in the update model module 228. Various techniques and algorithms are capable of being used to determine a need for updating the model or algorithm. For example, in some embodiments, one or more historical spatiotemporal emergency call prediction is compared to an actual number of emergency calls to determine the prediction accuracy. In the real-time layer, there is a need for information regarding the type and priority of emergency calls in real-time or near real-time in the data stream 212 for making accurate emergency predictions. Provided herein are systems and methods for generating predicted labels for the data stream 212 and augmenting or incorporating the data stream with the predicted labels. In some embodiments, the Data Augmentation module 210 matches unlabeled emergency data with labeled emergency data to create a matched emergency data. In some embodiments, the matched emergency data with labels and additional information from the proprietary data stream is inputted into the spatiotemporal prediction module 220 for a more accurate emergency prediction.

Furthermore, in some embodiments, the Data Augmentation module 210 develops a model or algorithm based on labeled emergency data and/or matched emergency data for predicting labels for the data stream 212 in real-time. An exemplary table for a data stream with predicted labels is shown in Table 3. In some embodiments, the model or algorithm for predicting labels is re-generated or re-trained using actual labels for type, priority, response time, or any combination thereof. In some embodiments, an exemplary table with the data stream with predicted labels is used for updating the model after actual labels are available as shown in Table 4. In some embodiments, the data augmentation module 210 calculates the predicted response time for each emergency call in the data stream 212 using a response prediction model. In some embodiments, the estimated response time is made available to an administrator, user, or customer of the system 200.

In some embodiments, Emergency Anomaly Detection 240 (also referred to as Emergency Event Detection) provides early warning or triggered notifications by detecting emergency events by automatically detecting anomalies. In some embodiments, an algorithm for anomaly detection is run on a real-time or near real-time basis to identify emergency events that are capable of affecting a group of subjects. Some such emergency events include an earthquake, landslide, tsunami, volcanic activity, wildfire, large-scale fire, cyclone, tornado, hurricane, epidemic, extreme temperature, industrial accident, chemical spill, nuclear accident, terrorist attack, or large-scale transport accident.

In some embodiments, the call data stream 212 or the call data stream with predicted labels is used to in an anomaly detection algorithm for detecting clusters of emergency calls within a defined geographic area and a defined time period. By using emergency data labeled with the type and priority of the emergency and estimated response time, an early warning is generated and provided to the administrator, customer, dispatcher and/or subjects regarding the emergency. For example, in some embodiments, an early warning and notification system warns interested parties about the emergency event and also the type and/or priority of the emergency.

As an illustrative example, as a call comes in, clusters of calls are detected within a radius of the location of the call (e.g., within 1 km, 2 km, or 5 km, including increments therein) and within a near real-time period (e.g., 1 min, 2 min, 5 min, 10 min, or 15 min, including increments therein). Examples of near-real time include no more than 1, 2, 3, 4, 5, 6, 7, 8, 9, 10, 11, 12, 13, 14, 15, 16, 17, 18, 19, 20, 25, 30, 35, 40, 45, 50, 55, or 60 minutes from the time of a call or communication. For example, in some embodiments, the analysis of a communication in near real-time includes analysis of the communication within the recited time range of no more than 1 to 60 minutes from the time of sending, receiving, and/or detecting the communication. In some embodiments, a cluster is detected by comparing the recent and on-going calls with historical or predicted call volume or density and detecting abnormal cluster of large number of emergency calls. In some embodiments, the expected number of calls is calculated by sampling the predicted call density in an area, or in the case of the space-time permutation scan statistic model, the expected number of calls is the proportion of calls that occur at a grid point times the total number of calls that occur in the time slot (see FIG. 5A).

In some embodiments, using the anomaly detection algorithm, a cluster is detected when the actual number of calls exceeds the expected number of calls by a certain threshold. In some embodiments, after anomalies are detected, one or more of users, customers and/or administrators of the system 200 or subjects who are likely to be affected by the emergency event are sent notifications 293. In some embodiments, subjects who are affected by the emergency event are identified based on proximity or location within a detected anomaly. In some embodiments, the location of a subject is obtained from a communication device of the subject such as a smart phone. Detailed description regarding the anomaly detection module 240 are found in reference to FIGS. 6A and 6B.

As shown in FIG. 2, in some embodiments, emergency resource data 242 enters the Emergency Resource Allocation module 270 for optimizing emergency resource allocation for responding to emergency calls within a dispatch jurisdiction. In some embodiments, the emergency resource data 242 is a local emergency resource data (e.g., for a PSAP jurisdiction). In some embodiments, an emergency resource recommendation (e.g., a recommendation allocating ERVs to particular base locations to minimize response times) is generated based on the emergency data 222 and one or more spatiotemporal call prediction from the spatiotemporal call prediction module 220. In some embodiments, an estimated response time prediction is generated using a prediction model. In some embodiments, the prediction model is generated by analyzing labeled emergency data including response times. In some embodiments, using an allocation algorithm, the allocation of the emergency resource is optimized by using an allocation simulator. In some embodiments, current or forecast additional data 232 (e.g., weather and traffic data) is considered for the emergency allocation recommendation.

In some embodiments, short-term (e.g., 1 hour, 1 day, 1 week) recommendations for emergency allocation are generated for short-term recommendations (e.g., placement of emergency personnel or emergency vehicles). In some embodiments, long-term predictions (e.g., a month, half-year or a year) are used for long-term recommendations (e.g., budgeting and planning for hiring emergency personnel and purchasing emergency equipment). Detailed description regarding the anomaly detection module 240 are found in reference to FIG. 7.

In some embodiments, the dynamic resource reallocation module 278 allows for reallocation of the emergency resources based on predicted near-term call data (e.g., for the next few hours). In some embodiments, the dynamic reallocation service 298 allows a user, a customer or an administrator to access a dynamic reallocation recommendation. In some embodiments, after an event is detected affecting a group of subscribers within the emergency jurisdiction, the dynamic reallocation module 278 provides one or more recommendations to respond to a cluster or hotspot of emergency calls. In some embodiments, the dynamic resource reallocation module 278 allows for reallocation of emergency resources after at least one emergency resource recommendation has been provided a period of time. This allows for reallocation in case predicted near-term call data shows a likely misallocation of resources despite previous best efforts at long-term predictions.

In some embodiments, the emergency predictions from the batch layer 250 are saved in the batch serving database 158 (see FIG. 1). In some embodiments, the emergency predictions from the real-time layer 260 are saved in the real-time serving database 168 (see FIG. 1). In some embodiments, the emergency predictions are accessible through an API 280 using one or more output services 290. In some embodiments, output services 190 comprise one or more of a query service 291, emergency event detection and notification 293, call prioritization and routing 295, hourly or weekly call density projections 296, emergency resource allocation and planning 297, and dynamic reallocation 298.

In some embodiments, a platform for simulation is provided for allocating emergency resources (such as police cars). For example, in some embodiments, an administrator of the emergency predictions system or of the EMS or a customer logging in at the PSAP system is able to access output services such as the simulation platform for providing estimated response times for responding to predicted emergencies. In some embodiments, the administrator or customer is able to adjust the allocation (such as location of police cars) to see the predicted effect on response times and/or other results.

Figure 3A:
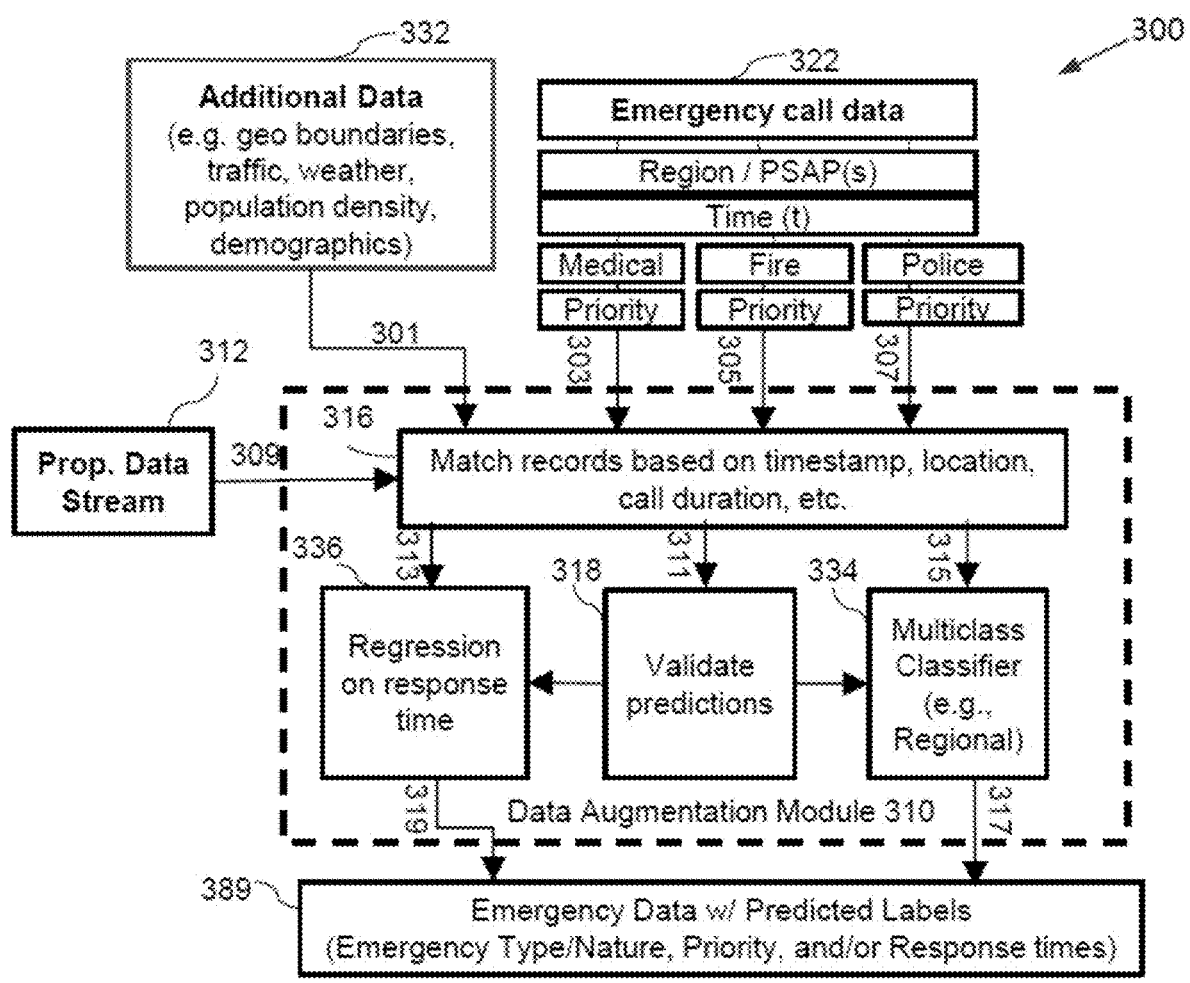
FIGS. 3A and 3B illustrate exemplary method for augmenting emergency call data and call data stream.

FIG. 3A illustrates an exemplary method for augmenting emergency call data and data stream in the system for data augmentation 300. Several variations for augmenting data is contemplated based on the input into the prediction model for making emergency predictions. Augmentation may done with actual labels (e.g., weather conditions at time and location of an emergency call) or with predicted labels (e.g., type or nature of calls because the label is not available or premature). Actual labels may also be referred to as "ground truth"

In some cases, the emergency data does not include labels or has missing labels for some entries and these labels may be needed for accurate emergency predictions. Labels may include emergency type/nature (e.g., fire, medical, police, pet rescue, road-side assistance), sub-types (e.g., theft, burglary, narcotics, domestic dispute), emergency priority or severity (e.g., high, ambulance dispatch, officer visit, follow-up call, no action needed), actual or estimated response time (e.g., ambulance reached emergency location within 10 minutes), extent of damage (e.g., fatalities, injuries, property damage), etc.

In many cases, it is too early to know the label for entries in the call data stream and it may be necessary to predict the labels as the call is coming in (For example, "the incoming call is predicted to be a medical call requiring an ambulance dispatch?"). In the case for emergency data (e.g., historical call data), it may be the label for the call is not available or missing.

In some cases, the emergency data and/or data stream are augmented with additional data such as weather, traffic, population density, PSAP jurisdiction, etc. before feeding into the model. For example, the call data stream may need to be augmented with current weather conditions for making accurate emergency predictions.

As shown in FIG. 3A, several inputs 312, 322, 332 enter the data augmentation module 310 and an output is generated including emergency call data with predicted type or nature, priority and estimated response time (referred to as "Emergency Data with predicted labels" 389). In some embodiments, the call data stream 312 is a proprietary data stream. In some embodiments, the call data stream is a real-time or near real-time call stream from a dispatch center or PSAP.

In many cases, the call data stream 312 does not include determinations regarding the type or nature, priority and/or estimated response times (referred to as "labels"). Accordingly, in some embodiments, these labels are used to apply the right predictive model and get accurate emergency predictions. In some embodiments, the data augmentation module 310 predicts labels to the call data stream 312, which is optionally used in the anomaly detection module 240, spatiotemporal call prediction 220, emergency resource allocation module 270, or any combination thereof (see FIG. 2).

In some embodiments, for predicting labels, labeled emergency data from various sources such as PSAPs, EDCs and public and private sources is included in the emergency data 322. In some embodiments, the emergency data 322 includes unlabeled emergency data with or without additional information (see Table 1).

In some embodiments, the data stream 312 comprises the emergency call time and the emergency call location (e.g., latitude/longitude/elevation/address). In some embodiments, the data stream includes a calling device identifier such as a subject's phone number, account number, name or log-in ID, universal ID (uid), or any combination thereof. In some embodiments, one or more additional fields are available depending on the source of the data stream, such as the call device and network, accuracy of location information, and call duration. In some embodiments, one or more of these fields are included as features in the predictive models for improving prediction accuracy. Exemplary raw or unlabeled data stream is shown in Table 1. Although decimal digits in the latitude, longitude, and/or elevation coordinates in the tables below have been excluded, various location coordinate decimal values are contemplated. In some embodiments, location coordinates have values down to the 0.1, 0.01, 0.001, 0.0001, or 0.00001 decimal places.

TABLE 1

Exemplary Raw/Unlabeled Call Data Stream

| Uid | Call_Time | Lat | Lon | Elev | Gen | Age | Ht | Wt | Med_allerg | Med_cond |
|---|---|---|---|---|---|---|---|---|---|---|
| e1b9 | 5/3/2017 0:00 | 33 | −117 | 199 | M | 61 | 68 | 175 | None | NA |
| e1b9 | 5/3/2017 1:03 | 33 | −117 | 199 | F | 52 | 70 | 285 | None | Diabetes |
| dc3b | 5/3/2017 5:27 | 33 | −117 | 199 | F | 28 | 70 | 210 | None | — |
| 8f0b | 5/3/2017 13:39 | 34 | −118 | 36 | F | 25 | 69 | 130 | Poison Ivy | — |
| 6d94 | 5/3/2017 16:49 | 29 | −95 | 28 | M | 32 | 72 | 290 | None | — |
| 2087 | 5/3/2017 22:33 | 26 | −98 | 38 | M | — | — | — | None | HBP |
| d35b | 5/3/2017 23:11 | 42 | −84 | 287 | F | 60 | 69 | 200 | None | — |
| 027a | 5/4/2017 19:50 | 26 | −81 | 6 | M | 29 | 72 | 207 | None | — |
| 67c8 | 5/4/2017 20:00 | 35 | −82 | 643 | M | — | — | — | Bactrim | — |
| 8f5ef | 5/4/2017 20:24 | 31 | −83 | 101 | M | — | — | NA | Pennicillin | Sev Arth |

In some embodiments, additional data 332 (e.g., geographical boundaries, traffic, weather, population density, demographics, human mobility, etc.) is used for data augmentation. In some embodiments, the additional data 332 is used for extracting features such as environmental features (weather, traffic information), event features (sporting events, etc.), and other features for incorporation in emergency data with predicted labels 389 (e.g., augmented data). In some embodiments, the incorporation of environmental and other features in the labeled emergency data improves the accuracy of predictions generated using models based on the emergency data with predicted labels. In some embodiments, emergency data augmented with additional data (even without predicted labels) may be used in some prediction models (e.g., input 235 for spatiotemporal prediction in FIG. 2).

In some embodiments, the proprietary data stream 312 is augmented with additional data, such as environmental data in the data augmentation module 310. Table 2 shows a table with call data stream that has been augmented with environmental features (e.g., environment data).

TABLE 2

Call Data Stream Augmented with Environmental Features

| | Call Data Stream | | | Geo | | | Traffic | Weather | | |
|---|---|---|---|---|---|---|---|---|---|---|
| | | | | | | | Density | Temp | Prec | Hum |
| Uid | Call_Time | Lat | Lon | urban | zone | road | [#/mi] | [F.] | [cm] | [%] |
| e1b9 | 5/3/2017 0:00 | 33 | −117 | T | Res | T | 9.0 | 94 | 0.2 | 0.5 |
| e1b9 | 5/3/2017 1:03 | 33 | −117 | T | Com | T | 6.0 | 56 | 0.5 | 0.6 |
| dc3b | 5/3/2017 5:27 | 33 | −117 | T | Com | F | nil | 66 | 0.3 | 0.2 |
| 8f0b | 5/3/2017 13:39 | 34 | −118 | F | Com | F | nil | 65 | 0.1 | 0.3 |
| 6d94 | 5/3/2017 16:49 | 29 | −95 | F | Com | F | nil | 69 | 0.0 | 0.4 |
| 2087 | 5/3/2017 22:33 | 26 | −98 | T | Res | F | nil | 92 | 0.0 | 0.4 |
| d35b | 5/3/2017 23:11 | 42 | −84 | T | Res | T | 3.0 | 88 | 0.4 | 0.8 |
| 027a | 5/4/2017 19:50 | 26 | −81 | T | Com | T | 2.0 | 76 | 0.8 | 0.8 |
| 67c8 | 5/4/2017 20:00 | 35 | −82 | F | Res | F | nil | 89 | 0.2 | 0.4 |
| 8f5e | 5/4/2017 20:24 | 31 | −83 | T | Com | T | 6.0 | 90 | 0.2 | 0.1 |

In some embodiments, external data sources are used to augment the incoming call data stream 312. In some embodiments, these features are added to each incoming call through either an API call to an external service or a query to a static database in the EMS.

In some embodiments, as shown in Table 2, when a new call occurs, a query is made to a static geographic information database to determine if the call is in an urban/rural area, a residential/commercial zone, and/or on a road. In some embodiments, API calls are then made to external data services to provide the traffic density (if call occurs on a road) and current weather conditions such as temperature, precipitation, and humidity. In some embodiments, humidity is provided as absolute humidity (g/m$^3$), relative humidity (e.g., 30% relative humidity), or specific humidity (grams of vapor per kg of air).

Referring to FIG. 3A, in some embodiments, matching is done by various methods in the matching module 316. For example, in some embodiments, the emergency data is first matched with existing proprietary emergency data. In some embodiments, near-to-exact matching of call time and location is done. In some embodiments, a buffer threshold is necessary to account for differences in reporting resolution from PSAP data. In some embodiments, an error such as, for example, a root mean squared (RMS) error term is appended to the matched data to store a record of the match accuracy.

Next, predicted labels are generated for each call record in one or more prediction models. In some embodiments, the predicted labels are generated by a multi-class classifier 334.

In some embodiments, the matched emergency data from the matching module 316 (with or without additional features) is used as the input to a multiclass classifier 334. In some embodiments, the nature and priority of calls have different criteria for each region or PSAP, and a model for each distinct region is generated. In some embodiments, several classifier models are assessed with the best performing model being selected using model selection and validation 318. Sample output from the classifier 334 is shown in Table 3.

TABLE 3

Call Data Stream with Predicted Labels

| | Call Data Stream | | | | Predicted Features | | | | |
|---|---|---|---|---|---|---|---|---|---|
| Uid | Call_Time | Lat | Lon | p_nat | p_fire | p_police | p_med | p_highpri | p_resp |
| e1b9 | 5/3/2017 0:00 | 33 | −117 | Fire | 0.61 | 0.03 | 0.35 | 0.57 | 15.0 |
| e1b9 | 5/3/2017 1:03 | 33 | −117 | Med | 0.01 | 0.31 | 0.68 | 0.38 | 6.3 |
| dc3b | 5/3/2017 5:27 | 33 | −117 | Fire | 0.61 | 0.07 | 0.31 | 0.74 | 13.5 |
| 8f0b | 5/3/2017 13:39 | 34 | −118 | Pol | 0.19 | 0.55 | 0.27 | 0.11 | 5.4 |
| 6d94 | 5/3/2017 16:49 | 29 | −95 | Fire | 0.64 | 0.03 | 0.34 | 0.17 | 3.3 |
| 2087 | 5/3/2017 22:33 | 26 | −98 | Med | 0.24 | 0.25 | 0.51 | 0.96 | 6.0 |
| d35b | 5/3/2017 23:11 | 42 | −84 | Pol | 0.17 | 0.45 | 0.39 | 0.38 | 3.8 |
| 027a | 5/4/2017 19:50 | 26 | −81 | Fire | 0.59 | 0.01 | 0.40 | 0.92 | 7.8 |
| 67c8 | 5/4/2017 20:00 | 35 | −82 | Med | 0.45 | 0.06 | 0.49 | 0.09 | 2.0 |
| 8f5e | 5/4/2017 20:24 | 31 | −83 | Fire | 0.55 | 0.02 | 0.44 | 0.84 | 9.7 |

As shown in Table 3, in some embodiments, the call nature probabilities (p_fire, p_police, p_med) are the output of the multiclass classifier. The class with the highest probability is assigned to p_nature. Here, p_highpri is the output of a classifier that determines the probability that the call is a high priority level and p_resp is the output of a regressor or regression module 336 that provides the estimated response time in minutes. In some embodiments, the emergency type comprises a category of emergency such as fire, medical, police, or fire. In some embodiments, the emergency type comprises one or more probabilities that a call or communication relates to one or more emergency types such as shown in Table 3.

In some embodiments, once the call data stream has been augmented and labeled, it is stored in the master database 154 (see FIG. 1). At this point, in some embodiments, it is transformed into historical emergency call data, or "proprietary emergency call data."

In some embodiments, when emergency call data from other sources (e.g., a PSAP) arrives, the data comprises metadata or information for each call that reflects the ground truth of the situation such as, for example, the actual nature (e.g., emergency type) and/or priority of the call. In some embodiments, the metadata or information comprises the actual response time, origin and identification of the response vehicle, final destination of the response vehicle, a description of the emergency, or any combination thereof. In some embodiments, the labeled emergency call data and the proprietary call data are matched using the call time and location in the matching module 316. A sample of matched emergency data is shown in Table 4, which is optionally utilized for training the predictive models applied to the incoming call data stream.

TABLE 4

Emergency Data Matched with Actual Labels

| | | | | | Actual Labels | |
|---|---|---|---|---|---|---|
| Emergency Call Data | | | | | | resp_time |
| Uid | Call_Time | Lat | Lon | ... a_type | priority | [mins] |
| e1b9 | 5/3/2017 0:00 | 33 | −117 | ... Fire | High | 17.5 |
| e1b9 | 5/3/2017 1:03 | 33 | −117 | ... Med | Med | 4.5 |
| dc3b | 5/3/2017 5:27 | 33 | −117 | ... Fire | Med | 12 |
| 8f0b | 5/3/2017 13:39 | 34 | −118 | ... Pol | Low | 12 |
| 6d94 | 5/3/2017 16:49 | 29 | −95 | ... Fire | Med | 8 |
| 2087 | 5/3/2017 22:33 | 26 | −98 | ... Med | High | 6.2 |
| d35b | 5/3/2017 23:11 | 42 | −84 | ... Med | Med | 11 |
| 027a | 5/4/2017 19:50 | 26 | −81 | ... Fire | High | 6.7 |
| 67c8 | 5/4/2017 20:00 | 35 | −82 | ... Fire | Low | 3 |
| 8f5e | 5/4/2017 20:24 | 31 | −83 | ... Fire | High | 11.6 |

Referring to FIG. 3A, after predicted labels are generated, the predictions may be validated in the validation module 318. Various methods of validation are contemplated. For example, in some embodiments, the emergency data with both predicted and actual labels are used to validate the prediction accuracy periodically or on-demand.

The validation process may be executed in batch either when emergency call data is added to the database or at a set time interval. FIG. 8 shows exemplary validation data. The shaded values indicate where the predicted and actual features were inconsistent. For rows 7 and 9, the call nature prediction may be incorrect. For row 3, a prediction has 74.7% probability that it was a high priority call. However, the actual call was not high priority. For rows 4, 5, and 7, the predicted response times are smaller than the actual response time by a threshold percentage (greater than 50% difference). In some embodiments, when validation is unsuccessful, retraining or recalculation of the model is carried out. In some embodiments, a threshold for the minimum prediction accuracy is set (e.g., a percent of predictions that meet the accuracy criteria). In some embodiments, the threshold is at least 50%, 60%, 70%, 80%, 90%, 95%, 99%, or more, including increments therein. In some embodiments, when this threshold is not met, retraining of the models is triggered and/or a notification to the administrator of the system 300 is sent indicating a failure to meet the minimum prediction accuracy threshold.

Figure 3B:
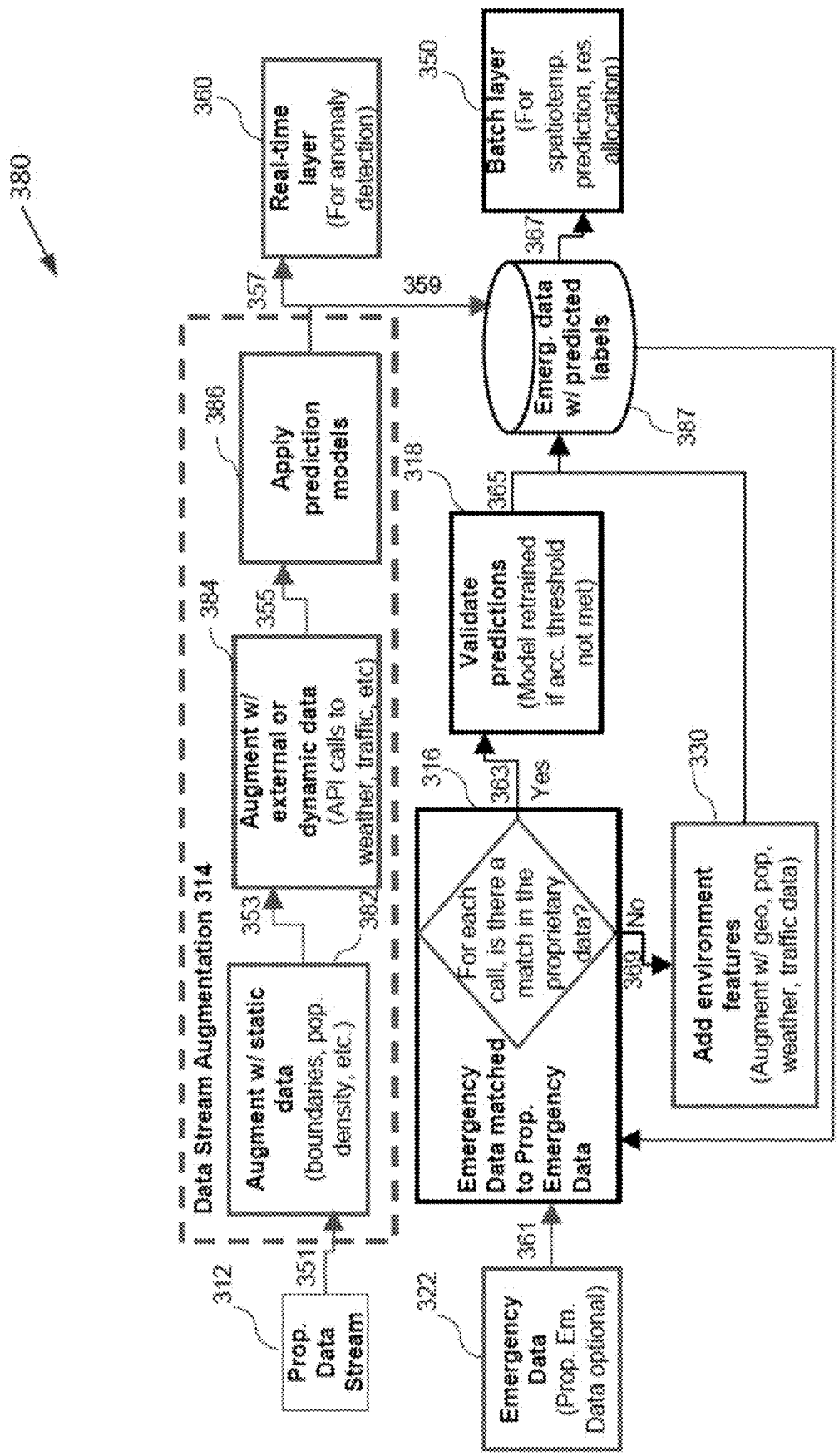

FIG. 3B illustrates an exemplary method for augmenting emergency data and data stream in the system for data augmentation 380 for real-time or batch emergency predictions. A call data stream 312 is received and subject to data augmentation 382 using data from one or more static databases such as, for example, geographic population density data, physical address, zoning and jurisdictional boundaries, etc. Because static data does not change on a continuous basis, databases with such information may be obtained internally with periodic updates.

For example, as each call comes in, it is processed and transformed in near real-time or real-time in the ETL (see 146 in FIG. 1). For each call entry, the location, time and identifying information about the call (such as user phone number, device ID) may be extracted. Using this information, the Data Stream Augmentation Module 314 may query databases within the EPS for information to be matched to the call in the step 382.

Next, in some embodiments, the data stream 312 is augmented with data from dynamic or external data sources such as, for example, weather, traffic, and other information in step 384. The dynamic data may change frequently such as weather conditions, traffic density, etc. In step 384, API calls may be made to relevant sources for dynamic data. It is understood that the steps 382 and 384 may be conducted simultaneously or in a different order. In some cases, external data sources may be consulted to get static data in step 384 when such information has not been obtained internally. The returned static or dynamic data may be stored in corresponding columns and added to the call record (i.e., call data stream or emergency data).

In some embodiments, one or more prediction models are used to predict label(s) for the call data stream such as, for example, nature of the emergency (e.g., emergency type), call priority (e.g., emergency priority), and/or emergency response time in step 386 (via, e.g., the data augmentation module 310 in FIG. 3A). The predicted labels may be added to the call record in corresponding columns. In some embodiments, the predicted labels are incorporated into the call data stream.

The labeled emergency data may be used for real-time emergency prediction (step 360) and/or stored in the Master DB (see 154 in FIG. 1) for use in batch emergency prediction (see 359). For example, the augmented emergency data/data stream is optionally sent to a real-time layer for emergency event detection (e.g., emergency anomaly detection) in step 360.

In some embodiments, emergency data is matched to proprietary emergency data 316. The matching may be used to collect available information about a particular call, resolve discrepancies and remove duplicates. In some embodiments, matching data is used to validate predictions. In some embodiments, the predictions are assessed for accuracy such as a requirement to exceed an accuracy threshold 328 (not shown). In some embodiments, a prediction model is re-trained if the accuracy threshold is not met. In some embodiments, the matched (and sometimes unmatched) data is augmented with additional information such as, for example, geographic, population density, weather, traffic, or other data 330. In some embodiments, the matched data is used for generating spatiotemporal prediction models for making batch predictions 350. In some embodiments, the data stream is proprietary data such as current or recent 911 call data that does not have publicly available label information. In some embodiments, the proprietary data is augmented with predicted labels 388 generated by one or more prediction models. In some embodiments, the augmented proprietary data is matched with emergency data 316. In some embodiments, methods used for data augmentation include extrapolation, tagging, aggregation, probability, or any combination thereof.

In some embodiments, proprietary emergency data may be available and may be used for batch emergency prediction as shown in FIG. 3B. In some embodiments, emergency data from other sources (e.g., a PSAP, a dispatch center, a call center) may be obtained by the EPS in a stream or by periodic updates. When emergency data is obtained from different sources, there may be variations in recordkeeping. For example, a PSAP may save information about the response time, nature or type of emergency, etc. in the emergency data (labeled emergency data), while another PSAP may not. If the proprietary emergency data includes a sub-set of the calls (e.g., only the emergency calls made from mobile phones), then the only a sub-set of calls from the proprietary data stream will be matched to the emergency data from the PSAP (which will include both landline and mobile phone calls).

For emergency data 322, a match with proprietary data (or emergency data from another source) may be sought in step 316. If there is a match with proprietary data, environmental features (e.g., weather or traffic information) from environmental data (and/or other additional data) were already augmented along with predicted labels in the data stream augmentation 314. Matching call entries may be joined into single record and may include the actual labels or ground truth (if available). For a sub-set of call entries with actual and predicted labels, validation of the predictions may be done in step 318. If the threshold for the minimum prediction accuracy or "error threshold" between the predicted and actual labels is not met for a given number call records, the system may trigger a re-training or update of the prediction model (not shown).

If there are no matching call record found in step 316, environmental features may be added in step 330. In some embodiments, predicted labels may be added in a step 386 (not shown), if needed, followed by a validation process (step 318).

After processing of emergency data (e.g., augmentation with environmental feature and/or predicted labels), the emergency data may be saved in a database 387 (also referred to as the "processed emergency data DB") for future use for generating emergency predictions. Variations for processing of emergency data are contemplated.

Most cities utilize predictive models for estimating emergency response service demand, either in aggregate for resource planning or in finer spatiotemporal resolution for dynamic resource allocation and deployment. These models are subject to poor approximations due to sparsity of emergency event data at higher spatiotemporal resolutions. Using models described in this disclosure has the potential to facilitate better resource planning, decrease response times, and decrease costs associated with over-allocation of emergency units or ad-hoc reallocation of services to cover underestimated demand.

Figure 4A:
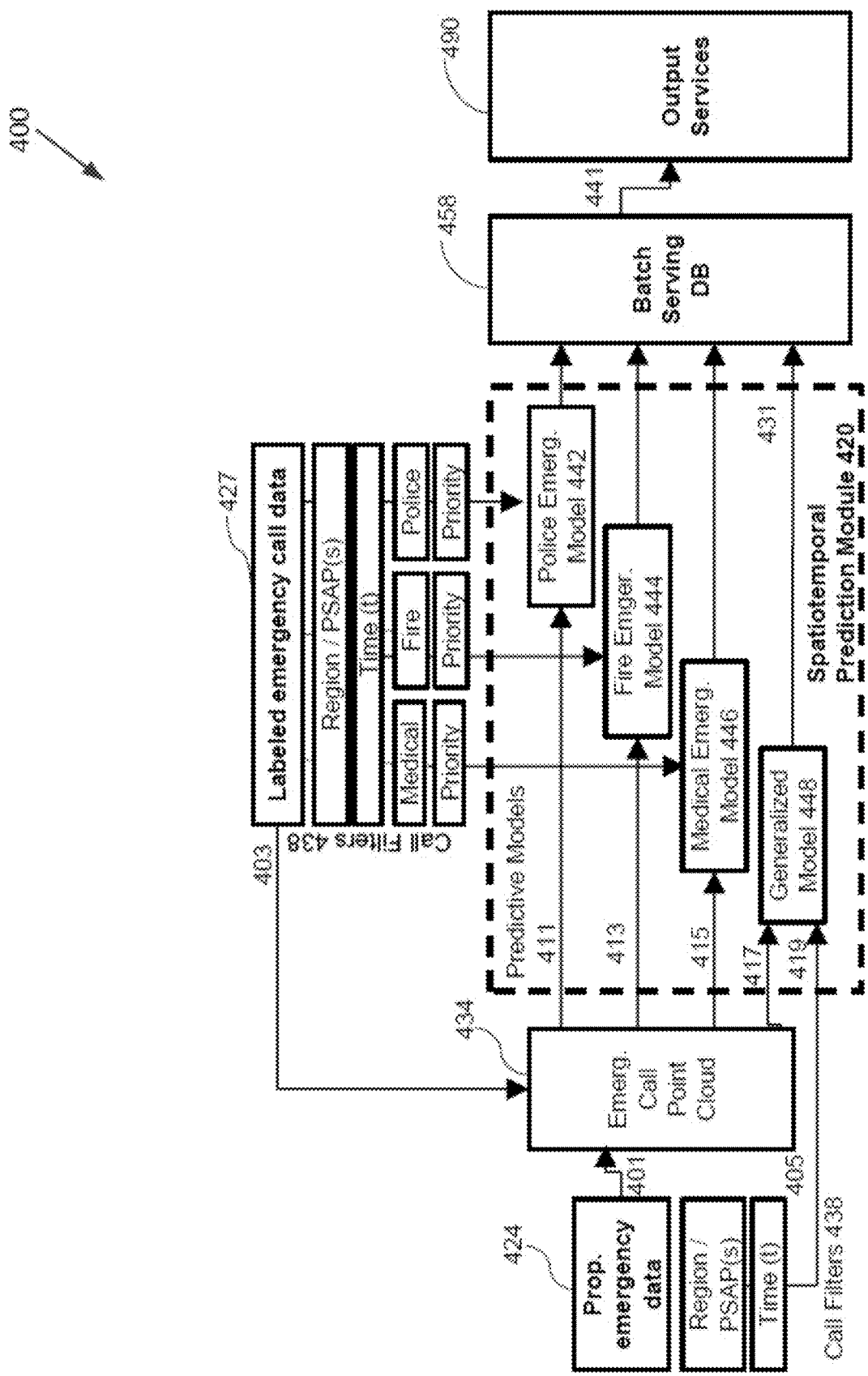
FIGS. 4A and 4B depict schematic diagrams for implementing one embodiment of a method for generating spatiotemporal emergency prediction.

FIG. 4A depicts a schematic diagram for implementing one embodiment of a method for generating spatiotemporal emergency prediction, specifically for calculation of estimated emergency call densities for a defined geographic area and time period. In some embodiments, labeled emergency call data 427 is sourced from one or more PSAPs serving one or more geographic areas. In some embodiments, labeled emergency call data comprises label information on emergency calls such as, for example, emergency type and/or emergency priority. In some embodiments, an emergency type is a medical emergency, a police emergency, or a fire emergency. In some embodiments, emergency priority is a high priority or a low priority. In some embodiments, emergency priority is defined by the PSAP the labeled emergency call data is obtained from. In some embodiments, labeled emergency call data is used to train or generate emergency type-specific prediction models such as, for example, a medical call predictive model, a fire call predictive model, or a police call predictive model. In some embodiments, proprietary emergency call data 424, which is sometimes unlabeled emergency call data, is obtained.

In some embodiments, labeled emergency data 427 and proprietary emergency call data 424 is subject to one or more call filters 438 to focus on the region and time of interest. Regional filters may be necessary not only to constrain the amount of data being queried, but also because there may be specific attributes of that region that must be applied to the model. For example, the city of Chicago may apply different criteria for what constitutes a "High Priority" medical call than what Seattle uses. Emergency data may be also filtered using the time of the call, based on the time window for the emergency prediction. For example, if our spatiotemporal call prediction model produces a call density prediction for a given hour of the week, and the model depends on data from that same hour for the past 8 weeks, we only want to query that specific data to reduce computational expense of processing a massive amount of data. Each prediction model in module 420 may either use the same architecture or be modified for the nature of call or emergency type and region, depending on experimental results.

In some embodiments, the call records may be filled using call nature or emergency type and/or emergency priority. As shown in FIG. 4A, prediction models for police, fire and medical emergencies may be different (see 442, 444, 446). In some embodiments, by generating prediction models for different types of emergencies, the emergency predictions is more accurate and allows optimization of resource allocation for specific type of emergency resource (e.g., medical resources, police resources).

Although not shown, prediction models for specific priority levels are also contemplated. For example, emergency call density estimates for "high priority" fire emergency calls for each hour for the next week may be generated. The local fire department may use these predictions for resource planning for the upcoming week.

In some embodiments, a generalized model 448 may be used for generation of call density for all emergency types and priority. In some embodiments, unlabeled data is optionally used for generating the model. In some embodiments, the output comprises the predicted call density per hour in a region. For example, a PSAP that is unable to provide updated, labeled call data on a regular basis, but would like an estimate how many call takers or dispatchers should be assigned for the upcoming week. For resource planning, in some embodiments, the output of a generalized model 448 is used to estimate the total number of calls per day.

Thus, in some embodiments, unfiltered data is used to generate or train a generalized model 448 not based on a specific emergency type. Here, the proprietary emergency call data 424 lacks label information such as emergency type, and as a result cannot be used for emergency specific predictions without further data augmentation. In some embodiments, proprietary emergency call data 424 is sent to an emergency call record point cloud 434, and subsequently used to help generate or train emergency specific predictive models.

In some embodiments, the point cloud is a repository of call data from the geographical area or timeframe of interest (or the spatiotemporal space that is being estimated). The point cloud may include all available call records including unlabeled emergency data as long as it includes location data. Using the point cloud, a high-dimension space to be approximated by a lower-dimension point cloud by capturing geographic and temporal characteristics. In some embodiments, to use the point cloud, points in a cloud in the geographic area (and/or temporal space, emergency type, emergency priority, etc.) are sampled to form an adjacency graph, which are optionally incorporated in the spatiotemporal emergency prediction based on concepts such as manifold learning theory. For example, assuming that an emergency call will only be made from a location where the caller is actually located, since they are dialing on their mobile device or a landline, it is expected that a high density of emergency calls will be made from urban areas or on highways corresponding to a high population density. Conversely, low density or no emergency calls may be expected from the middle of a lake or a dense forest. Emergency calls may still occur in these areas (e.g., a boating accident or a lost hiker), but in observing the locations of all of the calls in aggregate, we begin to see the "shape" of the city and have a better understanding of where calls are likely to occur. This facilitates more efficient computation of call predictions, since we do not waste time calculating predictions in areas where people are not likely to be located. In this way, population density and human mobility may be captured in the spatiotemporal model.

In some embodiments, the underlying spatiotemporal characteristics may change over time and a point cloud with the newest data (e.g., current emergency data, proprietary data stream) may provide a current representation of the spatiotemporal geometry for the model. In some embodiments, the emergency data that is sampled in the point cloud may be chosen to focus on the geographic area, time frame or emergency type of interest, which may be a specific date of interest (e.g., daylight savings day), time of day (e.g., afternoon), etc. In some embodiments, the one or more prediction models are generated by a spatiotemporal emergency call prediction module 420. In some embodiments, the module 420 generates one or more batch predictions, which are optionally stored on a batch serving database 458. In some embodiments, the prediction results are made available or provided to certain administrators, users, customers, emergency services, or others via one or more of dashboards, analytics, and resource management tools 490.

In some embodiments, labeled emergency data 427 and proprietary emergency data 424 are input into the spatiotemporal module 420. In some embodiments, obtaining labeled call data requires data-sharing agreements with municipal and county data resources. Therefore, in some embodiments, this method is capable of producing category-agnostic predictions of call volume converting proprietary unlabeled emergency data into the labeled emergency data. This provides a readily accessible tool for emergency resource planning (e.g., by a PSAP), and serves as a baseline model for future enhancements as additional sources become available. In some cases, partially labeled or unlabeled emergency data for spatiotemporal emergency prediction.

In some embodiments, a model undergoes retraining or recalculating a model. In some embodiments, retraining or recalculating takes place at least every hour, day, week, month, or other time block. In some embodiments, data regarding geographical boundaries are used for providing visualization of one or more predictions to a subject such as, for example, an EDC, an EMS, a PSAP, an administrator, customer(s), user(s) affected by an emergency prediction, or emergency response personnel. In some embodiments, data regarding geographical boundaries is used for visualization (e.g., PSAP, zip code, census tract, city, etc.).

Incorporation of proprietary emergency data into the module 420 has several advantages. For example, including proprietary data stream entries in the point cloud 434 enables the capturing of current trends. In some areas, the underlying spatial characteristics change over time and by incorporating the recent emergency data in the point cloud, a more current representation of the spatial geometry is incorporated in the model. In some embodiments, recent emergency data is included in the point cloud to generate an up-to-date model even when the labeled emergency data may be older. In addition, in some embodiments, the proprietary emergency data comprises additional information about the subject including demographic information (e.g., age, sex, height, weight, etc.), medical information (e.g., allergies, conditions, etc.), other information (e.g., call duration, device type, etc.). In some embodiments, additional data, such as environmental data is incorporated into the module 420 to improve accuracy.

Figure 4B:
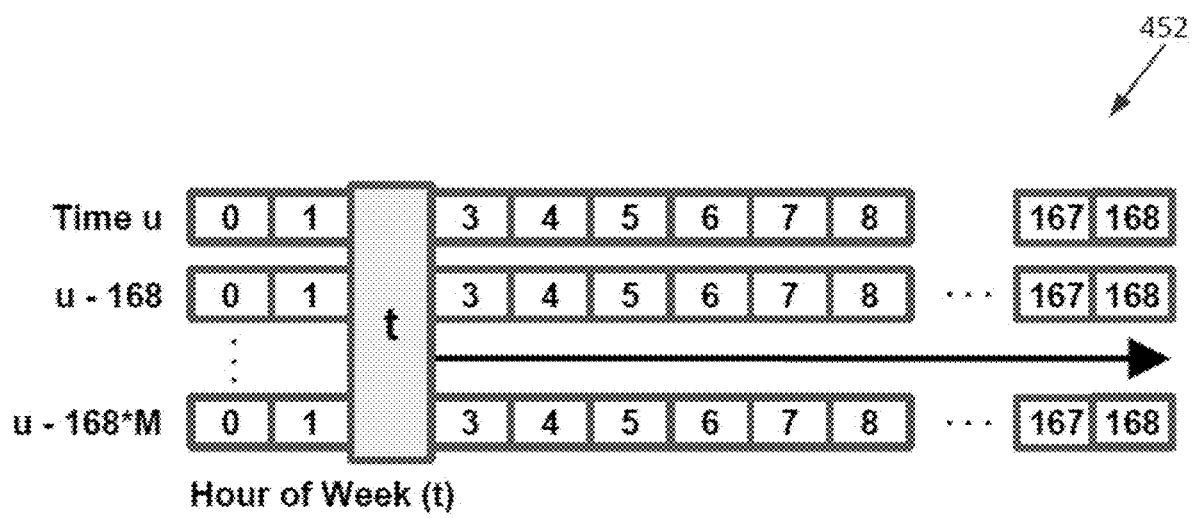

FIG. 4B depicts a timing diagram 452 for implementing one embodiment of a method for generating spatiotemporal emergency prediction. In some embodiments, a weekly spatiotemporal model is used to capture the weekly seasonality in emergency data and make spatiotemporal predictions regarding an upcoming week. As shown, the hours of a week (168 hours) are depicted in this embodiment.

In some embodiments, emergency predictions for volume or density for emergency calls for a defined geographic area (e.g., an entire city, county, or PSAP) and defined time period (e.g., 1 hour) is used for improving emergency response and planning. For this purpose, a spatiotemporal model is capable of providing near-term predictions at desired resolutions (e.g., 1 hour, 12 hours, 1 day, 1 week, 1 month, or other defined time period or time block.).

In some embodiments, for making emergency predictions for the future (e.g., a week later), emergency call data from the previous week and back to at least the previous M weeks is needed. In some embodiments, emergency data is based on a desired sliding time window M, which includes location, time, and optionally, additional information (such as call duration, response time, and/or assigned PSAP). In some embodiments, emergency data from multiple years are used for comparing predictions with aggregate averaging methods. In some embodiments, this model uses call data labeled by response category and/or priority.

In some embodiments, the spatiotemporal predictions are made on a smaller geographical area (1 km×1 km area) and aggregated over a larger area (e.g., a PSAP, zip, tract). Thus, spatiotemporal predictions using a point cloud (based on an adjacency graph) need not be constrained to a gridded area. Similarly, in some embodiments, the spatiotemporal predictions are made for one or more time blocks per day and aggregated. In some embodiments, aggregation is for 4, 8, 12, or 24 hours, including increments therein.

In some embodiments, specialized models improve the prediction accuracy of the spatiotemporal emergency call prediction. For example, in some embodiments, emergency calls requiring an ambulance dispatch (corresponding to high-level of priority) are modeled separately from non-ambulance emergency calls. In some embodiments, specialized models for different types of emergencies (medical, fire, police), for large timeframes (e.g., 1 month, one season, 1 year, etc.), for large areas (e.g., towns, cities, regions) are created and used to generate predictions. In some embodiments, incorporation of human mobility/population density is used to improve the prediction accuracy. In some embodiments, prediction(s) based on type of emergencies (e.g., medical emergencies) are helpful in planning and allocating emergency medical resources (e.g., ambulance, EMTs, etc.).

In some embodiments, the spatiotemporal predictive models are based primarily on recent and historical emergency call data (e.g., 911 call data). Various models may be used for generating the spatiotemporal predictions including discrete location, continuous location (e.g., Gaussian density function, kernel density estimation (KDE)), discrete and continuous time models. FIG. 5A depicts a method for generating spatiotemporal emergency prediction using kernel warping technique. As shown, in certain embodiments, a Kernel WARP model is used for generating spatiotemporal predictions. A benefit of the kernel warping method is that it utilizes a graph Laplacian of a larger point cloud of data, which can be interpreted in a Bayesian sense as imposing a prior that accounts for spatial features. Thus, the historical emergency call data is leveraged as a sort of "map" of an area and reduces the need for including complex boundary conditions that can be computationally expensive compared to other models such as generalized methods of moments (GMM), Smoothing Technique Kernel Density Estimate (stKDE).

In some embodiments, emergency predictions are generated and stored for each available geographic region and emergency category: Fire, Medical, and Police. Other categories (water rescue, pet rescue, car crash, etc.) and subcategories (e.g., crime categories, etc.) are contemplated. In some embodiments, emergencies may be categorized into more than one type. For example, in some embodiments, a car crash requires assistance from fire, medical and police emergency resources.

In some embodiments, a variety of priority levels are used to label emergency calls. For example, in some embodiments, an emergency that requires dispatching an ambulance is categorized by "Priority," "High Priority," "High Severity," "High Risk," or other priority level. In some embodiments, two to five levels of priority are used by an EDC or PSAP. In some embodiments, emergency data obtained from that EDC or PSAP is filtered for each priority level. In some embodiments, one or more specialized models for specific priority levels are generated.

As shown, labeled emergency data 527 may be generating the spatiotemporal emergency prediction using Kernel Warping. The labeled data 527 may be filtered by region [r], category [c] or emergency type, priority [p], hour of the week [t], number of weeks [M], etc. to focus on the region and time of interest.

The point cloud 534 is a large repository of points (such as emergency calls from a specific area) that represents the spatial and geographic characteristics of the area that the labeled data covers. In some embodiments, it is assumed that information about the high-dimension space is capable of being approximated by a lower-dimension point cloud. To use the point cloud, points in the point cloud 534 are sampled to form an adjacency graph representing the spatial geometry of the area. In this way, the Kernel warping takes into account "the spatial characteristics of the area for generating emergency predictions.

In an exemplary embodiment, the 1-hour spatiotemporal kernel density estimate (stKDE) may be calculated (step 541). Then, the labeled data may be clustered into subregion components (step 543). From the point cloud 534, "n" spatial points around each component may be sampled (step 545) and an adjacency graph and Laplacian Matrix may be constructed (step 547). Kernel warping may be done using equation [2] in step 549.

In some embodiments, a spatiotemporal prediction model is re-created or re-trained to improve prediction accuracy. Here, in certain embodiments, the spatiotemporal prediction model is updated using the following steps: (1) parameter calculations for H and λ at least once every defined time period (e.g., once a week); and (2) predictions generated on a sliding window for every time block in the next defined time period (e.g., every hour for the next week).

FIG. 5B depicts an exemplary input emergency call data on a map of City X for visualization. City X may include several PSAP jurisdictions—PSAP 1, PSAP 2, PSAP 3, etc. City X may also include several highways—Highway 1, Highway 2, Highway 3 and geographical features such as Island 1. As shown on map 552, emergency calls in exemplary emergency data are visualized as dots (see, e.g., 553) on the map, in some embodiments. Using kernel warping, in some embodiments, the emergency data in FIG. 5B is used to generate a kernel density map, as shown in FIG. 5C.

Referring to FIG. 5C, an exemplary kernel density map 558 is shown. In some embodiments, the output from kernel warping is a set of predicted kernel density estimates (KDE) for calculated components in each region within a time window/time block/defined time period (e.g., 1 hr.). In some embodiments, the output includes date, hour, region, category, component, KDE, or any combination thereof. In some embodiments, predicted call volume in a given region or PSAP is extracted from these estimated by computing the aggregate KDE sum over the area of interest. In some embodiments, in order to maintain fine resolution of predictions, the KDEs for each component are stored. In some embodiments, higher level aggregations or transformations are generated as needed for analysis, reporting, visualization, or any combination thereof.

As shown in FIG. 5C, in certain embodiments, KDEs (e.g., 554, 556) of different sizes are depicted as dark areas over the map of a city. In some embodiments, geographical boundaries (e.g., county lines) or emergency jurisdictional boundaries (e.g., PSAP boundaries) are depicted in solid lines (e.g., 555). The KDE 554 is shown over the downtown area of City X indicating a high density of calls. In some embodiments, the PSAP responsible for the area including KDE 554 (PSAP 1) may respond to these emergencies by allocating emergency resources in the downtown area. On the other hand, in some embodiments, the KDE 556 is located in a less densely populated area, but there may be a large number of calls due to large volume of traffic on Highway 1. In some embodiments, the PSAP responsible for the area including KDE 556 (PSAP 3) may respond to these emergencies by allocating emergency resources along the highway. In either case, the KDEs (554, 556) provide valuable emergency information that is usable by a PSAP for emergency resource planning.

In some embodiments, using population density information, a prediction algorithm normalizes for population and identify areas with high-level of risk per capita. In some embodiments, additional data such as environmental data (such as weather, traffic, etc.), human mobility data, and/or event data are used to generate the prediction model for higher prediction accuracy.

When a medium or large-scale emergency event occurs, it is common for multiple emergency calls to occur reporting the same incident. For instance, in the case of a traffic accident, occupants in several other vehicles in the area may call 911 within a brief time window. These emergency calls will likely come from a constrained geographic area within visible range of the accident. For a larger event such as an earthquake or a plane crash, many callers may report the event from a wider geographic area given the high visibility of the incident. Because PSAPs have limited and sometimes overlapping areas of responsibility, emergency service providers may not be aware of these related calls, and may not understand that a larger-scale event is taking place that requires more emergency services than a typical call.

Provided herein are systems and methods for monitoring real-time or near real-time emergency calls and autonomously detecting clusters. In some embodiments, a cluster of emergency calls denotes a group emergency such as a man-made or natural disaster. In some embodiments, disclosed herein are early warning systems for notifying emergency resource centers and providing subjects or users with notifications regarding significant emergency events. In some embodiments, cluster detecting approaches, such as expectation-based space-time permutation scan statistic, Bayesian scan statistic, and time series models for detecting acceleration of call volumes are used.

In some embodiments, the primary output of an emergency anomaly detection module is the detected clusters of emergency calls. In some embodiments, clusters are updated either at the time of each incoming call or on a discrete schedule such as a time block or other time period (e.g., every 5 minutes, 15 minutes, etc.) depending on computational demand. In some embodiments, the output includes the center of the cluster, radius, start/end time, p-value, number of calls, expected number of calls, or any combination thereof.

In some embodiments, the clustering algorithm is run at a finer resolution than call prediction to enable near real-time notifications, such as every 5, 10, 15, 30, or 60 minutes, including increments therein. In some embodiments, one or more thresholds are used for defining an "emergency event."

Figure 6A:
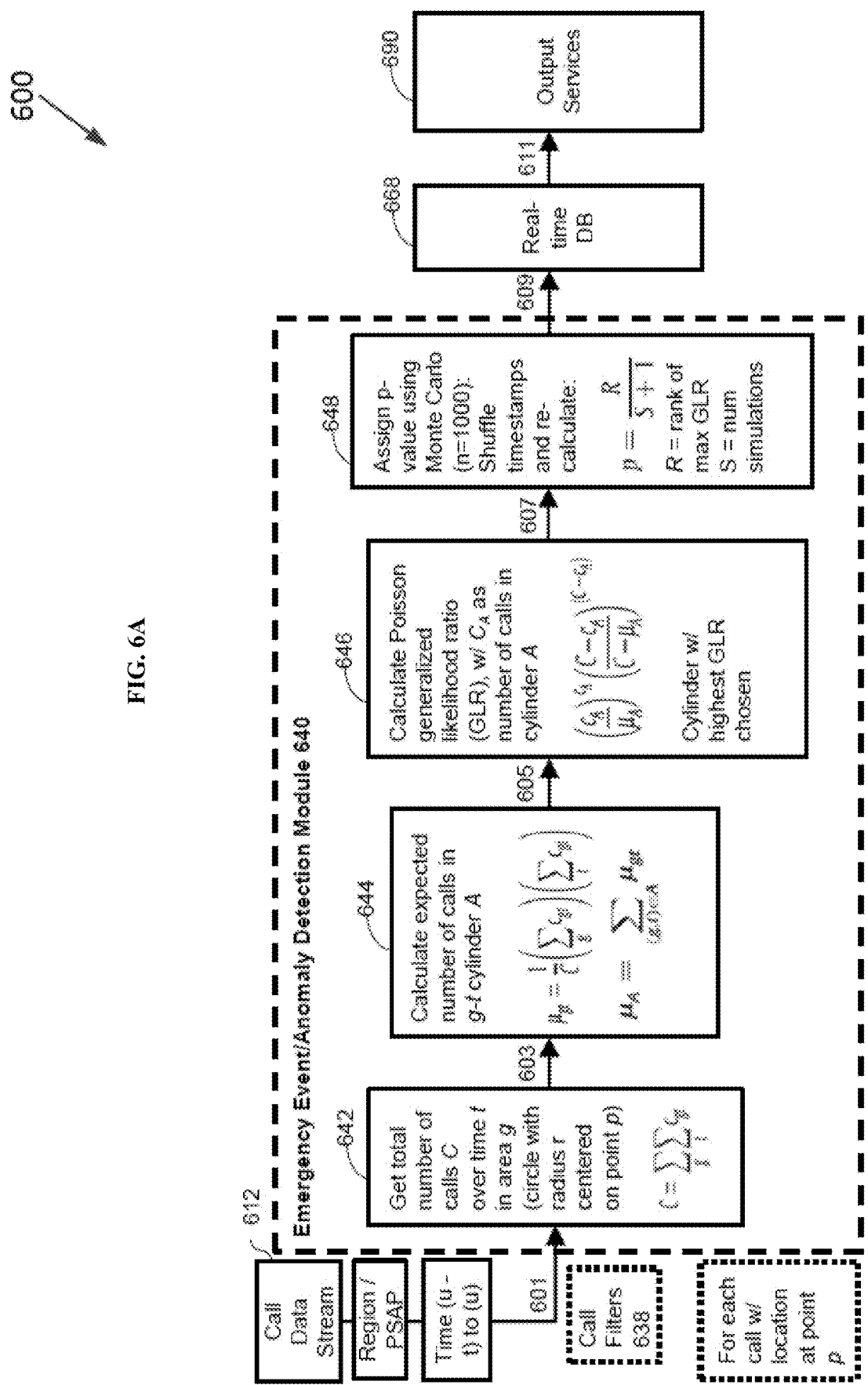
FIGS. 6A and 6B depict schematic diagrams for implementing one embodiment of a method for detecting an emergency event or anomaly.

FIG. 6A a method 600 for an emergency event or anomaly detection utilizing a space-time permutation scan statistic. The process for calculating the space-time permutation scan statistic are depicted in steps 642, 644, 646, 648.

As shown in FIG. 6A, one method for anomalous cluster detection is by calculating a Poisson generalized likelihood ratio (GLR) and finding a maximum GLR. Call stream data 612 is obtained from one or more PSAPs and filtered using call filters 638. For each call with location at point p, an anomaly detection module 640 applies a predictive model to the call stream data to detect any anomalies/clusters. In this exemplary embodiment, a space time permutation scan statistic is used as shown in FIG. 6A to generate anomaly prediction(s) which is provided to a real-time serving database 660. In some embodiments, anomaly predictions/detections are provided to a subject or user via a dashboard, analytics, resource management tools, or any combination thereof 690.

As shown, the space-time permutation scan statistic first calculates the total number of calls Cover the time t in the area g, which is a circle with radius r centered around the location of the call. It then calculates the expected number of calls within that radius, and uses that to calculate the Poisson generalized likelihood ratio (GLR). This process is repeated multiple times, gradually increasing the radius of r from r_min to r_max, and the result with the highest GLR is chosen. The Monte Carlo method is then used to shuffle all of the points and re-calculate the GLR, which produces a p-value, or the probability that the point is within a cluster and not simply a random occurrence. If the point is indeed considered to be part of a cluster (and falls within a preset threshold defining a significant cluster), the result is stored in the real-time serving database 668 and used by output services 690 (e.g., Dashboard, Analytics, Resource Management Tools)

Figure 6B:
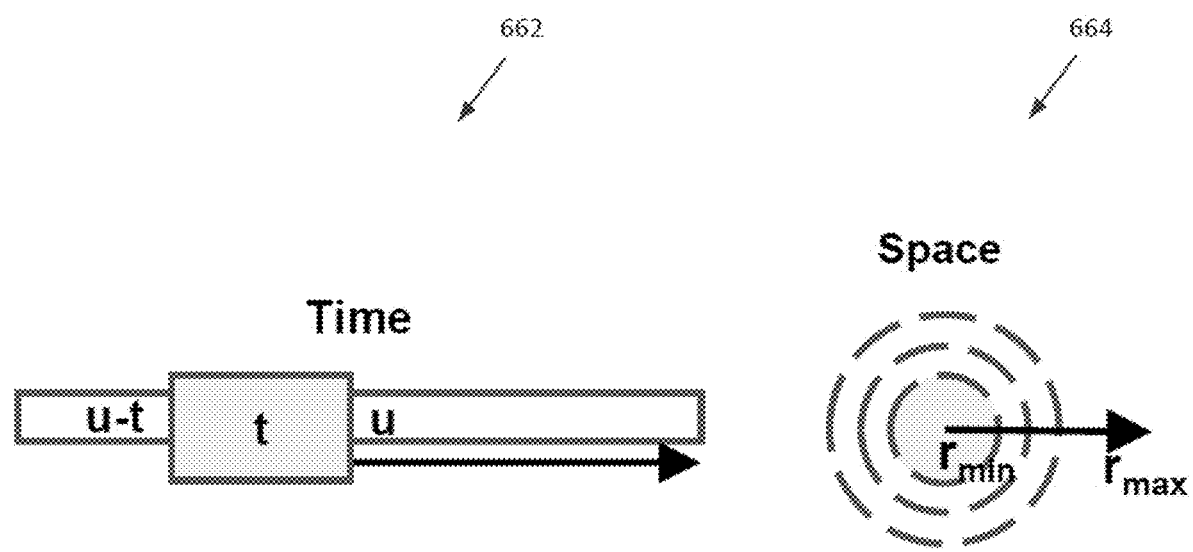

FIG. 6B depicts time and spatial aspects of the anomalous cluster detection. In some embodiments, time and area blocks are adjusted based on the population density and call volume in the area. In some embodiments, the time block is 30 seconds, 1 minutes, 5 minutes, and 10 minutes. 15 minutes, 30 minutes, etc. In some embodiments, the maximum radius is 0.5 km, 1 km, 3 km, 5 km, 8 km, 10 km, 15 km, 20 km, etc. For example, timing diagram 662 shows a time block "t" for anomalous cluster detection, which may be 15 minutes. The spatial diagram 664 shows an area block including the center of the space ($r_{min}$) and the outer radius ($r_{max}$). In some embodiments, the outer radius is at least about 1, 2, 3, 4, 5, 6, 7, 8, 9, or 10 km. In some embodiments, the outer radius is about 1, 2, 3, 4, 5, 6, 7, 8, 9, or 10 km.

Emergency response time is a critical factor in the outcome of many emergencies. Response time is highly dependent on availability and proximity of number of emergency response personnel, vehicles and equipment including: number and location of emergency response vehicles (ERV) available at the time of the emergency, distance from call location, traffic conditions, nature and priority of call, and others. In order to minimize response time, dispatchers in PSAPs need to understand how these factors interact and optimize their resources accordingly. Thus, emergency data or data stream with predicted response times may be used for resource allocation and notifications.

Figure 7:
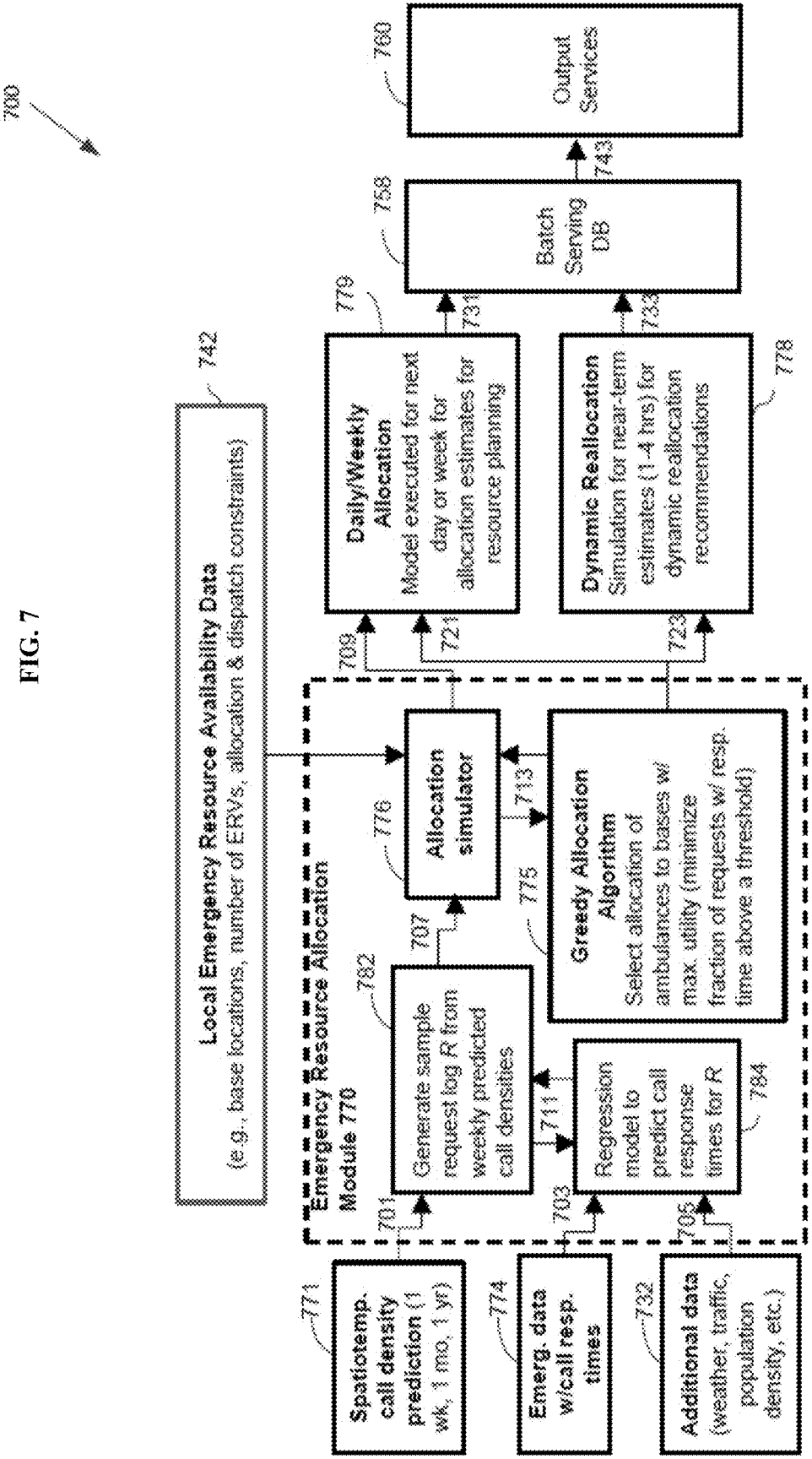
FIG. 7 illustrates an exemplary method for emergency resource allocation.

Disclosed herein are systems and methods for optimizing and recommending emergency resource allocation. As shown in FIG. 7, the system 700 has inputs regarding local emergency resources 742, spatiotemporal emergency predictions 771, emergency data with response times 774 and optionally, additional data 732 (e.g., weather). In some embodiments, a sample request is generated using spatiotemporal call density prediction(s). The availability data 742 (e.g., base locations, number of ERVs, allocation and dispatch constraints) may be inputted into the EPS by a resource manager or obtained from privately or publicly available sources or statistics In some embodiments, the sample request is analyzed by a regression model to predict emergency response time(s) for the sample request (steps 782 & 784). In some embodiments, the regression model is trained using emergency data comprising response times 774 and optionally additional data 732. The predicted call response time(s) and sample requests as well as local emergency resource availability data 742 may then be used by the allocation simulator in step 776.

In some embodiments, the allocation simulator 776 runs one or more simulations using the greedy allocation algorithm to optimize resource allocation in step 775. In some embodiments, multiple simulations are run to determine an optimized resource allocation. In some embodiments, the optimal resource allocation is generated ahead of time for more long-term future allocation (e.g., generally at least a day in the future). Such information is helpful for staffing personnel, for instance. In some embodiments, the optimal resource allocation is generated at least a day or week ahead of time (e.g., more long-term resource allocation on a daily or weekly basis) 779. Alternatively or in combination, the optimal resource allocation is performed as part of a dynamic reallocation in which the model generates real-time, near real-time, and/or near term optimized resource allocation 778 (e.g., near- or short-term such as within the next 1/4/8 hours). In some embodiments, both short-term and long-term allocation estimates (optimized resource allocation) are calculated. In some embodiments, allocation estimates are stored on a batch serving database 758 and used by output services 760 (e.g., simulator, analytics) In some embodiments, the allocation estimates are provided to a user or administrator via a dashboard, analytics, resource management tools, or any combination thereof.

In some embodiments, additional data 732 for enhancing the model includes information about local emergency service resources or projections, travel times based on traffic, significant event data. For accurate predictions of response times, in some embodiments, the model incorporates complex allocation restraints such as required time between trips, reallocation travel time, non-availability conditions, etc.

The prediction accuracy of module 770 is tied to accurate predictions of call volumes by each hour of a day from the spatiotemporal module (not shown). In some embodiments, when the prediction accuracy for spatiotemporal emergency predictions is low in some PSAP areas, the allocation model is applied on historical emergency data, using a sample of calls from the same hour of the day on multiple weeks as a proxy for predicted demand.

In addition to the spatiotemporal emergency predictions, the module 770 utilizes predictions from techniques for anomalous cluster detection, prediction of response times using data augmentation and other methods.

In some embodiments, projected short-term emergency resource levels for a geographic area are predicted using an objective function based on hotspot analysis. In some embodiments, by utilizing information on local-level emergency resources and providing an optimized recommendation for positioning and resource allocation, the module 770 is able to make recommendations that are implemented by EDCs, PSAPs, private dispatch centers, mapping software, operations center, corporate security, health systems, etc.

In some embodiments, the allocation model is specialized for specific type of emergencies such as medical, fire, or police in order to focus on allocation of specific type of resources. In other embodiments, multiple emergency types are handled by the same model because many emergencies need emergency response from various types of emergency resources. For example, in some embodiments, an ambulance and a fire engine are both dispatched when there is a fire in a building.

Various techniques and methods are capable of being used for evaluation of simulations. An exemplary method is the greedy allocation algorithm, for example, for providing a recommendation for allocating ERVs to known base locations to respond to upcoming call volumes. Here, the objective is to allocate vehicles in such a way that response time is minimized. In some embodiments, risk based allocation is considered, which optimizes allocation to ensure a threshold of calls meet a target response time (e.g., less than 10% of calls have a response time greater than 10 minutes).

In some embodiments, the availability and frequency of data on emergency resources limits the resolution of this model to shift (8-hours) or daily. In some embodiments, specialized models for higher resolution are developed. In some embodiments, various models are capable of being used for anomalous cluster detection including unsupervised anomaly detection, supervised anomaly detection, or semi-supervised anomaly detection.

In some embodiments, in addition to daily and weekly allocation 779 optimization and recommendations, dynamic reallocation of resources 778 is recommended based on predicted near-term call volumes (in the next 2-4 hours). For example, the current allocation of vehicles is considered and the impact on response time for reallocating them to meet upcoming demand. For example, in some embodiments, vehicles are identified for moving to optimally meet the projected demand in 2 hours.

In some embodiments, anomalous cluster detection is carried out for a city, such as City X in FIG. 5B. In some embodiments, there are several PSAP jurisdictions within City X, which handle emergency calls from different areas of the city. In some embodiments, when a collective emergency such as an earthquake or a terrorist attack occurs, there is a sudden increase in emergency calls from certain sections of each PSAP. Using anomalous cluster detection, the clusters within different PSAPs are monitored in real-time or near real-time. In some embodiments, clusters of calls are detected in different PSAP areas. In some embodiments, notifications and/or recommendations regarding diverting emergency resources to affected locations are sent to the associated PSAPs. In some embodiments, dynamic reallocation of emergency resources is carried out within different PSAP areas to respond to the group emergency event.

Model Update

In some embodiments, the predictive models are updated to maintain desired predicting accuracy level and producing acceptable results. In some embodiments, when models are updated, new data that has become available since the last model update is added to the training or test set for the algorithm and/or the model parameters are recalculated with the new data. In some embodiments, a parameter tuning process such as a grid search is used to select the best parameters.

In some embodiments, predictive models are evaluated for updating or automatically updated at predetermined intervals or upon triggered events. In some embodiments, a predetermined interval is a time period or time block such as, for example, 5 minutes, 15 minutes, 1 hour, 1 week, or 1 month.

In some embodiments, updating the predictive models is triggered by certain events that occur within the system. In some embodiments, a trigger is when new data becomes available. For example, when a certain PSAP has agreed to provide emergency call data, it triggers an update and/or new prediction and gets recommendations for emergency resource allocation. In some embodiments, a data ingestion tool monitors a connection to the PSAP data source and imports the new data and triggers the predictive model to update.

In some embodiments, model updates are modified by adjusting a prediction accuracy threshold. As new data arrives in the system, in some embodiments, a process compares the results of previous predictions with the actual values. In some embodiments, when the difference is larger than a specific threshold, the model is updated. For example, a model has made predictions of emergency call density within a PSAP region for every hour of the day for a week. At the end of the week, the PSAP shares its emergency call records to be combined with the proprietary emergency call records, and a process compares the actual call density that has occurred that week to the predictions using a selected fitness measure. If the fit is not within a determined range, the model is re-created (e.g., re-calculated or retrained) using the most current data.

In some embodiments, model updating is also dependent on the computational power required to train the model such as a prediction algorithm. In some embodiments, more complex models require more time to train and are trained infrequently to minimize down-time from re-training/updating. Thus, in some embodiments, the triggers and threshold for prediction accuracy are adjusted to reduce model updates. In some embodiments, less computationally expensive models are retrained more frequently, such as every minute, every 5 minutes, or some other time block or time period, or whenever a new call comes in.

Updating Data Augmentation

In some embodiments, the data augmentation module (e.g., 210) provides one or more models that provide predictions to each call that arrives in the call data stream. In some embodiments, a model is applied to each incoming call in near real-time.

In some embodiments, the classification and regression models in this module are trained on labeled data in the proprietary database (e.g., Master DB) or from other sources that have the actual labels including response times matched with emergency calls. In some embodiments, there are separate models trained for different geographic regions, based on factors such as the availability of labeled data in each region and differences in local emergency response operating procedures that could affect model parameters. These separate models have the same architecture, but utilize different subsets of data to calculate and train the parameters.

Updates to modules and/or algorithms are dependent on the availability of labeled data. In some embodiments, models are triggered to update when new data for the corresponding geographic region becomes available. In some embodiments, when there is a continuous stream of incoming labeled data, the updates are scheduled on a periodic basis or triggered once a certain number of new labeled records have arrived. In some embodiments, this module also utilizes new labeled data to validate the accuracy of the model. In some embodiments, accuracy is calculated using a fitness measure applied to the predictions made since the last model update compared to the new labeled data. In some embodiments, when an accuracy threshold is not met, the model is updated.

Updating Anomalous Cluster Detection

In some embodiments, the anomalous cluster detection module (e.g., 240) detects possible emergency events in near real-time by detecting clusters of calls. In some embodiments, the model contains several parameters that is specific to a region, such as the time window and maximum radius to scan for possible clusters. In some embodiments, to set the parameters, labeled emergency data is applied to the model and parameters are tuned to ensure a desired accuracy threshold is met. In some embodiments, the model is then applied to incoming calls. In some embodiments, the model is validated by comparing the detected clusters for incoming calls to actual emergency events once labeled data becomes available. In some embodiments, the prediction model is updated periodically or when triggered. For quick calculations, simpler predictive models are used and updated more frequently.

Updating Spatiotemporal Call Prediction

In some embodiments, the spatiotemporal module (e.g., 220) provides call density predictions for a specific time period, such as every hour of the next week. In some embodiments, the predictions are recalculated on a frequent basis if desired (daily or hourly). In some embodiments, when training the model parameters is computationally expensive, updates are made less frequently (e.g., no more than once every week, month, etc). In some embodiments, in the case of the kernel warping method, the model parameters related to the spatial characteristics of the region are robust and are retrained once a week or less. Here, periodic model update may be appropriate.

In some embodiments, updating the model and producing new predictions is somewhat dependent on the availability of labeled data. In some embodiments, when a PSAP provides labeled call data only once a week, updates are made for specialized prediction models based on labels such as, for example, police, fire, or medical models on a weekly interval. Alternatively, in some embodiments, when there is an acceptable level of prediction accuracy in the call nature and priority predictions in the data augmentation model, the model leverages the proprietary emergency call data to run more frequently and provide updated call density predictions.

In some embodiments, the model performance is validated by comparing predictions to the actual call density when labeled data is available. In some embodiments, if the accuracy of the predictions falls below a certain threshold, the model is triggered to update by recalculating parameters.

Updating Emergency Resource Allocation

In some embodiments, the emergency resource allocation module 270 leverages the output of the spatiotemporal emergency prediction, and therefore follows similar considerations for updating. In some embodiments, the parameters of this model are specific to each region (e.g., geographic area), since each will have different emergency resource data and constraints. In some embodiments, the model is validated when labeled data becomes available and triggered for update if certain thresholds are not met.

In some embodiments, a model is run weekly to provide resource allocation recommendations for planning purposes. Alternatively, in some embodiments, if current information regarding the available emergency resources in an area is available, the model is used to provide near term reallocation recommendations.

Emergency Auto-Detection by a Device

In some aspects, disclosed herein are methods for a communication device to determine, based on available data, if a user is in need of, or is likely to be in need of, emergency assistance, the method comprising: determining by the communication device, on an autonomous basis, and based on available data regarding the user, data about the environment around the user, and information about the communication device, whether or not the user of the communication device is in an emergency situation that requires emergency assistance for the user; responsive to determining, at the communication device, that the user of the communication device is in need of emergency assistance, and that the need for emergency assistance for the emergency situation has not been responded to, constructing a request for emergency assistance based on a current status of the user derived from meta-data available about the user, the communication device, and the environment around the user and the communication device; sending the request for emergency assistance to an EDC and/or EMS; responsive to detecting that the EMS and/or EDC has acknowledged reception of the request for emergency assistance, providing additional information to the EMS and/or EDC regarding data that a decision to generate the emergency alert was based on; upon determining that there is additional information available about the emergency situation in addition to the information already shared with the user, the EDC, and/or the EMS, analyzing the additional information along with the information already shared, and upon determining that the analysis yields a different conclusion about the user health status as compared to user health status previously shared with the user, the EDC, and/or the EMS, sharing the different conclusion and the additional information, with the user, the EMS, and/or the EDC; checking for additional meta-data information about the user, the communication device, and the environment on a periodic basis and, upon finding significantly new meta-data information, analyzing the additional meta-data information and sharing a result of the analysis of the additional meta-data information and the additional meta-data information with the user, the EMS, and/or the EDC; and actively managing communication of the meta-data information and results of analysis performed on the meta-data between the communication device and any communication devices of the EMS and/or EDC. In some embodiments, if an emergency situation is detected by the communication device, the method further comprises determining, at the communication device, a potential threat to the user, a type of the threat, a possible impact of the threat to the user, the possible ways for resolving the threat, and/or potential sources of help available near to the user. In some embodiments, the method further comprises determining, at the communication device, whether to raise an alarm with the user of the communication device at an interface provided on the communication device, in a situation in which the user is not under imminent threat. In some embodiments, the method further comprises determining, at the communication device, whether to raise the alarm includes determining whether to raise an alarm responsive to a raise in temperature of the environment approaching, but not yet having reached, a burning temperature. In some embodiments, the request for emergency assistance is sent to the EDC and/or EMS, responsive to the temperature of the environment having reached, or reaching, burning levels. In some embodiments, providing the additional information to the EMS and/or EDC includes one or more of providing raw data that the decision to generate the emergency alert was based on, providing a summary of the data regarding the user, the environment around the user, and about the communication device, and presenting a conclusion relating to the health status of the user and the reason for generating the request for emergency assistance to the EMS and/or EDC. In some embodiments, the request for emergency assistance constructed and sent by the communication device includes meta-data containing information about the location of the user and the user and the communication device, health data about the user, and information about the environment. In further embodiments, the location information includes one or more of GPS location, history of GPS locations, cellular base station triangulation information from the most recent base station the communication device was associated with, Wi-Fi positioning information, and other form of location information. In further embodiments, the heath data includes one or more of health status of the user, user health history, and information sensed about the user by sensors at the communication device and available at the communication device. In yet further embodiments, the information sensed about the user by sensors at the communication device includes information regarding one or more of user heartbeat, heart-rate, blood oxygen level, and pulse-rate. In further embodiments, the information about the environment includes one or more of air pressure, oxygen content in the air, carbon dioxide levels, and levels of other gases of interest. In further embodiments, the meta-data further includes one or more of a phone number of the communication device, a type of the communication device, and other relevant information about the communication device. In some embodiments, the communication device further makes a prediction, based on available meta-data about the user, communication device, and the environment, whether or not the user of the communication device is likely to be in one or more emergency situations, possible types of the one or more emergency situations, a time before which the one or more emergency situations will likely occur, a possible impact on the user, communication device, and the environment of the one or more emergency situations. In further embodiments, the communication device further keeps the EDC and/or EMS updated about the one or more emergency situations, and if there is a change in the possible time, or the possible impact, before the occurrence of the one or more emergency situations, and if the impact on the user of the communication device will be different from that indicated in a last update received by the EDC and/or EMS, about the one or more emergency situations. In some embodiments, the communication device establishes a data connection between the EMS and/or EDC, and the communication device autonomously and actively manages the data connection, and, upon sensing that the connection is severed, attempts to re-establish the data connection using an alternate data route between the communication device and a communication device of the EMS and/or EDC. In some embodiments, the communication device hosts an application client and communicates with the EMS and/or EDC via the application client, the application client analyzing the meta-data about the user, communication device, and the environment, generating a conclusion from this meta-data, making a decision about the status of the user from this analysis, constructing a request for emergency assistance, and sending the request for emergency assistance to an EDC and/or EMS, the application client further managing data connections, and meta-data information transfers between the communication device and the EMS and/or EDC.

In another aspect, disclosed herein are mobile communication devices configured to determine, based on available data, if a user is in need of, or possibly going to need, emergency assistance, and generate and communicate a request for emergency assistance, the communications device comprising: a user interface; physical interaction components; a location determination module; a communications module configured to send and receive messages, including a request for emergency assistance containing meta-data about the user, communication device and an environment around the user and the communication device, and an analysis of the meta-data, over a communications network; and a processor configured to: receive an indication of a location of the communication device from the location determination module; analyze meta-data information as provided to the processor by the communication module of the device, sensors on the device, user input via the user interface, the location determination module, the meta-data containing information about the user, communication device, and the environment, to determine whether or not the user of the communication device is in a current situation that requires emergency assistance; upon a determination that the user of the communication device is in need of emergency assistance, construct a request for emergency assistance based on a current status of the user derived from the meta-data available to the processor, and send the request, along with relevant meta-data, as determined by the processor, and conclusions derived from the meta-data by the processor, to the communications module of the communication device; establish a data communications link, via the communications module, to an EMS and/or EDC; and receive a real-time data from the sensors and locationing module on the communication device, regarding latest sensed health status and location of the user, and update the request for emergency assistance based on this information. In some embodiments, the mobile communication device is one of a Tablet computer, a smart phone, a laptop computer, a wearable device, or any other form of end-device used by a user. In further embodiments, the communication device hosts an application client and the processor interacts with the user of the device using the application client, and the application client is used to translate commands and emergency alerts from the processor into user recognizable actions. In further embodiments, wherein the mobile communication device is further configured to generate emergency alerts in a form of one or more of a voice command, video data, a text based message, or any other form of user-machine interaction that is understandable by a user. In further embodiments, the application client translates user input, including user responses to an emergency alert presented by the processor to the user on the user interface into machine code or commands the processor of the device can understand, and sends them to the processor. In further embodiments, the processor of the communication device communicates with processors of other communication devices, via the communication module of the communication device, and exchanges meta-data relevant to the emergency situation being responded to that the user of the communication device may be involved in, or any critical information about the user, the communication device, or the environment, that is permitted, by the user, to be shared with other communication devices, and based on the received meta-data information updates an existing request for emergency assistance, or constructs a new request for emergency assistance, either autonomously or in conjunction with processors of other communication devices, and relays this information to the user and sends the request for emergency assistance to an EDC and/or EMS via the communication module of the communication device.

Figure 9:
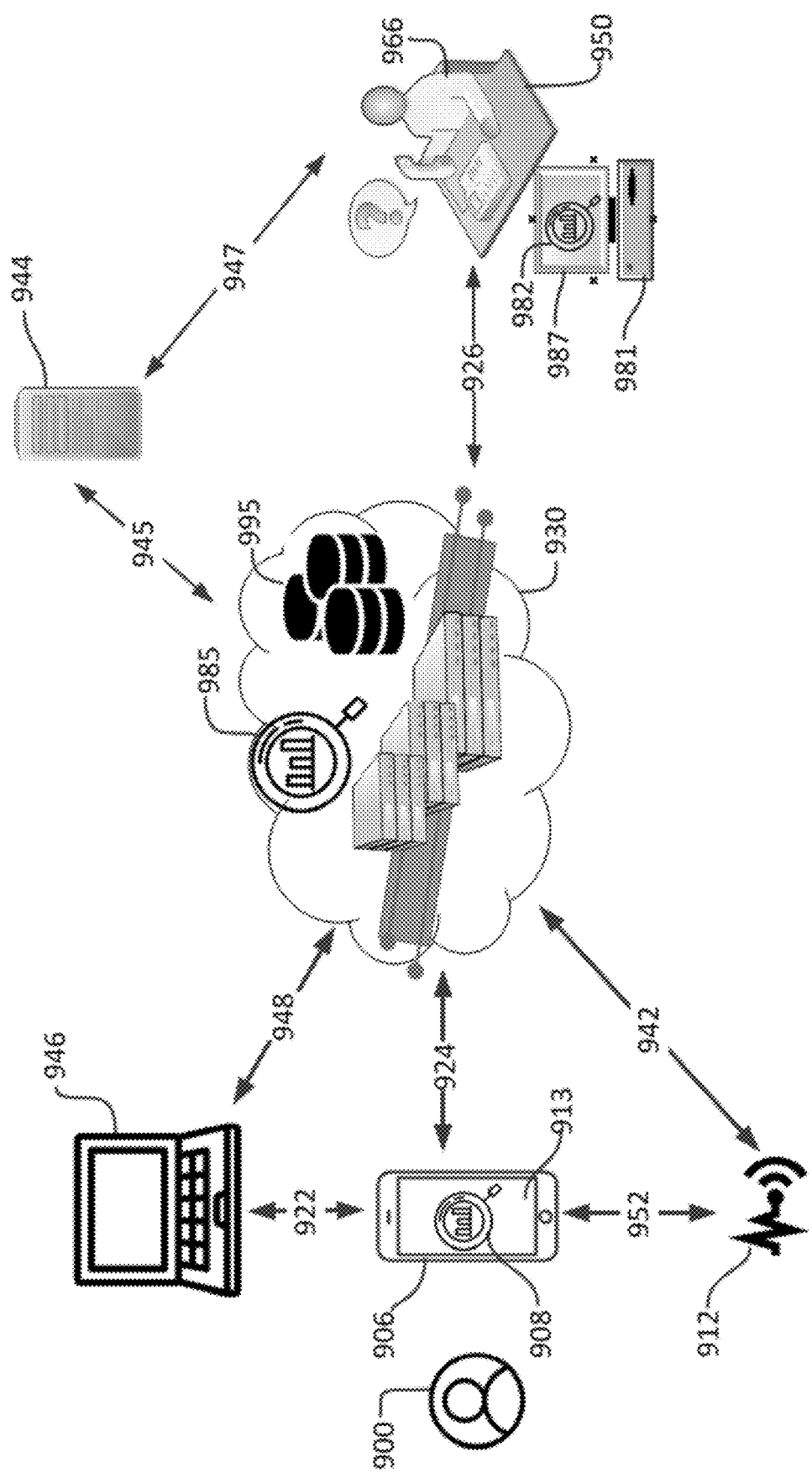
FIG. 9 illustrates one embodiment of an emergency prediction system for autonomously predicting emergencies involving a user's communication devices.

FIG. 9 illustrates one embodiment of an emergency prediction system (EPS) for autonomously predicting emergencies involving a user's communication devices. As shown, a user 900 may be the primary user of several communication devices including a smart phone 906, a laptop or tablet 946 and an IoT device 912 (e.g., a smoke detector in a smart home, a crash detection sensor in a vehicle). The device 906 may communicate with and share data with the other devices 946, 912 using one or more communication links 922, 952. In some embodiments, the device 906 may obtain sensor data from IoT device 912 and laptop 946 with information about the user 900 or his or her environment for making emergency predictions.

The device 906 may include a touchscreen 913 (which may function as a display and user interface). The device 906 may also include a computer program 908, which may include one or more modules of an emergency prediction program. Thus, the program 908 may detect or collect information about the user through device 906 and provide notification to the user 900 about pertinent threats and may also connect the user 900 to a dispatch center (e.g., EDC 950 or a private dispatch center) for emergency assistance.

In some embodiments, the emergency prediction system includes an EMS 930, which optionally connects the user 900 through devices 906, 912, 946 when there is an on-going emergency or a possible emergency. As shown, in some embodiments, the devices 906, 912, 946 connect to the EMS 930 through various wired or wireless connections such as cellular voice network, cellular data network, Wi-Fi, Bluetooth®, Internet-based networks, etc. For example, in one embodiment, the communication link 924 connects device 906 to the EMS 930, while the communication links 926 or 945 and 947 connect to the EDC 950 via a gateway 944. In some embodiments, the devices 906, 912, 946 collectively analyze the information about the user and environment to determine whether there is an on-going or possible emergency. In some embodiments, one device (e.g., device 906) is a master device that may determine whether there is an emergency and autonomously decide to send an emergency alert to a dispatch center for assistance.

Figure 14A:
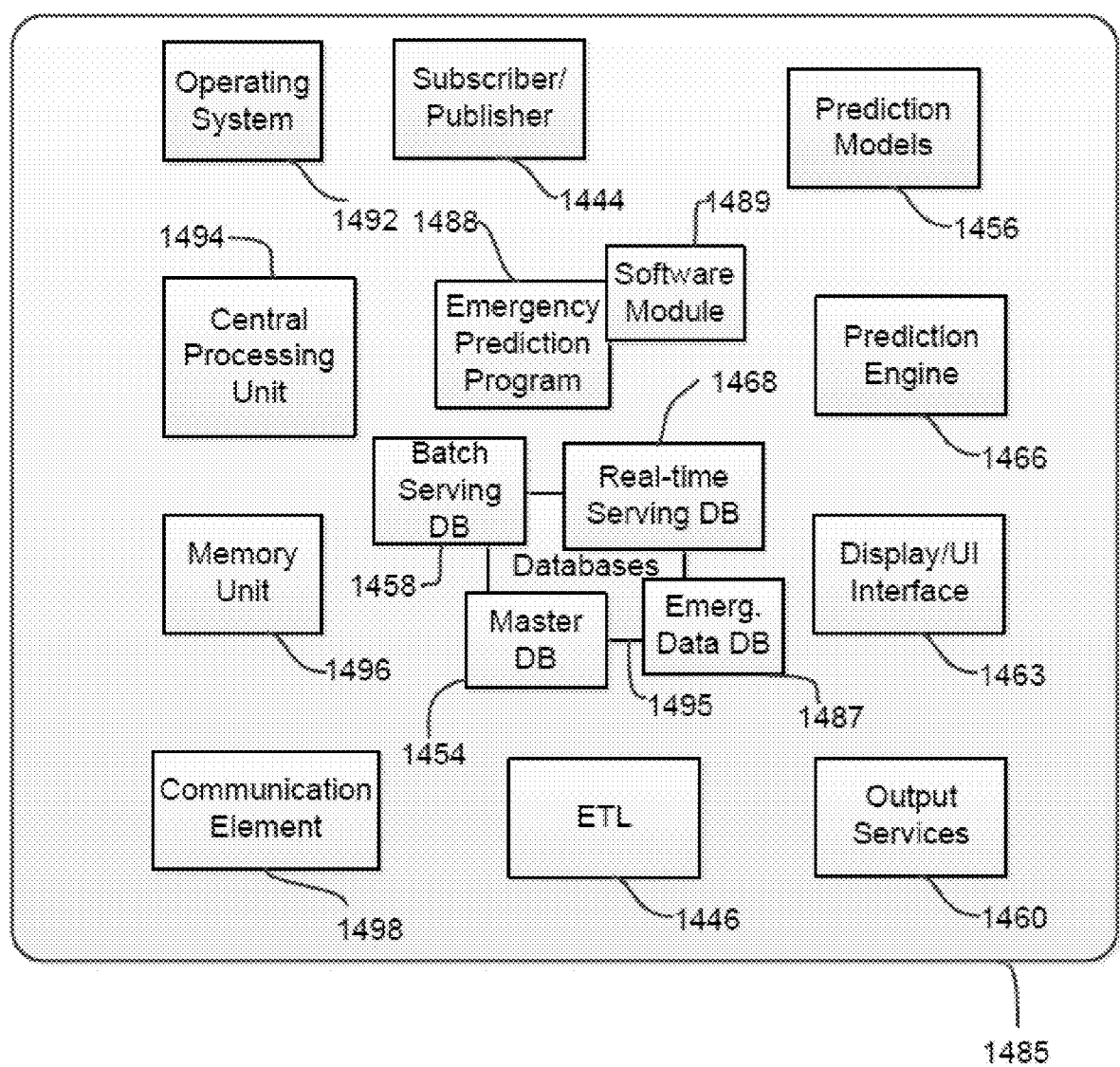
FIGS. 14A-14D depict components of embodiments of the emergency prediction system.

In some embodiments, the emergency prediction modules on the device 906 communicate with an emergency prediction server 985 in the EMS 930 where the analysis for emergency predictions are conducted. In other embodiments, the emergency predictions are generated on a prediction server 1485 (as depicted in FIG. 14A). In some embodiments, the emergency predictions are generated on the device 906. Databases 995 (e.g., Master DB, Batch Serving DB, Real-time Serving DB) and other components of the emergency prediction system are housed in the EMS 930.

In some embodiments, the devices 906, 912, 946 are in the same or different locations and the location data for the emergency may be shared with the EDC 950, where a dispatcher 966, a manager (not shown), or another personnel may be informed about the on-going emergency or possible emergency. In some embodiments, a computer system 981 with an emergency prediction program 985 is accessible to the dispatcher 966 or manager or other emergency personnel at the EDC 950. In some embodiments, the computer system 981 (e.g., a PSAP system with hardware and software components as depicted in FIG. 14D) includes a display or user interface 987 and an emergency prediction program 982. In some embodiments, emergency personnel receive notification about on-going and possible emergencies and allocation of emergency resources.

In some embodiments, the communication device 906 collects data from various devices including user input for analyzing whether there is an on-going or possible emergency for user 900. Based on this analysis, the EPS determines whether or not the user 900 requires emergency assistance. In some embodiments, the EPS determines the level of threat to the user 900 if possible emergency is determined including the type of threat, the possible impact of the threat to the user 900, and the environment, and the ways in which the threat can be remedied (if any).

Responsive to the determination by the EPS that the user 900 is in an, or a potential, threat, and after successfully generating and transmitting a request for emergency assistance to an EMS 930, positive affirmation of receipt of the request by the EMS 930 and/or EDC 950 is received, in some embodiments. In some embodiments, upon receiving a positive affirmation, the EMS 930 maintains the communication session the EDC 950 and user 900 with updated information and changes to the threat level.

Figure 10:
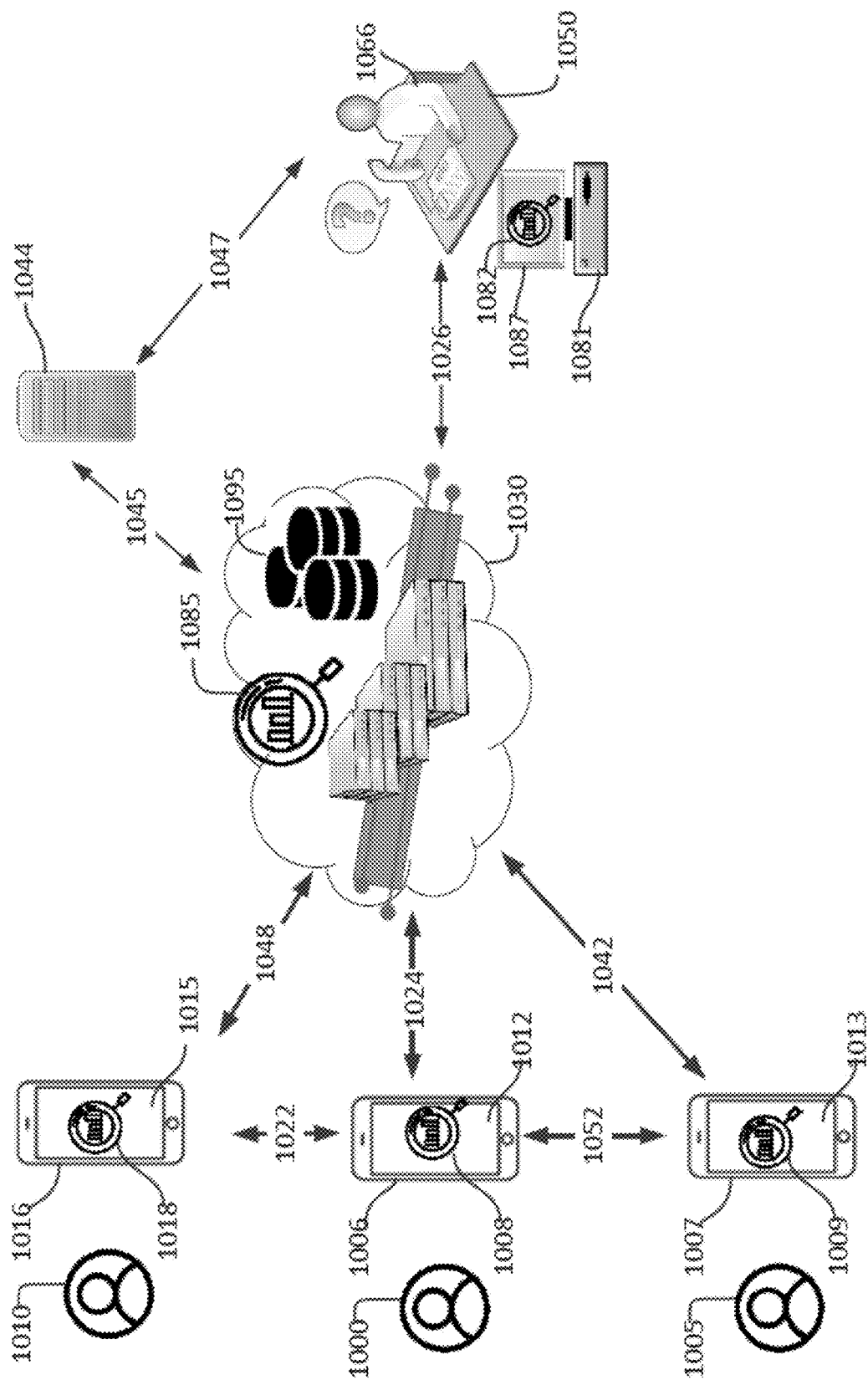
FIG. 10 illustrates one embodiment of an emergency prediction system for autonomously predicting emergencies involving a group of users.

FIG. 10 illustrates one embodiment of an emergency prediction system for autonomously predicting emergencies involving a group of users. As shown, a group of users, includes user 1000 with communication device 1006, user 1005 with associated device 1007 and user 1010 with associated device 1016. For instance, the group of users may have agreed to share data with each other and keep an eye on each other. In some embodiments, the users have authorized a group member (e.g., a family or friend) to make an emergency call in case of an emergency.

In some embodiments, the group of devices communicate with each other through peer-to-peer connections such as shortwave radio connections, Bluetooth® connections, etc. In such embodiments, the devices are able to communicate with devices in their vicinity. In some embodiments, the group of devices are able to communicate even when far away through internet-based or cellular connections.

In some embodiments, the device 1006 communicates with and shares data with the other devices 1007, 1016 about the user 1000 and his or her environment. In some embodiments, the devices shares data periodically or when there has been a trigger. In some embodiments, the device 1006 includes a touchscreen 1012 (which may function as a display and user interface). In some embodiments, the device 1006 also includes a computer program 1008, which often includes one or more modules of an emergency prediction program. Thus, in some embodiments, the program 1008 detects or collects information about users 1000, 1005, 1010 through member devices 1006, 1007, 1016 and provides notification to the users 1000, 1005, 1010 about pertinent threats affecting other members of the group. In some embodiments, the EPS connects the users 1000, 1005, 1010 to a dispatch center (e.g., EDC 1050 or a private dispatch center) for emergency assistance.

In some embodiments, the emergency prediction system includes an EMS 1030, which connects users 1000, 1005, 1010 through devices 1006, 1007, 1016 when there is an on-going emergency or a possible emergency affecting another group member. As shown, devices 1006, 1007, 1016 optionally connect to the EMS 1030 through various wired or wireless connections such as cellular voice network, cellular data network, Wi-Fi, Bluetooth®, Internet-based networks, etc. For example, in some embodiments, communication link 1024 connects device 1006 to the EMS 1030, while the communication links 1026 or 1045 and 1047 connect to the EDC 1050 via a gateway 1044.

In some embodiments, the devices 1006, 1007, 1016 collectively analyzes the information about the user and environment to determine whether there is an on-going or possible emergency. In some embodiments, one device (e.g., device 1006) is a master device that determines whether there is an emergency and autonomously decide to send an emergency alert to a dispatch center for assistance on behalf of another device or group member.

In some embodiments, the emergency prediction modules on the device 1006 communicate with an emergency prediction server 1085 in the EMS 1030 where the analysis for emergency predictions are conducted. In other embodiments, the emergency predictions are generated on a prediction server 1485 (as depicted in FIG. 14A). In some embodiments, the emergency predictions are generated on the device 1006. Databases 1095 (e.g., Master DB, Batch Serving DB, Real-time Serving DB) and other components of the emergency prediction system are housed in the EMS 1030.

In some embodiments, the devices 1006, 1007, 1016 are in the same or different locations and the location data for the emergency is shared with the EDC 1050, where a dispatcher 1066, a manager (not shown), or another personnel may be informed about the on-going emergency or possible emergency. In some embodiments, as shown a computer system 1081 with an emergency prediction program 1085 is accessible to the dispatcher 1066 or manager or other emergency personnel at the EDC 1050. The computer system 1081 (e.g., a PSAP system with hardware and software components as depicted in FIG. 14D). As shown, the system 1081 may include a display or user interface 1087 and an emergency prediction program 1082. In some embodiments, on the system 1081, emergency personnel receive notification about on-going and possible emergencies and allocation of emergency resources.

In some embodiments, the communication device 1006 collects data from various devices including user input for analyzing whether there is an on-going or possible emergency for user 1000. Based on this analysis, the EPS determines whether or not users 1000, 1005, 1010 require emergency assistance. In some embodiments, the EPS determines the level of threat to the users 1000, 1005, 1010 including the type of threat, the possible impact of the threat to the user, others and the environment, and the ways in which the threat can be remedied (if any).

Responsive to the determination by the EPS that one or more users 1000, 1005, 1010 are in, or a potential, threat, and after successfully generating and transmitting a request for emergency assistance to an EMS 1030, positive affirmation of receipt of the request by the EMS 1030 and/or EDC 1050 may be received. Upon receiving a positive affirmation, the EMS 1030 often maintains the communication session the EDC 1050 and users 1000, 1005, 1010 with updated information and changes to the threat level.

Figure 11:
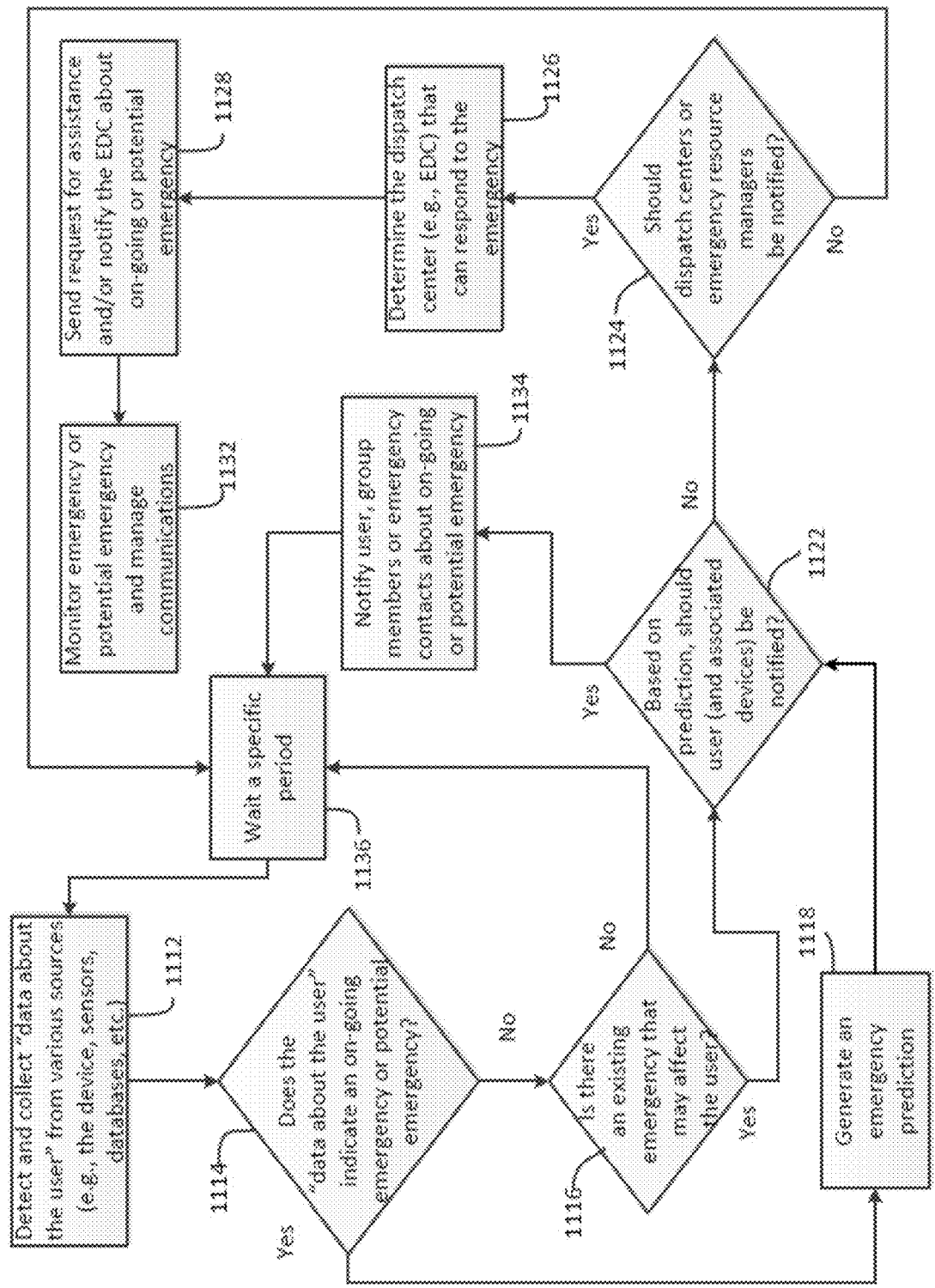
FIG. 11 depicts a method for real-time or near real-time emergency prediction and notification.

FIG. 11 depicts a method for real-time or near real-time emergency prediction and notification. The communication device (e.g., device 1006, the EMS 1030 in FIG. 10) detects and collects data about one or more users (e.g., user 1000) and their environment from various devices (act 1112). In some embodiments, the data about the user includes the health status of one or more users (e.g., health history, sensed data including heart-beat, heart-rate, blood oxygen levels, pulse-rate). In some embodiments, the data associated with the environment of the user is also analyzed (act 1114) (e.g., air pressure, oxygen content in the air, carbon dioxide or carbon monoxide levels) and device information (e.g., current GPS position, current hybridized location using location services, historical location information, nearest cell tower, cell tower triangulation information, Wi-Fi positioning, phone number, device ID, MAC address, IP address). In some embodiments, threats are detected based on detection of sensed data above or below a set threshold range (e.g., car alarm has been triggered). If no imminent or on-going threat is indicated (act 1114), the analysis is repeated after a specified period of time (act 1136).

If there is a possible, imminent or on-going threat to one or more users (act 1114), there may be an existing or ongoing emergency communication regarding the user (act 1116). For example, sometimes, there is an on-going emergency call or incident relating to the user. In some embodiments, the device detects an on-going emergency call or session and/or the EMS searches through current call or incident data. In some embodiments, upon determining that there is an on-going emergency communication (act 1116), the need for notification for the affected user, group members, emergency contacts are evaluated (act 1122). In some embodiments, notifications about on-going or potential emergency are sent to the affected user, group members, emergency contact based on user preferences (act 1134). In addition, the need to contact the dispatch center and emergency resource management is evaluated (act 1124). In some embodiments, for contacting the dispatch center, the appropriate dispatch center for the type and location of the emergency is identified (act 1126). If needed, a request for assistance or notifications are sent to the appropriate dispatch center or emergency resource managers (act 1126, 1128, 1132).

In some embodiments, when a potential emergency is detected, emergency predictions are generated to evaluate the level of the threat (act 1118). In some embodiments, emergency predictions are generated on a prediction server (such as anomaly detection in real-time as described in FIGS. 6A and 6B). In some embodiments, when a potential emergency is detected, the type of emergency and the priority of the emergency are determined to determine if notifications to the user, group members be sent (act 1122). In some embodiments, notifications about on-going or potential emergency are sent to the affected user, group members, emergency contact based on user preferences (act 1134). In addition, the need to contact the dispatch center and emergency resource management is evaluated (act 1124). In some embodiments, for contacting the dispatch center, the appropriate dispatch center for the type and location of the emergency is identified (act 1126). If needed, a request for assistance or notifications are sent to the appropriate dispatch center or emergency resource managers (act 1126, 1128, 1132). In some embodiments, for on-going and potential emergencies, the situation is monitored and communications with dispatch center is managed (act 1132).

Emergency Auto-Detection by a Group of Devices

In some aspects, disclosed herein are methods for a group of communication devices to cooperatively act in response to a user of a communication device in the group of communication devices being in need of emergency assistance, the method comprising: collectively and autonomously determining, by the group of communication devices, whether the user is facing an emergency situation and requires emergency assistance; responsive to determining that the user is in need of emergency assistance, collectively selecting, by the group of communication devices, one or more communication devices in the group of communication devices that will send a request for emergency assistance on behalf of all communication devices in the group of communication devices that are likely to be impacted by the emergency situation to an EDC and/or an EMS and manage communication between the group of communication devices and the EDC and/or EMS responding to the request for emergency assistance; constructing the request for emergency assistance; sending the request for emergency assistance from the one or more communication devices to an EDC and/or EMS serving an area where the group of communication devices are located; and actively managing communication of meta-data information and conclusions derived from analysis of the meta-data information between communication devices in the group of communication devices and/or between the one or more communication devices and the EDC and/or EMS. In some embodiments, the determination of whether the user requires emergency assistance is made by the group of communication devices based on data regarding the user, data about the environment around the user, and information about the group of communication devices. In some embodiments, the method further comprises determining a type of potential threat to the user. In further embodiments, the method further comprises determining a possible impact of the potential threat to the user. In further embodiments, the method further comprises determining possible ways in which the threat can be remedied. In further embodiments, the method further comprises determining potential sources of help available near the user. In some embodiments, the request for emergency assistance is constructed based on an understanding of a current status of the user derived from meta-data available about the user, the group of communication devices, and an environment around the user. In some embodiments, the method further comprises providing the EMS and/or EDC with data that the decision to generate the request for emergency assistance was based on. In some embodiments, the method further comprises including meta-data information regarding the user and the emergency situation in the request for emergency assistance. In some embodiments, the method further comprises, responsive to determining at the one or more communication devices, after sending the request for emergency assistance, that the request for emergency assistance has not been responded to, resending the request for emergency assistance until a successful acknowledgement is received from the EMS and/or the EDC. In further embodiments, resending the request for emergency assistance comprises sending the request for emergency assistance to the same or EDC and/or EMS to which the request for emergency assistance was previously sent. In further embodiments, resending the request for emergency assistance comprises sending the request for emergency assistance to a different EDC and/or EMS that the EDC and/or EMS to which the request for emergency assistance was previously sent. In further embodiments, resending the request for emergency assistance comprises sending the request for emergency assistance, by the one or more communication devices that previously sent the request for emergency assistance. In further embodiments, resending the request for emergency assistance comprises sending the request for emergency assistance, by a different one or more communication devices than the one or more communication devices that previously sent the request for emergency assistance. In some embodiments, the method further comprises: responsive to determining at the one or more communication devices that there is additional information available about the emergency situation in addition to information already shared with the users, analyzing the additional information along with existing meta-data information about the user, the group of communication devices, and the environment around the user; and responsive to determining that the analysis yields a different conclusion about a health status of the user than a health status of the user previously shared with the users, sharing the different conclusion with the users. In further embodiments, the EDC and/or EMS performs the act of analyzing the additional information along with existing meta-data information about the user, the group of communication devices, and the environment around the user. In further embodiments, the one or more communication devices performs at least a portion of the act of analyzing the additional information along with existing meta-data information about the user, the group of communication devices, and the environment around the user. In yet further embodiments, the EDC and/or EMS performs the act of sharing the different conclusion with the users. In some embodiments, the method further comprises, responsive to determining by the group of communication devices that the user is in need of emergency assistance, raising an alarm at interfaces on the communication devices. In some embodiments, the group of communication devices make a prediction, based on available meta-data about users of the group of communication devices, the group of communication devices, and an environment around the users, as to whether or not a first sub-group of the users will likely be facing a future emergency situation, a likely type of the future emergency situation, a likely time before the future emergency situation will occur, and a likely impact of the future emergency situation on the first sub-group of the users. In further embodiments, a second sub-group of the users are currently facing the future emergency situation, and the method further comprises: sending a request for emergency assistance to the EDC and/or EMS on behalf of the second subgroup of users; and keeping the EDC and/or EMS updated about a status of the first sub-group of users and any changes in the likely time before the future emergency situation will occur and/or likely impact of the future emergency situation on the first sub-group of the users. In some embodiments, the group of communication devices make a decision to select more than one communication device from the group of communication devices to represent and send a request for emergency assistance on behalf of the group of communication devices, and the more than one communication device manages communication between the EMS and/or EDC and the group of the communication devices. In some embodiments, individual devices in the group of communication devices host an application client and communicate with the EMS and/or EDC via the application client, the application client including functionality to: analyze meta-data about users of the group of communication devices, the group of communication devices, and an environment around the users; generate a conclusion from the meta-data about the users, the group of communication devices, and the environment around the users; make a decision about a status of the one or more of the users based on the conclusion; and share the decision with the group of communication devices. In further embodiments, the application client constructs the request for emergency assistance, sends the request for emergency assistance to the EDC and/or EMS, and manages data connections and the meta-data information communicated between the group of communication devices. In some embodiments, the group of communication devices, responsive to determining that the one or more communication devices is not responsive, select another communication device from the group of communication devices to represent and send the request for emergency assistance on behalf of the group of communication devices.

In another aspect, disclosed herein are mobile user communications devices configured to participate in a group of communication devices, the mobile user communications device comprising: a user interface; a location determination module; a communications module configured to send and receive messages, including a request for emergency assistance containing meta-data about communication devices in the group of communication devices, users of the communication devices, and an environment around the users; and a processor configured to: receive an indication of a location of the user mobile communication device from the location determination module; receive meta-data about the users, the communication devices, and the environment around the users from other communication devices of the group of communication devices; analyze the meta-data and the indication of the location to determine if one or more of the users is in a situation that requires emergency assistance; responsive to determining that the one or more of the users is in need of emergency assistance, one of sending the meta-data to a selected communication device of the group of communication devices, or constructing a request for emergency assistance based on an understanding of a current status of the users derived from the meta-data and sending the request, along with any relevant meta-data and any conclusions derived from the meta-data, to the communications module of the communication device; and establish a data communications link, via the communications module, to one or more of an EMS, an EDC, or communication devices of other communication devices in the group of communication devices. In further embodiments, the mobile communication device is selected from the group including a Tablet computer, a Smart phone, laptop computer, or a wearable device. In further embodiments, the mobile communication device hosts an application client, the processor is configured to interact with a user of the mobile communication device using the application client, and the application client is configured to translate commands and emergency alerts from the processor into a user recognizable action, translate user input into machine code or commands the processor of the device can understand, and send the machine code or commands to the processor. In yet further embodiments, the user recognizable action includes one or more of a display on the user interface, a voice command, video data, or a text based message. In yet further embodiments, the user input includes user responses to an emergency alert presented by the processor to the user on the user interface. In further embodiments, the processor is configured to communicate with processors of other mobile communication devices via the communication module, and exchange meta-data relevant to an emergency situation that the one or more of the users is facing. In yet further embodiments, the processor is further configured to communicate information about the users, the communication devices, and the environment around the users, with the processors of the other mobile communication devices. In yet further embodiments, the processor is further configured to one of update an existing request for emergency assistance based on meta-data information received from the other mobile communication devices, or construct a new request for emergency assistance based on the meta-data information received from the other mobile communication devices. In still yet further embodiments, the processor is further configured to one of update the existing request for emergency assistance or construct the new request for emergency assistance in conjunction with processors of the other communication devices. In still yet further embodiments, the processor is further configured to relay one of the updated and new requests for emergency assistance to one or more communication devices selected by the group of communication devices to contact the EDC and/or EMS on behalf of the group of communication devices. In still yet further embodiments, the processor is further configured to relay one of the updated and new requests for emergency assistance to an EDC and/or EMS via the communication module.

Figure 12:
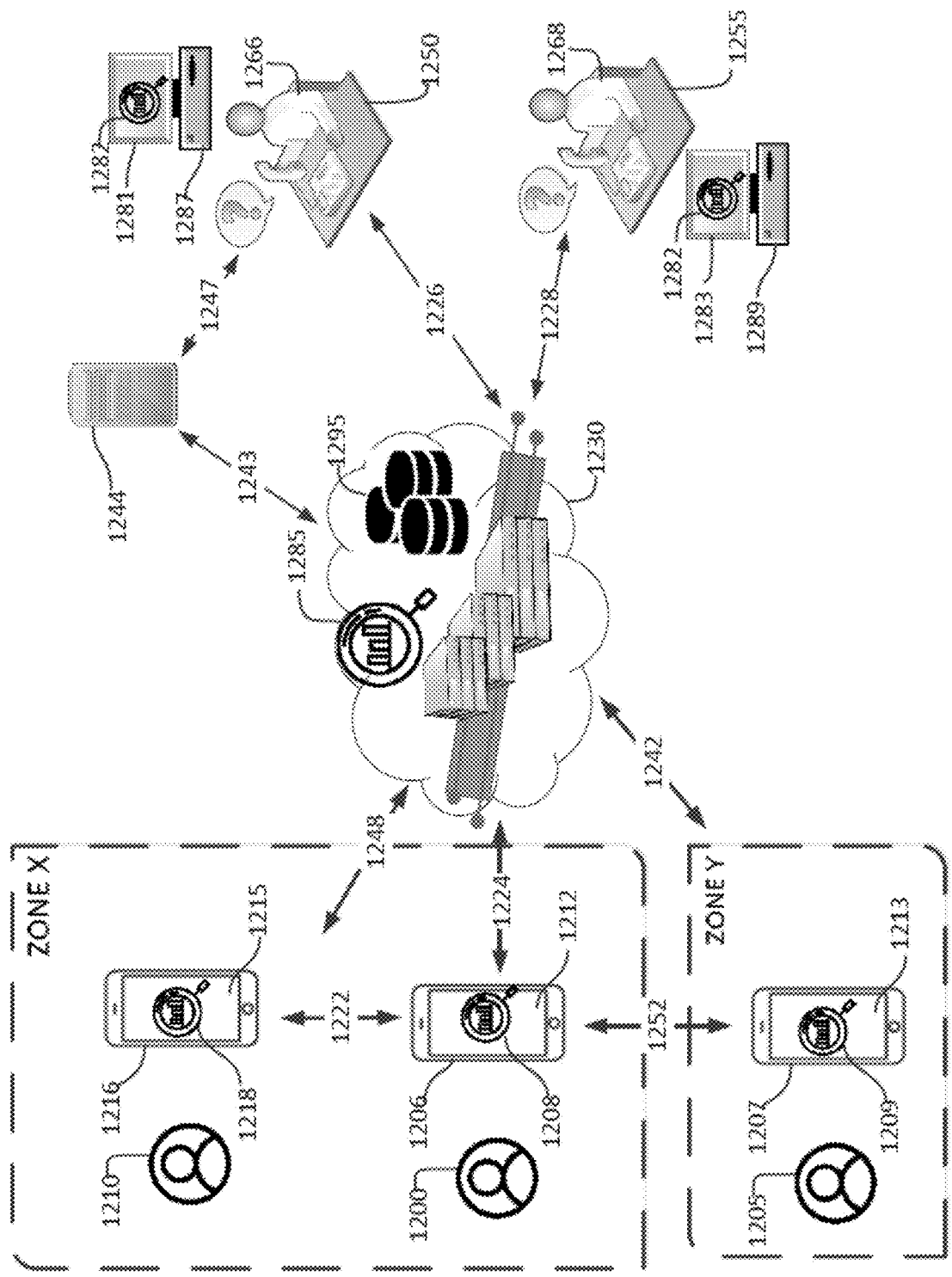
FIG. 12 illustrates one embodiment of an emergency prediction system for autonomously predicting emergencies involving a group of users in different PSAP service areas.

FIG. 12 illustrates one embodiment of an emergency prediction system for autonomously predicting emergencies involving a group of users in different PSAP service areas. Analogous to FIG. 10, a group of users, including user 1200 with communication device 1206, user 1205 with associated device 1207 and user 1210 with associated device 1216. The group of users may have agreed to share data with each other and keep an eye on each other. In some embodiments, the users may have authorized a group member (e.g., a family or friend) to make an emergency call in case of an emergency.

As shown in FIG. 12, the users may be located in different geographical areas throughout the country. Here, user 1200 and 1210 are located in Zone X while user 1205 is in Zone Y where two different PSAP jurisdictions are responsible for providing for emergency assistance (i.e., EDC 1250 & 1255). In some embodiments, different dispatch centers may be needed for different types of emergencies (e.g., a police hotline may be called if there is a burglary, while a private road-side assistance may be called when a car breaks down on the highway).

The device 1206 may communicate with and share data with the other devices 1207, 1216 (both near and far) about the user 1200 and his or her environment. In some embodiments, the devices may share data periodically or when there has been a trigger. The device 1206 may include a touchscreen 1212 (which may function as a display and user interface). The device 1206 may also include a computer program 1208, which may include one or more modules of an emergency prediction program. Thus, the program 1208 may detect or collect information about users 1200, 1205, 1210 through member devices 1206, 1207, 1216 and provide notification to the users 1200, 1205, 1210 about pertinent threats affecting other members of the group. In some embodiments, the EPS may connect the users 1200, 1205, 1210 to a dispatch center (e.g., EDC 1250 or a private dispatch center) for emergency assistance.

The emergency prediction system may include an EMS 1230, which may connect users 1200, 1205, 1210 through devices 1206, 1207, 1216 when there is an on-going emergency or a possible emergency affecting another group member. As shown, devices 1206, 1207, 1216 may connect to the EMS 1030 through various wired or wireless connections such as cellular voice network, cellular data network, Wi-Fi, Bluetooth®, Internet-based networks, etc. For example, in some embodiments, the communication link 1224 connects device 1206 to the EMS 1230, while the communication links 1226 or 1245 and 1247 connect to the EDC 1250 via a gateway 1244.

The EMS 1230 may play an important role in directing the request for emergency assistance to the appropriate dispatch center (e.g., PSAP). Here, since Zone X is in the jurisdiction of EDC 1250, that is the appropriate PSAP if user 1200 or user 1210 is in an on-going or potential emergency. However, if user 1205 in Zone Y is in need of emergency assistance, EDC 1255 should be contacted. If the emergency communication is sent to the wrong dispatch center, precious time may be wasted in re-routing and transfer.

For this purpose, the location of the device 1206, 1207 or 1216 may be used as the location of the emergency for determination of the appropriate dispatch center. For the device location, a GPS position, cellular triangulation, hybrid device-based location using location services, Wi-Fi positioning, Bluetooth® positioning, use of Wi-Fi and/or Bluetooth® access points, etc.

In same way, notifications about potential emergency predictions concerning user 1200 and 1210 should be directed to EDC 1250 for resource planning, while for user 1205 to EDC 1255.

In some embodiments, the devices 1206, 1207, 1216 may collectively analyze the information about the user and environment to determine whether there is an on-going or possible emergency. In some embodiments, one device (e.g., device 1206) may be a master device that may determine whether there is an emergency and autonomously decide to send an emergency alert to a dispatch center for assistance on behalf of another device or group member.

In some embodiments, the emergency prediction modules on the device 1206 may communicate with an emergency prediction server 1285 in the EMS 1230 where the analysis for emergency predictions are conducted. Databases 1295 (e.g., Master DB, Batch Serving DB, Real-time Serving DB) and other components of the emergency prediction system may also be housed in the EMS 1230.

The devices 1206, 1207, 1216 may be in the same or different locations and the location data for the emergency may be shared with the EDC 1250, where an emergency personnel (e.g., dispatcher 1266, a manager (not shown)) may be informed about the on-going emergency or potential emergency. As shown a computer system 1281 with an emergency prediction program 1285 may be accessible to the dispatcher 1266 or manager or other emergency personnel at the EDC 1250. At EDC 1255, a dispatcher 1268 may have access to computer system 1289.

The computer systems 1281, 1289 (e.g., a PSAP system with hardware and software components as depicted in FIG. 14D). As shown, the systems 1281, 1289 may include display or user interfaces 1087, 1283s and an emergency prediction program 1282. On the systems 1281, 1289, emergency personnel may get notification about on-going and potential emergencies and allocation of emergency resources.

Figure 13:
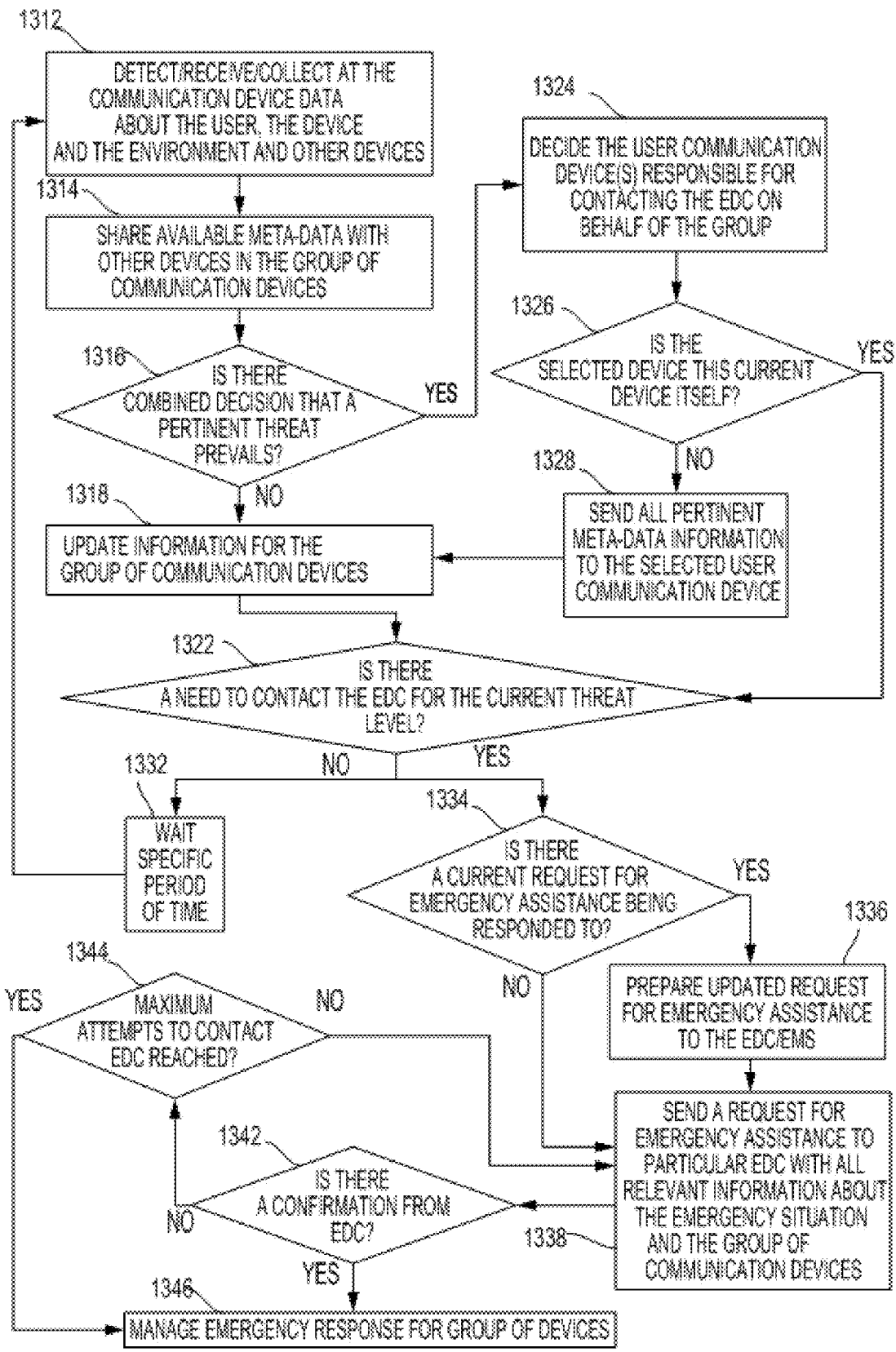
FIG. 13 depicts a method for sending a request for assistance based on a threat of an emergency involving a group of users.

FIG. 13 depicts a method for sending a request for assistance based on a threat of an emergency involving a group of users. A group of communication devices may detect, on an autonomous basis, if one or more users is in need, or will potentially be in need of emergency assistance within a certain period of time, and communicate this information to the appropriate dispatch center.

In accordance with the method, a communication device detects data about the user, associated communication devices and the environment around the user 100 (act 1312). The communication device may share the data with the other communication devices in a group of devices (act 1314). The group of communication devices may collectively or individually (through use of a prediction server) perform an analysis of on-going or potential emergencies that may be affecting the user or his or her environment or property (act 1316).

Responsive to detecting that there is no pertinent (act 1316), data is updated to the group (act 1318). If a threat is detected a communication device is chosen (or pre-determined) for sending a request for emergency assistance on behalf of all the other communication devices in the group (act 1324, 1326, 1328).

If the group of communication devices 101, 102 derive a collective decision that there is a threat, the need to contact a dispatch center (e.g., an EDC) is evaluated periodically (act 1334, 1332). Responsive to deciding that a request for emergency assistance should be sent (act 1322) the communication device may determine if there is an on-going call for emergency assistance (act 1334). Responsive to detecting that there is an on-going communication (act 1334), an updated request for emergency assistance (act 1336). Alternately when there is no on-going communication (act 1334), a request for assistance is sent (act 1338). The communication device or EMS may verify that the request was successfully transmitted to the appropriate dispatch center before maximum number retries have been exhausted and the communication with user and dispatch center is managed (act 1342, 1344, 1346).

Figure 14B:
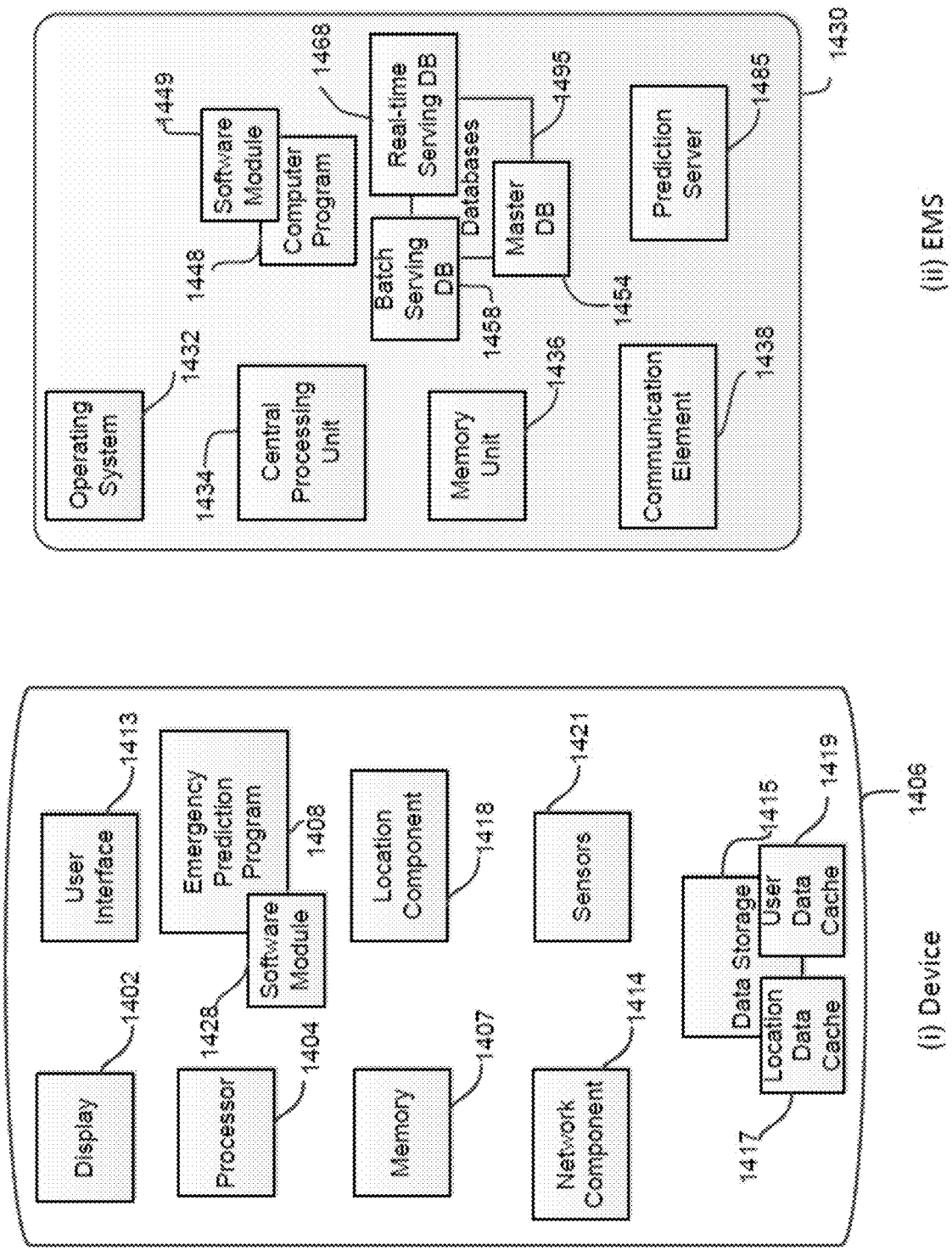

FIG. 14B also shows a schematic diagram of one embodiment of an emergency management system 1430 as described herein. In some embodiments, the emergency management system 1430 comprises one or more of an operating system 1432, at least one central processing unit or processor 1434, a memory unit 1436, a communication element 1438, and a software application 1448 (e.g., server application) with software module 1449. In some embodiments, the emergency management system 1430 comprises one or more databases 1495 for generating emergency predictions. In some embodiments, the emergency management system 1430 comprises a master database 1454, batch serving database 1458, and a real-time serving database 1468.

Figure 14C:
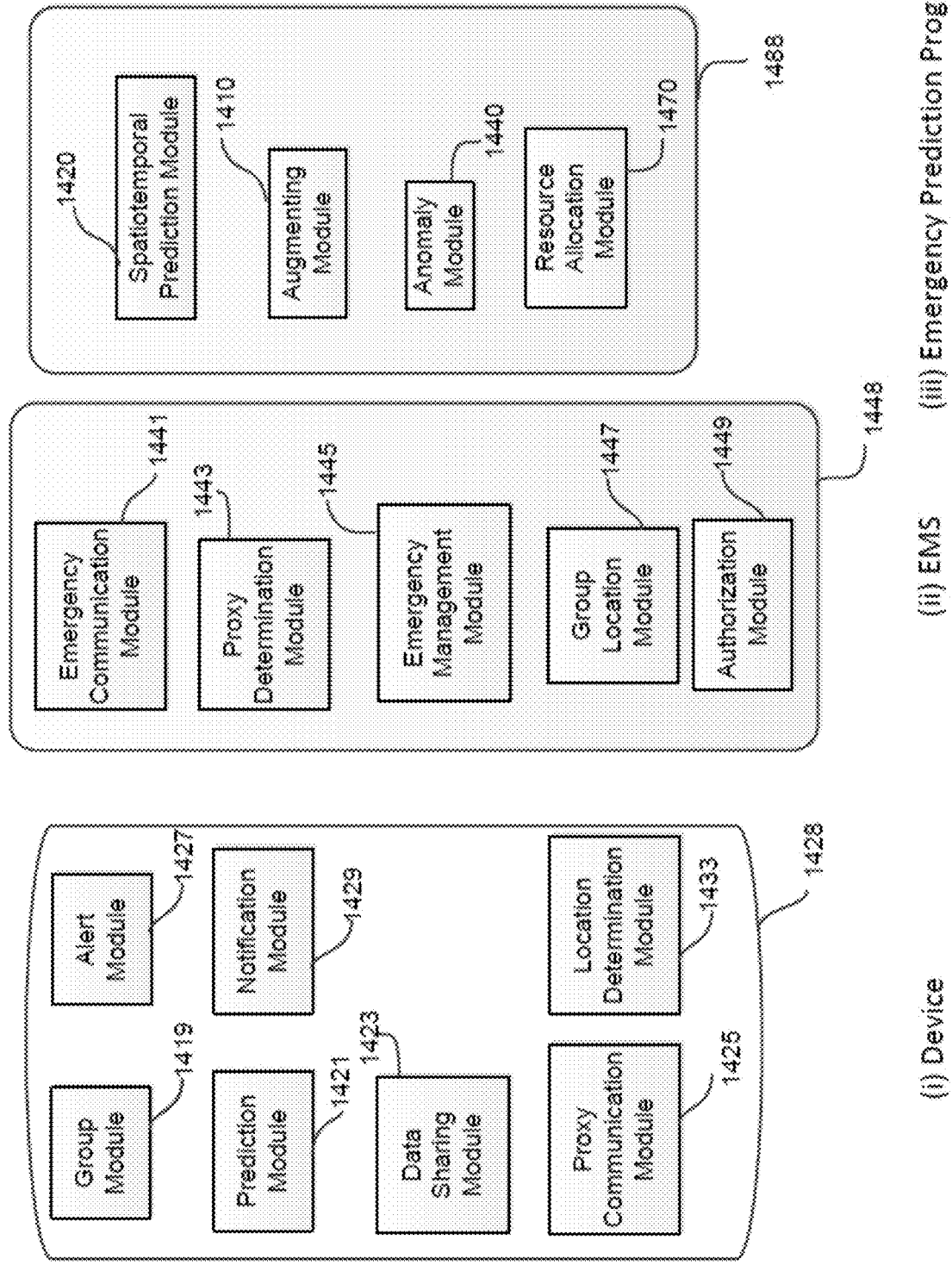
Figure 14D:
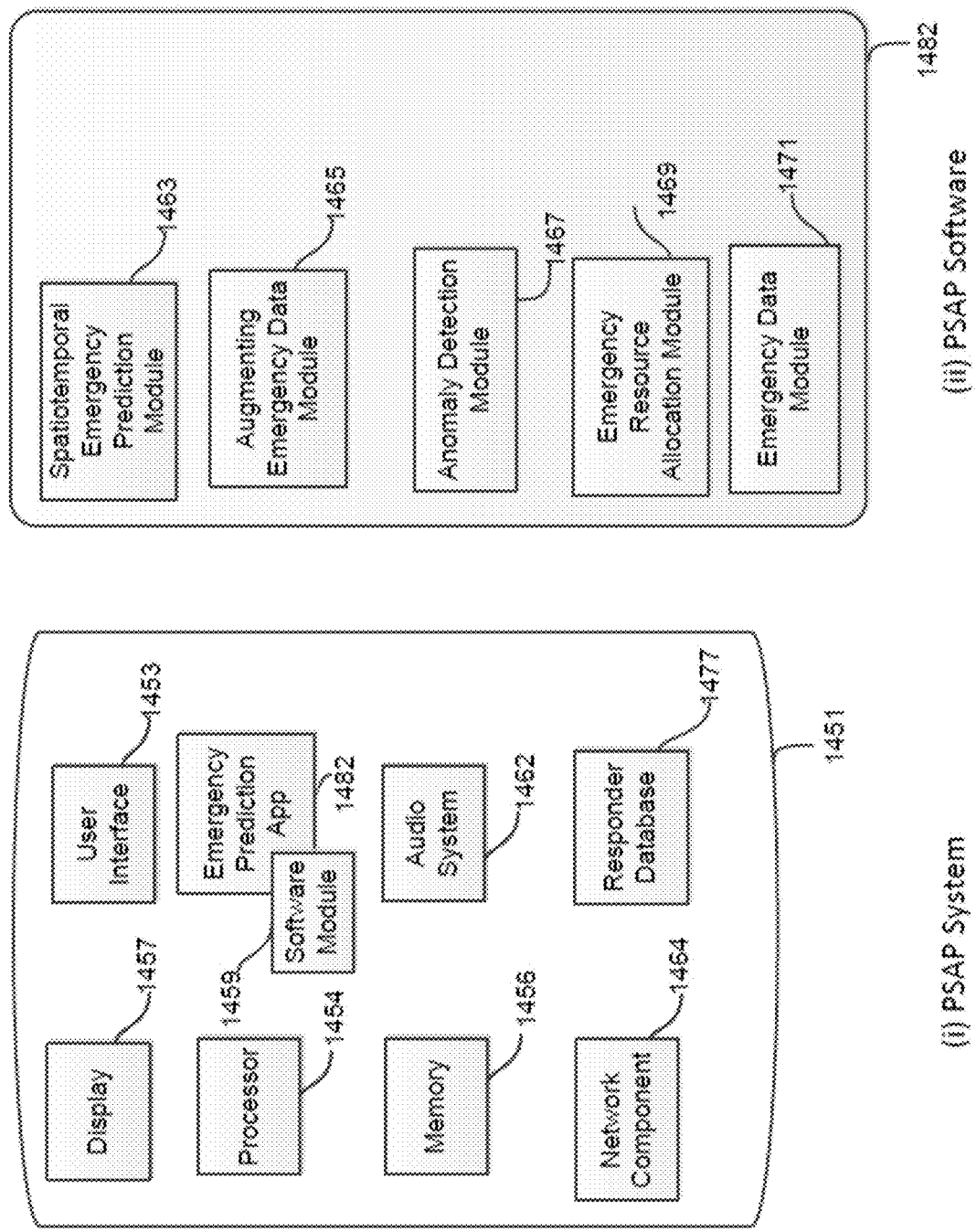

FIG. 14C shows a schematic diagram of one embodiment of a software application 1428 installed on a device. In some embodiments, the software application 1428 comprises one or more device software modules selected from a group module 1419, a prediction module 1421, a data sharing module 1423, a proxy communication module 1425, an alert module 1427, a status notification module 1429, a location determination module 133, or any combination thereof. In some embodiments, the software application 1448 comprises one or more device software modules selected from an emergency communication module 1441, a proxy determination module 1443, an emergency management module 1445, a group location module 1447, or any combination thereof. In some embodiments, the computer program 1488 comprises one or more device software modules FIG. 14C also shows a schematic diagram of one embodiment of a server application 1448 installed on a server (e.g., a server in an EMS). In some embodiments, the server application 1448 comprises one or more server software modules from an emergency communication module 1441, a proxy determination module 1443, an emergency management module 1445, a group location module 1447, or any combination thereof.

FIG. 14C also shows a schematic diagram of one embodiment of an emergency prediction program 1488 installed on a server (e.g., a server in an EMS). In some embodiments, the server application 1488 comprises one or more emergency prediction software modules selected from a spatiotemporal communication module 1420, an augmenting module 1410, an anomaly module 1440, a resource allocation module 1470, or any combination thereof.

FIGS. 10 and 12 illustrate an embodiment of proxy calling where a user 1000, 1200 of a first communication device 1006, 1206 sends an emergency alert on behalf of a second device 1007, 1207 (or a user thereof 1005, 1205). In some embodiments, a second device 1007, 1207 is a member device in a group of devices, wherein member devices in the group are authorized to share data. In some embodiments, a user 900 of a communication device 906 initiates the process to send a request for assistance to an EDC 955 on behalf of a user 905 of the second device 907. In some embodiments, the user 905 has authorized the second device 907 to share his or her location with the user 900. In some embodiments, user 900 and 905 are in a group of family and/or friends who have joined their devices to a group of devices and authorized sharing their location data with each other.

In some embodiments, the communication device 1006 includes a computer program 1008, such as, for example, a software application 1428 as shown in FIG. 14C. In some embodiments, a user 1000 interacts with the communication device 1006 using the user interface 1012 (e.g., soft keys on a touch screen, press or tap buttons on the front or sides of the device 1006). In some embodiments, user 1200 and device 1206 are located in "zone X", which is a geographical area that is within the jurisdiction of an EDC 1250, such as a Public Safety Answering Point (PSAP).

FIG. 14D shows a schematic diagram of one embodiment of a Public Safety Answering Point (PSAP) system 1451 as described herein. In some embodiments, the PSAP system 1451 comprises one or more of display 1457, a user interface 1453, at least one central processing unit or processor 1454, a memory unit 1456, a network component 1462, an audio system 1462 (e.g., microphone, speaker and/or a call-taking headset) and a computer program such as a PSAP Emergency Prediction Application 1482. In some embodiments, the PSAP application 1482 comprises one or more software modules 1459. In some embodiments, the PSAP system 1451 comprises a database of responders 1477 (not shown), such as medical assets, police assets, fire response assets, rescue assets, safety assets, etc.

FIG. 14D also shows a schematic diagram of one embodiment of a PSAP application 1482 installed on a PSAP system 1451 (e.g., a server in the PSAP system). In some embodiments, the PSAP application 1482 comprises one or more prediction software modules. In some embodiments, a software module is a spatiotemporal emergency prediction module 1463, an augmenting emergency data module 1465, an anomaly detection module 1467, an emergency resource allocation module 1469 or an emergency data module 1471.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, walkie talkies, radios, tablet computers, personal digital assistants, video game consoles, and vehicular consoles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple® Mac OS X Server®, Oracle® Solaris®, Windows-Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research. In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software Opera Mobile, and Sony PSP™ browser.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1—Planning for Staffing and Resource Allocation

An operations officer for a City A fire department is tasked with developing a resource allocation plan for the upcoming week. The purpose of this plan is to report on the available fire resources in the city, identify any possible gaps or risks, and provide recommendations for solutions to cover identified gaps and mitigate risks. Fire resources include the number and type of fire vehicles available in the city and their base locations.

City A has a data sharing agreement in place with an emergency prediction system and provides call data from the city's PSAPs on a daily basis for all types of emergency calls. The fire department utilizes various software tools to conduct operations planning, and has integrated the outputs of the system into a resource planning application with a graphical user interface. This application allows fire department personnel to display and explore information on a dashboard that includes tables, charts, and a geographical map annotated with multiple layers, such as locations of fire resources, boundaries of areas of responsibility for each fire station, emergency calls, and predicted emergency call densities for the city. Filters and selection options are available to display the desired layers with options for viewing detailed or aggregated information and can be used to conduct analysis and produce reports.

The operations officer selects an option on the application to produce a recommended allocation of fire response vehicles for the next week, from 00:00 hours on Monday until 23:59 hours on the next Sunday, and to display the recommended allocations on the map and in associated tables for each day of the week. The emergency prediction system has already calculated ahead of time the predicted density of fire-related emergency calls for every hour of the next week. The emergency prediction system runs on a daily schedule providing new predictions and updating current predictions. The application makes an API call to the PSAP system to request the call density data for the week. The results are then sampled and aggregated for each fire station's area of responsibility to give a daily estimate of calls, which is shown on the map as a layer.

The officer recalls that two fire vehicles are in maintenance for the week, and updates a table that tracks the current availability of fire vehicles. The officer then selects an option to calculate the vehicle allocation recommendation. The updated emergency resource data is sent to the emergency prediction system, and the emergency resource allocation module calculates the recommended allocations. The system detects that three areas of the city do not have adequate fire resources to respond to the estimated number of calls on Wednesday. These areas are visually highlighted on the map and in a notification table in the application. The officer transmits this report to his supervisor and brings up the identified gaps in coverage for discussion at the weekly planning meeting.

Example 2—Group Emergency Detection

An operations officer for the City B police department is monitoring current police operations from the department's tactical operations center. The city has a data sharing agreement in place with an emergency prediction system and provides emergency call data on a daily basis to the system. The tactical operations center subscribes to the system's anomalous cluster detection and notification system, and the output is integrated as a module in the operations center's monitoring dashboard.

A large truck overturns on one of the main streets in the city, blocking traffic both ways and causing several other vehicles to collide. Individuals nearby begin calling 911 to report the accident. As the emergency calls arrive, they are processed as an incoming data stream from the PSAP and augmented with additional information (such as type of device, call duration, etc.) and predictions regarding the call nature and priority. Five calls occur within a minute of the accident, and the emergency event detection module detects the cluster. A notification is sent to the tactical operation center dashboard, and is displayed on a map with the probable location of the event based on the location of the associated calls. The dashboard also displays that the calls are predicted to be high priority. The operations officer responds to the notification and begins directing police units to the location of the accident.

As this large traffic event is taking place, the PSAP is receiving a much higher number of calls than usual, resulting in calls being placed in a queue to be answered. The software that assists in directing calls for the PSAP is integrated with the emergency prediction system, and when each call arrives, the system detects if it is part of a larger cluster. Once the cluster has been identified, the PSAP system recognizes that many operators are handling calls from the same emergency event. A new call arrives that is not part of the cluster, but is predicted to be a high-priority medical call. The system automatically moves this call up in the queue, allowing the emergency to be responded to quickly.

Example 3—Self-Driving Car

City C has begun allowing self-driving cars to operate within the city limits for an on-demand car service. A taxi service has deployed a fleet of self-driving cars. A command center monitors the cars throughout the city and sends out roadside assistance when needed. The car's navigation system utilizes several data sources to determine the optimal route. One of these inputs is emergency event call clusters detected by an emergency prediction system. The car is driving a passenger across town utilizing one of the main roads in city C. During the trip, a large truck overturns on the route several miles away. As individuals begin to call 911 to report the accident, our system detects the cluster and recognizes that it is on the road with the self-driving car based on the location of the calls. The self-driving car receives a notification that an emergency event is taking place along the route, and it recalculates the trip to avoid the area of the accident.

Example 4—Data Augmentation for Resource Allocation Planning

An operations officer for a City D fire department is tasked with developing a resource allocation plan for the upcoming week. The purpose of this plan is to report on the available fire resources in the city, identify any possible gaps or risks, and provide recommendations for solutions to cover identified gaps and mitigate risks. Fire resources include the number and type of fire vehicles available in the city and their base locations.

City D has a data sharing agreement in place with an emergency prediction system and provides call data from the city's PSAPs on a daily basis for all types of emergency calls. The PSAP call data is unlabeled and stored in a proprietary database operated by the City. Meanwhile, the emergency prediction system maintains a separate database for labeled call data for calls routed through an emergency management system (EMS) that manages emergency communication sessions involving communication devices. A subset of the labeled call data correspond to a subset of the PSAP unlabeled call data. In these instances, an emergency call such as from a user mobile phone is routed through the EMS to the PSAP, but the PSAP does not share an database with the EMS, instead storing its own unlabeled call data separately. The unlabeled call data also includes emergency response time. Conversely, the EMS stores its labeled data based on information obtained from the calling device with the labels including emergency type (fire, police, medical, vehicle). However, the labeled call data does not include emergency response time. Accordingly, the labeled and unlabeled data each includes information that the other does not have. In this case, the unlabeled call data from the PSAP database is augmented by matching with the corresponding labeled call data from the EMS. The augmented emergency call data is then used by the emergency prediction system to train a prediction algorithm to determine estimated emergency calls relating to fire emergencies.

The fire department utilizes various software tools to conduct operations planning, and has integrated the outputs of the system into a resource planning application with a graphical user interface. This application allows fire department personnel to display and explore information on a dashboard that includes tables, charts, and a geographical map annotated with multiple layers, such as locations of fire resources, boundaries of areas of responsibility for each fire station, emergency calls, and predicted emergency call densities for the city. Filters and selection options are available to display the desired layers with options for viewing detailed or aggregated information and are optionally used to conduct analysis and produce reports.

The operations officer selects an option on the application to produce a recommended allocation of fire response vehicles for the next week, from 00:00 hours on Monday until 23:59 hours on the next Sunday, and to display the recommended allocations on the map and in associated tables for each day of the week. The emergency prediction system has already calculated ahead of time the predicted density of fire-related emergency calls for every hour of the next week based on the augmented emergency call data. The emergency prediction system runs on a daily schedule providing new predictions and updating current predictions. The application makes an API call to the PSAP system to request the call density data for the week. The results are then sampled and aggregated for each fire station's area of responsibility to give a daily estimate of calls, which is shown on the map as a layer.

The officer recalls that two fire vehicles are in maintenance for the week, and updates a table that tracks the current availability of fire vehicles. The officer then selects an option to calculate the vehicle allocation recommendation. The updated emergency resource data is sent to the emergency prediction system, and the emergency resource allocation module calculates the recommended allocations. The system detects that three areas of the city do not have adequate fire resources to respond to the estimated number of calls on Wednesday. These areas are visually highlighted on the map and in a notification table in the application. The officer transmits this report to his supervisor and brings up the identified gaps in coverage for discussion at the weekly planning meeting.

What is claimed is:

1. A method comprising: obtaining, by an emergency prediction system (EPS), emergency data comprising emergency type, emergency location, and emergency time for a plurality of emergency communications; augmenting, by the emergency prediction system, the emergency data with additional data associated with the plurality of emergency communications based on at least one of emergency time, emergency location, and calling identity; generating at least one spatiotemporal emergency prediction based on the emergency data; and providing the at least one spatiotemporal emergency prediction and a recommended allocation of emergency resources based on the at least one spatiotemporal emergency prediction to an emergency dispatch center serving a defined geographic area to display on an emergency dispatch center display.

2. The method of claim 1, wherein augmenting the emergency data with additional data comprises: matching at least a subset of the additional data with at least a subset of the emergency data; and combining information from the at least a subset of the additional data and the at least a subset of the emergency data to form augmented data.

3. The method of claim 1, wherein providing the at least one spatiotemporal emergency prediction comprises: displaying a set of predicted kernel density estimates on a digital map.

4. The method of claim 1, wherein generating the at least one spatiotemporal emergency prediction comprises: generating a plurality of subset spatiotemporal emergency predictions for subsets of the defined geographic area; and aggregating the plurality of subset spatiotemporal emergency predictions to obtain the at least one spatiotemporal emergency prediction.

5. The method of claim 1, further comprising: generating, by the emergency prediction system, at least one prediction model; and generating the spatiotemporal emergency prediction using the at least one prediction model.

6. The method of claim 5, wherein generating the at least one prediction model comprises: generating a prediction model using a point cloud comprising points sampled from at least one of emergency data, proprietary emergency data, and a proprietary data stream.

7. An emergency prediction system (EPS) comprising: a network component, operative to receive emergency data; and a processor, operatively coupled to the network component, the processor operative to: obtain emergency data comprising emergency type, emergency location, and emergency time for a plurality of emergency communications; augment the emergency data with additional data associated with the plurality of emergency communications based on at least one of emergency time, emergency location, and calling identity; generate at least one spatiotemporal emergency prediction corresponding to a defined emergency type, a defined geographic area, and a defined time period; and provide the at least spatiotemporal emergency prediction and a recommended allocation of emergency resources based on the spatiotemporal emergency prediction to an emergency dispatch center serving the defined geographic area to display on an emergency dispatch center display.

8. The emergency prediction system of claim 7, wherein the processor is further operative to: generate at least one prediction model using a point cloud comprising points sampled from at least one of emergency data, proprietary emergency data, and a proprietary data stream.

9. The emergency prediction system of claim 7, wherein the processor is further operative to: augment the emergency data with the additional data by matching at least a subset of the additional data with at least a subset of the emergency data, and combining information from the at least a subset of the additional data and the at least a subset of the emergency data to form augmented data.

10. The emergency prediction system of claim 7, wherein the processor is further operative to: execute an allocation algorithm, operative to generate the recommended allocation of emergency resources based on the at least one spatiotemporal emergency prediction.

11. A method, comprising: obtaining, by an emergency prediction system, emergency data for emergency communications comprising emergency time and emergency location; monitoring the emergency communications to identify a cluster of emergency communications; identifying an emergency anomaly based on the cluster of emergency communications; and providing, by the emergency prediction system, the cluster of emergency communications and the emergency anomaly based on the cluster of emergency communications to an emergency dispatch center serving a defined geographic area to display on an emergency dispatch center display.

12. The method of claim 11, further comprising: predicting an emergency type and an emergency priority for the cluster of emergency communications using a multi-class classifier.

13. The method of claim 11, wherein obtaining the emergency data comprises: obtaining labeled incident data, unlabeled incident data, and augmented incident data.

14. The method of claim 11, further comprising: identifying the emergency anomaly substantially in real-time.

15. The method of claim 11, wherein identifying the emergency anomaly comprises: identifying the emergency anomaly using a cluster detection model.

16. The method of claim 11, wherein monitoring the emergency communications to identify a cluster of emergency communications, comprises: monitoring clusters of emergency communications that correspond to the defined geographic area, a defined time period, and a defined emergency type.

* * * * *